US012592762B2

(12) United States Patent　　　　(10) Patent No.:　US 12,592,762 B2
Farag et al.　　　　　　　　　　(45) **Date of Patent:　\*Mar. 31, 2026**

(54) METHODS AND APPARATUSES FOR PHYSICAL LAYER BEAM INDICATIONS

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US)

(73) Assignee: Samsung Electronics Co., Ltd., Suwon-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/472,102

(22) Filed: Sep. 21, 2023

(65) Prior Publication Data

US 2024/0015720 A1　　Jan. 11, 2024

Related U.S. Application Data

(63) Continuation of application No. 17/305,050, filed on Jun. 29, 2021, now Pat. No. 11,770,812.

(Continued)

(51) Int. Cl.
　*H04B 7/06*　　　(2006.01)
　*H04L 5/00*　　　(2006.01)
(Continued)

(52) U.S. Cl.
　CPC ....... *H04B 7/06952* (2023.05); *H04L 5/0055* (2013.01); *H04W 72/046* (2013.01); *H04W 72/23* (2023.01)

(58) Field of Classification Search
　CPC ... H04W 72/046; H04W 72/14; H04W 72/23; H04L 5/0055
　See application file for complete search history.

(56) References Cited

U.S. PATENT DOCUMENTS 10,952,231 B2 * 3/2021 Liou ..................... H04W 72/23
11,457,505 B2 * 9/2022 Tsai ..................... H04L 1/1614
(Continued)

FOREIGN PATENT DOCUMENTS

CN　　　111066370 A　　4/2020
CN　　　111327411 A　　6/2020
WO　　WO-2021207250 A1 * 10/2021　........... H04B 7/0695

OTHER PUBLICATIONS

"5G; NR; Physical channels and modulation (3GPP TS 38.211 version 16.5.0, Release 16)", ETSI TS 138 211 V16.5.0, Apr. 2021, 138 pgs.

(Continued)

*Primary Examiner* — Michael J Moore, Jr.

(57) ABSTRACT

Methods and apparatuses for physical layer beam indications. A method for operating a user equipment (UE) includes receiving one or more first transmission configuration indicator (TCI) states for reception and transmission of downlink (DL) channels and uplink (UL) channels, respectively; receiving one or more TCI state identifiers (IDs); and transmitting an acknowledgement in response to the reception of the one or more TCI state IDs. The method further includes, based on the acknowledgement: determining, based on the one or more TCI state IDs, one or more second TCI states; determining a time to apply the one or more second TCI states; and updating one or more spatial filters based on the one or more second TCI states. The method further includes receiving and transmitting data on the DL channel and UL channels, respectively, using the one or more spatial filters starting at the determined time.

8 Claims, 29 Drawing Sheets

Related U.S. Application Data

(60) Provisional application No. 63/140,755, filed on Jan. 22, 2021, provisional application No. 63/135,985, filed on Jan. 11, 2021, provisional application No. 63/123,224, filed on Dec. 9, 2020, provisional application No. 63/110,727, filed on Nov. 6, 2020, provisional application No. 63/054,514, filed on Jul. 21, 2020, provisional application No. 63/049,403, filed on Jul. 8, 2020.

(51) Int. Cl.
  *H04W 72/044* (2023.01)
  *H04W 72/23* (2023.01)

(56) References Cited

U.S. PATENT DOCUMENTS

| | | | | |
|---|---|---|---|---|
| 11,497,021 | B2 * | 11/2022 | Onggosanusi | H04W 72/23 |
| 11,510,212 | B2 * | 11/2022 | Rahman | H04W 72/53 |
| 11,770,812 | B2 * | 9/2023 | Farag | H04W 72/046 |
| | | | | 370/329 |
| 12,323,963 | B2 | 6/2025 | Chandrasekhar et al. | |
| 2017/0346535 | A1 | 11/2017 | Islam | |
| 2019/0052341 | A1 | 2/2019 | Furuskog | |
| 2019/0141693 | A1 | 5/2019 | Guo et al. | |
| 2019/0222289 | A1 | 7/2019 | John Wilson et al. | |
| 2019/0349915 | A1 | 11/2019 | Ahn | |
| 2019/0373450 | A1 * | 12/2019 | Zhou | H04W 76/27 |
| 2020/0029274 | A1 * | 1/2020 | Cheng | H04B 17/309 |
| 2020/0112974 | A1 * | 4/2020 | Sun | H04W 72/23 |
| 2020/0154414 | A1 * | 5/2020 | Sun | H04L 1/1812 |
| 2020/0205141 | A1 * | 6/2020 | Khoshnevisan | H04L 5/0055 |
| 2020/0229161 | A1 * | 7/2020 | Raghavan | H04W 24/10 |
| 2020/0359411 | A1 * | 11/2020 | Li | H04W 16/14 |
| 2021/0067979 | A1 * | 3/2021 | Rahman | H04L 5/0023 |
| 2021/0084624 | A1 * | 3/2021 | Zhou | H04W 72/0446 |
| 2021/0136741 | A1 * | 5/2021 | Onggosanusi | H04W 72/23 |
| 2021/0160881 | A1 * | 5/2021 | Rahman | H04W 72/046 |
| 2021/0184819 | A1 * | 6/2021 | Takeda | H04W 24/10 |
| 2021/0185647 | A1 * | 6/2021 | Rahman | H04W 72/23 |
| 2021/0274503 | A1 * | 9/2021 | Farag | H04W 76/11 |
| 2021/0306055 | A1 * | 9/2021 | Farag | H04B 7/0695 |
| 2021/0321379 | A1 * | 10/2021 | Cirik | H04W 72/044 |
| 2021/0360601 | A1 * | 11/2021 | Sakhnini | H04W 72/044 |
| 2021/0409096 | A1 * | 12/2021 | Liou | H04W 56/001 |
| 2022/0015082 | A1 * | 1/2022 | Farag | H04B 7/088 |
| 2022/0109541 | A1 * | 4/2022 | Cirik | H04B 7/06966 |
| 2022/0116183 | A1 | 4/2022 | Gao | |
| 2022/0159772 | A1 * | 5/2022 | Raghavan | H04L 5/0085 |
| 2022/0200675 | A1 * | 6/2022 | Raghavan | H04B 7/0695 |
| 2022/0239440 | A1 * | 7/2022 | Go | H04L 5/0091 |
| 2022/0240238 | A1 * | 7/2022 | Rahman | H04B 7/0695 |
| 2022/0263616 | A1 * | 8/2022 | Farag | H04L 5/0051 |
| 2022/0272685 | A1 * | 8/2022 | Rahman | H04L 5/001 |
| 2022/0287013 | A1 * | 9/2022 | Farag | H04L 1/1854 |
| 2022/0330220 | A1 * | 10/2022 | Farag | H04W 72/046 |
| 2022/0361202 | A1 * | 11/2022 | Yi | H04W 24/10 |
| 2022/0377799 | A1 * | 11/2022 | MolavianJazi | H04L 5/0048 |
| 2022/0386332 | A1 * | 12/2022 | Yokomakura | H04W 72/23 |
| 2022/0393736 | A1 * | 12/2022 | Park | H04B 7/0634 |
| 2023/0291531 | A1 * | 9/2023 | Kim | H04L 5/0091 |

OTHER PUBLICATIONS

"5G; NR; Multiplexing and channel coding (3GPP TS 38.212 version 16.5.0 Release 16)", ETSI TS 138 212 V16.5.0, Apr. 2021, 155 pages.

"5G; NR; Physical layer procedures for control (3GPP TS 38.213 version 16.5.0 Release 16)", ETSI TS 138 213 V16.5.0, Apr. 2021, 188 pages.

"5G; NR; Physical layer procedures for data (3GPP TS 38.214 version 16.5.0 Release 16)", ETSI TS 138 214 V16.5.0, Apr. 2021, 173 pages.

"5G; NR; Medium Access Control (MAC) protocol specification (3GPP TS 38.321 version 16.4.0 Release 16)", ETSI TS 138 321 V16.4.0, Apr. 2021, 159 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

International Search Report and Written Opinion of the International Searching Authority in connection with International Application No. PCT/KR2021/008747 dated Oct. 26, 2021, 7 pages.

Samsung, "On the Remaining Issues for Enhancement on UL/DL Transmit Beam Selection with Reduced Latency and Overhead", 3GPP TSG-RAN WG4 Meeting #94-e, Online, Feb. 24-Mar. 6, 2020, R4-2000292, 6 pages.

Lenovo et al., "Remaining issues on multi-TRP/panel transmission", 3GPP TSG RAN WG1 Meeting #101, e-Meeting, May 25-Jun. 5, 2020, R1-2003819, 14 pages.

Extended European Search Report issued Nov. 14, 2023 regarding Application No. 21837252.2, 14 pages.

Chinese National Intellectual Property Administration, Office Action issued Jul. 19, 2025 regarding Application No. 202180056478.4, 17 pages.

European Patent Office, Communication pursuant to Article 94(3) EPC issued Aug. 1, 2025 regarding Application No. 21837252.2, 14 pages.

Chinese National Intellectual Property Administration, Office Action issued Nov. 26, 2025 regarding Application No. 202180056478.4, 13 pages.

Extended European Search Report issued Jan. 15, 2025 regarding Application No. 25219116.8, 25 pages.

* cited by examiner

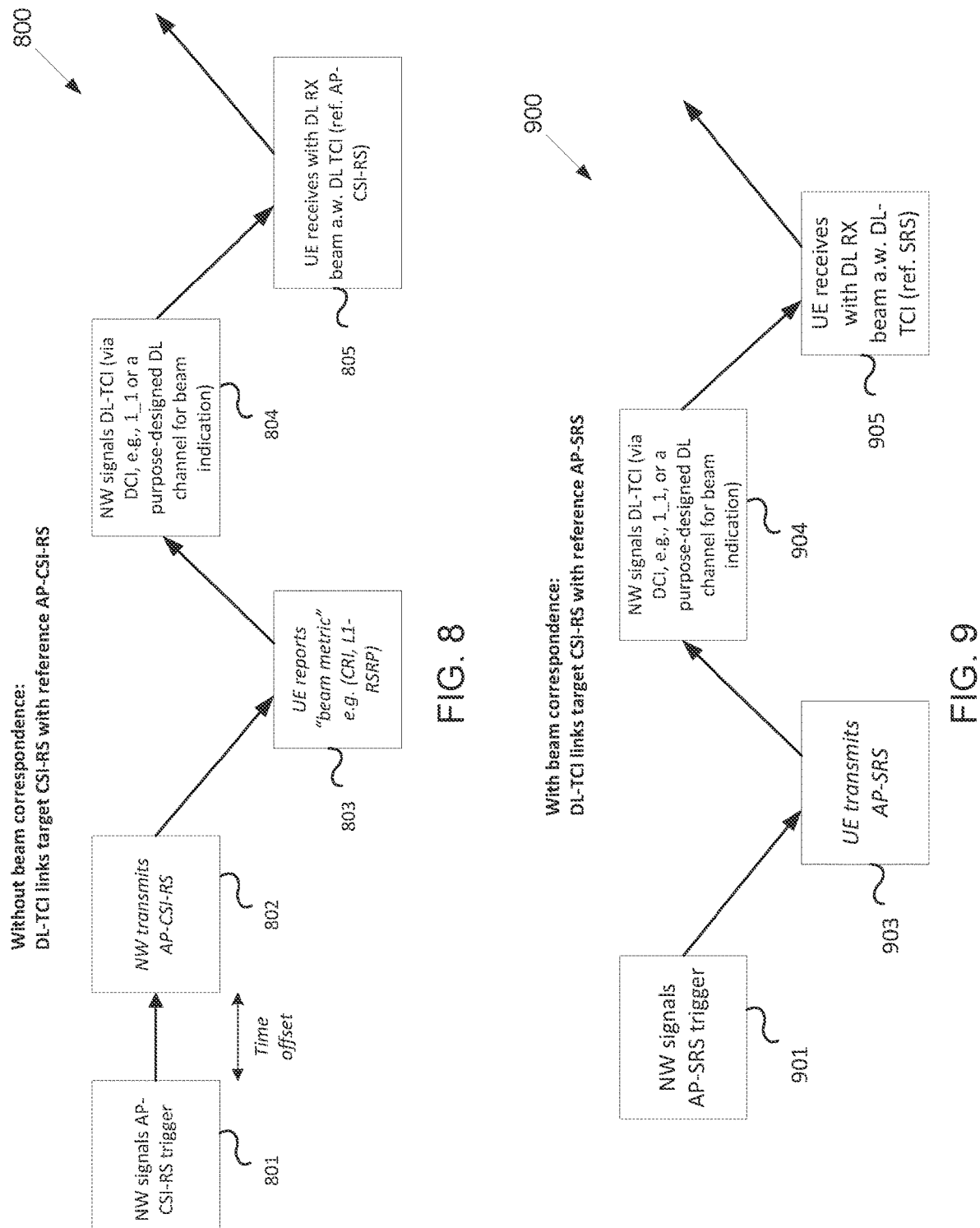

Without beam correspondence:
DL-TCI links target CSI-RS with reference AP-CSI-RS

800

NW signals AP-CSI-RS trigger

801

Time offset

NW transmits AP-CSI-RS

802

UE reports "beam metric" e.g. (CRI, L1-RSRP)

803

NW signals DL-TCI (via DCI, e.g., 1_1 or a purpose-designed DL channel for beam indication)

804

UE receives with DL RX beam a.w. DL TCI (ref. AP-CSI-RS)

With beam correspondence:
DL-TCI links target CSI-RS with reference AP-SRS

900

NW signals AP-SRS trigger

901

UE transmits AP-SRS

903

NW signals DL-TCI (via DCI, e.g., 1_1 or a purpose-designed DL channel for beam indication)

904

UE receives with DL RX beam a.w. DL-TCI (ref. SRS)

Example3: PDSCH starts before T1 and PUCCH stars after T1

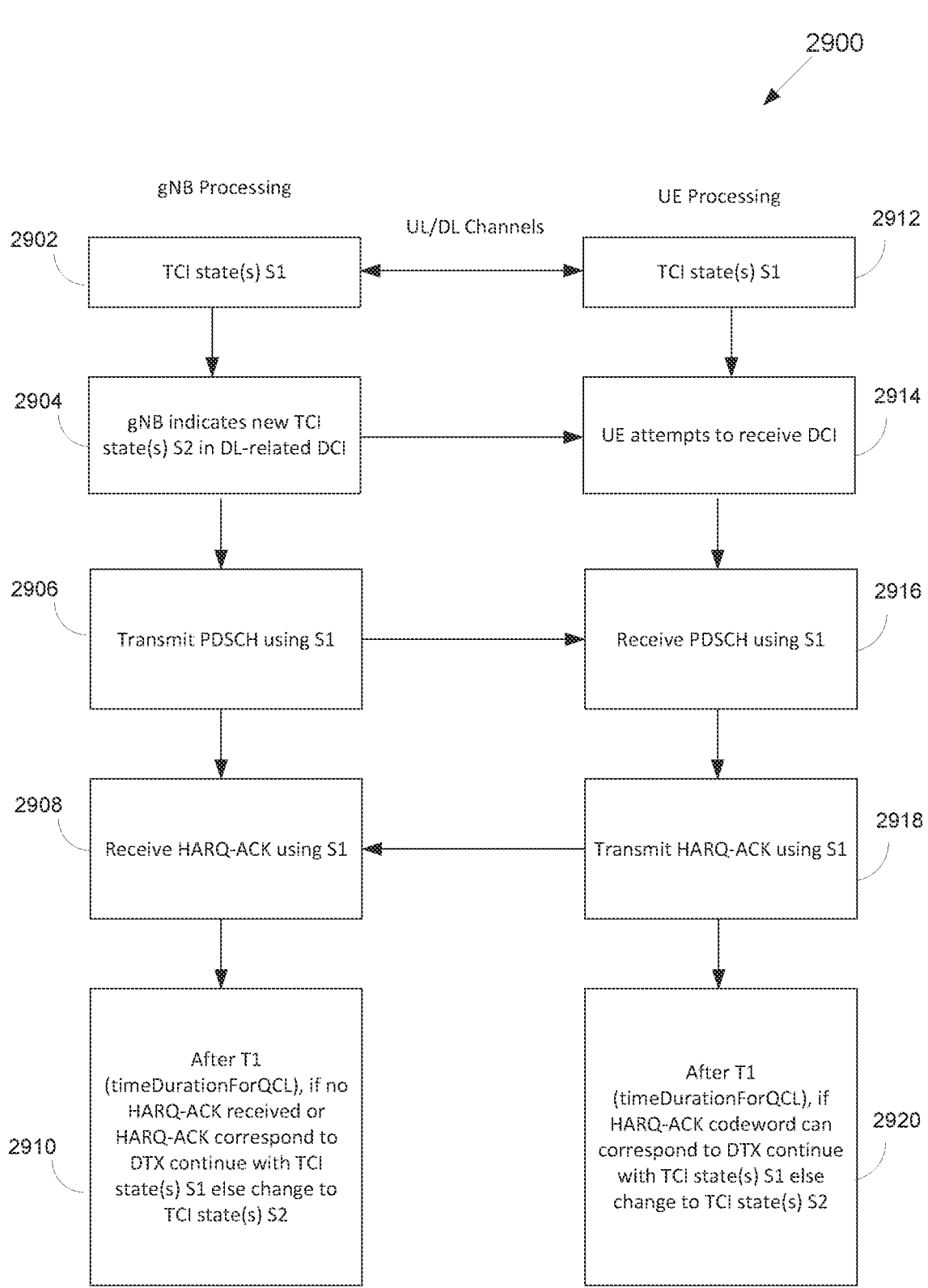

2900 gNB Processing

UL/DL Channels

UE Processing

2902 — TCI state(s) S1

2912 — TCI state(s) S1

2904 — gNB indicates new TCI state(s) S2 in DL-related DCI

2914 — UE attempts to receive DCI

2906 — Transmit PDSCH using S1

2916 — Receive PDSCH using S1

2908 — Receive HARQ-ACK using S1

2918 — Transmit HARQ-ACK using S1

2910 — After T1 (timeDurationForQCL), if no HARQ-ACK received or HARQ-ACK correspond to DTX continue with TCI state(s) S1 else change to TCI state(s) S2

2920 — After T1 (timeDurationForQCL), if HARQ-ACK codeword can correspond to DTX continue with TCI state(s) S1 else change to TCI state(s) S2

METHODS AND APPARATUSES FOR PHYSICAL LAYER BEAM INDICATIONS

CROSS-REFERENCE TO RELATED APPLICATIONS AND CLAIM OF PRIORITY

This application is a continuation of U.S. patent application Ser. No. 17/305,050, filed on Jun. 29, 2021, which claims priority to: U.S. Provisional Patent Application No. 63/049,403, filed on Jul. 8, 2020; U.S. Provisional Patent Application No. 63/054,514, filed on Jul. 21, 2020; U.S. Provisional Patent Application No. 63/110,727, filed on Nov. 6, 2020; U.S. Provisional Patent Application No. 63/123,224, filed on Dec. 9, 2020; U.S. Provisional Patent Application No. 63/135,985, filed on Jan. 11, 2021; and U.S. Provisional Patent Application No. 63/140,755, filed on Jan. 22, 2021. The content of the above-identified patent document is incorporated herein by reference.

TECHNICAL FIELD

The present disclosure relates generally to wireless communication systems and, more specifically, the present disclosure relates to physical layer beam indications.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to physical layer beam indications.

In one embodiment, a user equipment (UE) is provided. The UE includes a transceiver configured to: receive one or more first transmission configuration indicator (TCI) states for reception and transmission of downlink (DL) channels and uplink (UL) channels, respectively; receive one or more TCI state identifiers (IDs), on a DL related downlink control information (DCI) format or an UL related DCI format, using the one or more first TCI states; receive and transmit channels associated with the DL related DCI format or the UL related DCI format using the one or more first TCI states; and transmit an acknowledgement in response to the reception of the one or more TCI state IDs. The UE further includes a processor operably connected to the transceiver. The processor is configured, based on the acknowledgment, to determine, based on the one or more TCI state IDs, one or more second TCI states; determine a time to apply the one or more second TCI states; and update one or more spatial filters based on the one or more second TCI states. The transceiver is further configured, based on the acknowledgement, to receive and transmit data on the DL channels and UL channels, respectively, using the one or more spatial filters starting at the determined time.

In another embodiment, a base station (BS) is provided. The BS includes a transceiver configured to transmit one or more first TCI states for transmission and reception of DL channels and UL channels, respectively. The BS also includes a processor operably connected to the transceiver. The processor configured to determine one or more second TCI states and corresponding one or more TCI state IDs. The transceiver is further configured to transmit the one or more TCI state IDs, on one of a DL related DCI format or an UL related DCI format, using the one or more first TCI states; transmit and receive channels associated with the DL related DCI format or the UL related DCI format using one or more first TCI states; and receive an acknowledgement in response to the transmission of the one or more TCI state IDs. The processor is further configured, based on the acknowledgment, to determine a time to apply the one or more second TCI states; and update one or more spatial filters based on the one or more second TCI states. The transceiver is further configured, based on the acknowledgment, to transmit and receive data on the DL channels and UL channels, respectively, using the one or more spatial filters starting at the determined time.

In yet another embodiment, a method for operating a UE is provided. The method includes receiving one or more first TCI states for reception and transmission of DL channels and UL channels, respectively; receiving one or more TCI state IDs, on a DL related DCI format or an UL related DCI format, using the one or more first TCI states; receiving and transmitting channels associated with the DL related DCI format or the UL related DCI format using the one or more first TCI states; and transmitting an acknowledgement in response to the reception of the one or more TCI state IDs. The method further includes, based on the acknowledgement: determining, based on the one or more TCI state IDs, one or more second TCI states; determining a time to apply the one or more second TCI states; and updating one or more spatial filters based on the one or more second TCI states. The method further includes receiving and transmitting data on the DL channels and UL channels, respectively, using the one or more spatial filters starting at the determined time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a flowchart of a method for a DL multi-beam operation according to embodiments of the present disclosure;

FIG. 9 illustrates another flowchart of a method for a DL multi-beam operation according to embodiments of the present disclosure;

FIG. 29 illustrates another flowchart of a method for gNB and UE processing according to embodiments of the present disclosure;

DETAILED DESCRIPTION

FIG. 1 through FIG. 37, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.5.0, "NR; Physical channels and modulation"; 3GPP TS 38.212 v16.5.0, "NR; Multiplexing and Channel coding"; 3GPP TS 38.213 v16.5.0, "NR; Physical Layer Procedures for Control"; 3GPP TS 38.214 v16.5.0, "NR; Physical Layer Procedures for Data"; 3GPP TS 38.321 v16.4.0, "NR; Medium Access Control (MAC) protocol specification"; and 3GPP TS 38.331 v16.4.1, "NR; Radio Resource Control (RRC) Protocol Specification."

Figure 1:
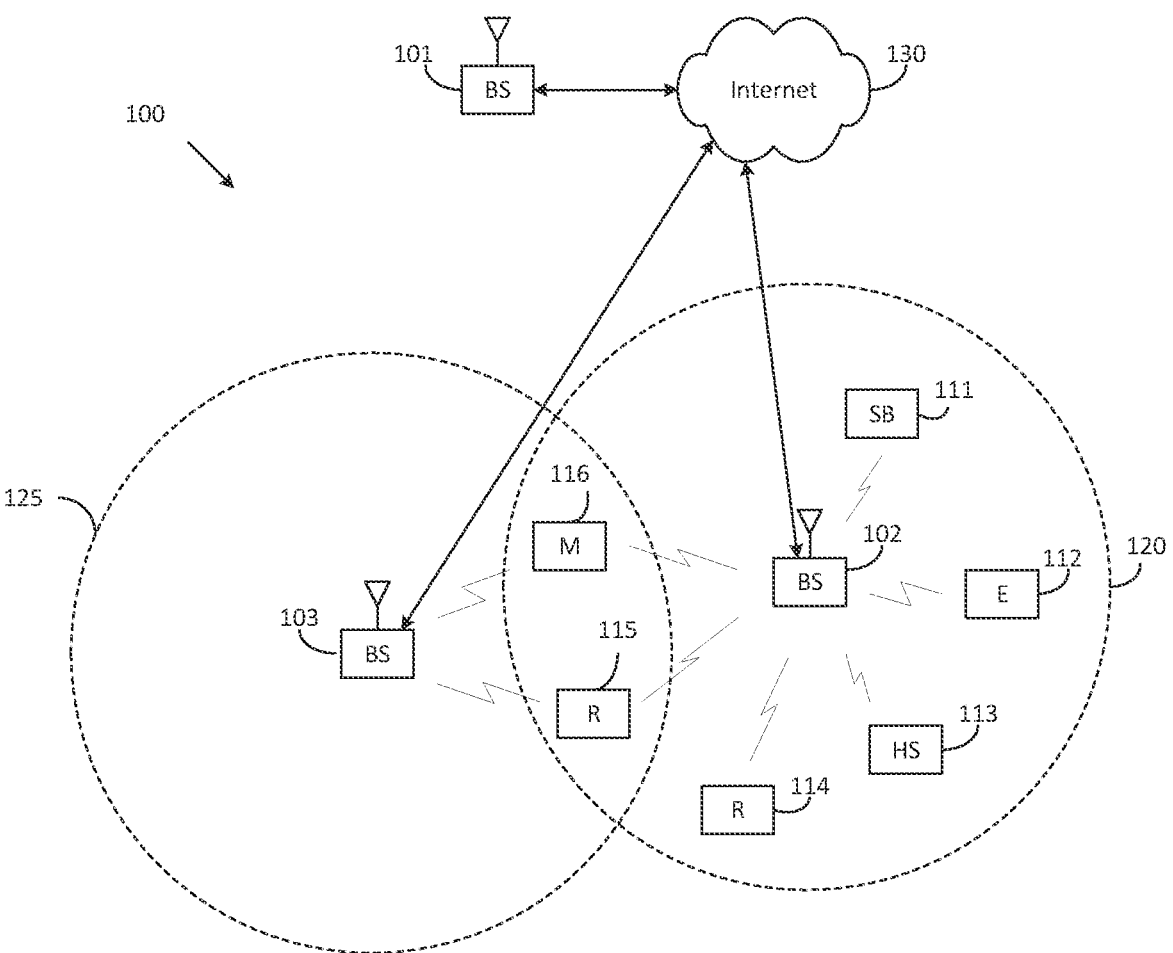
FIG. 1 illustrates an example wireless network according to embodiments of the present disclosure.
Figure 2:
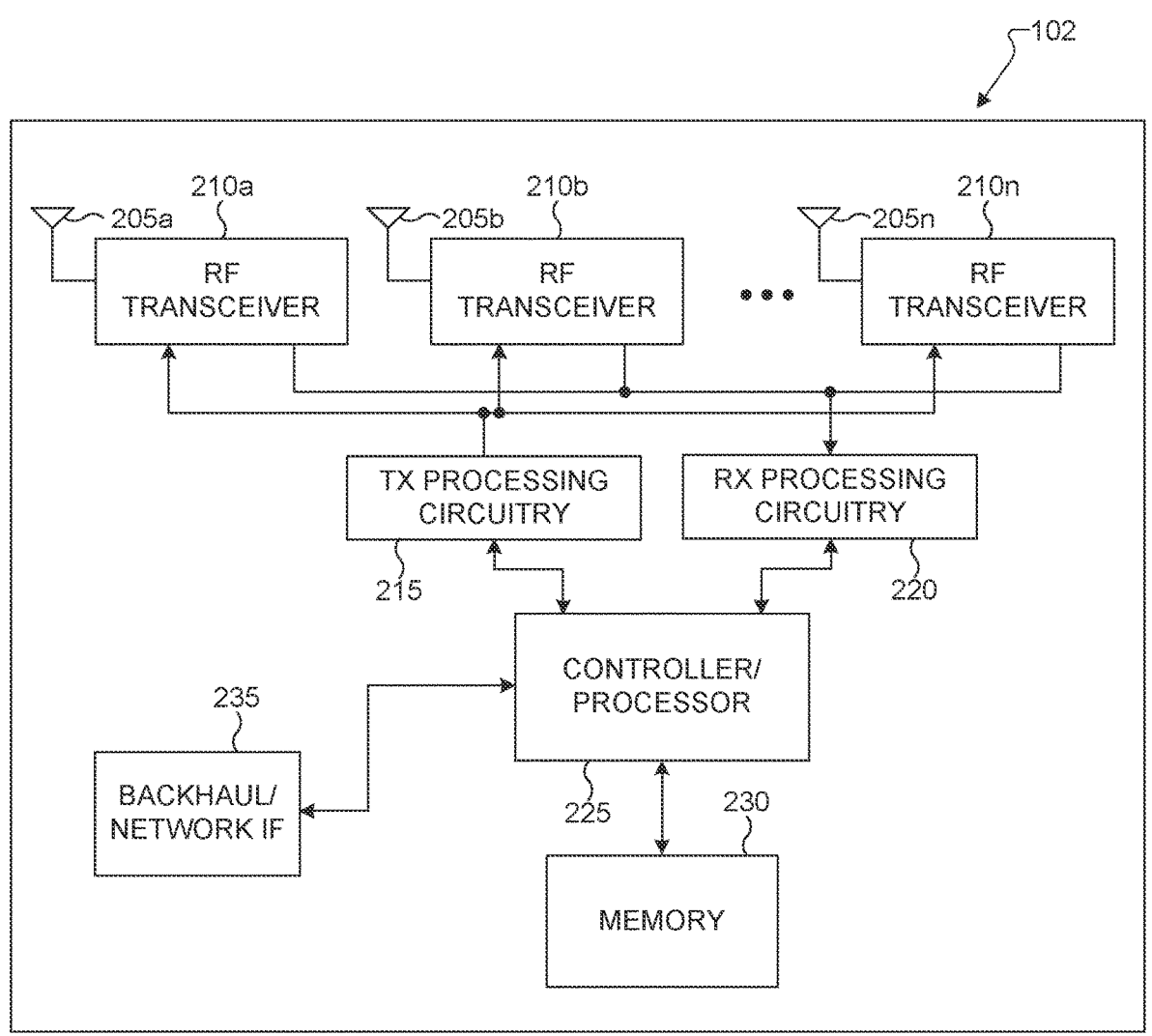
FIG. 2 illustrates an example gNB according to embodiments of the present disclosure.
Figure 3:
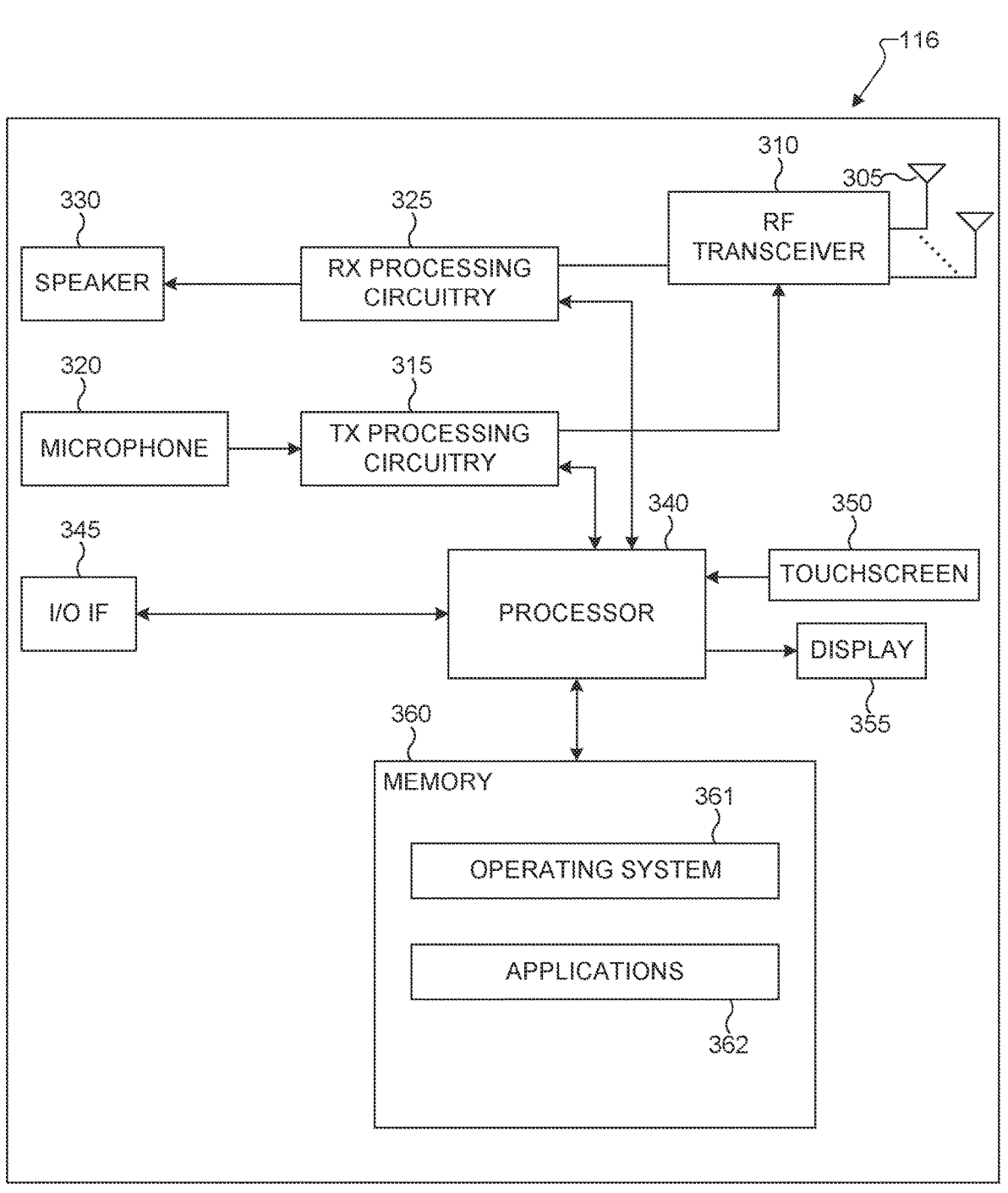
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for physical layer beam indications. In certain embodiments, and one or more of the gNBs 101-103 includes circuitry, programing, or a combination thereof, for physical layer beam indications.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for physical layer beam indications. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figures 4, 5:
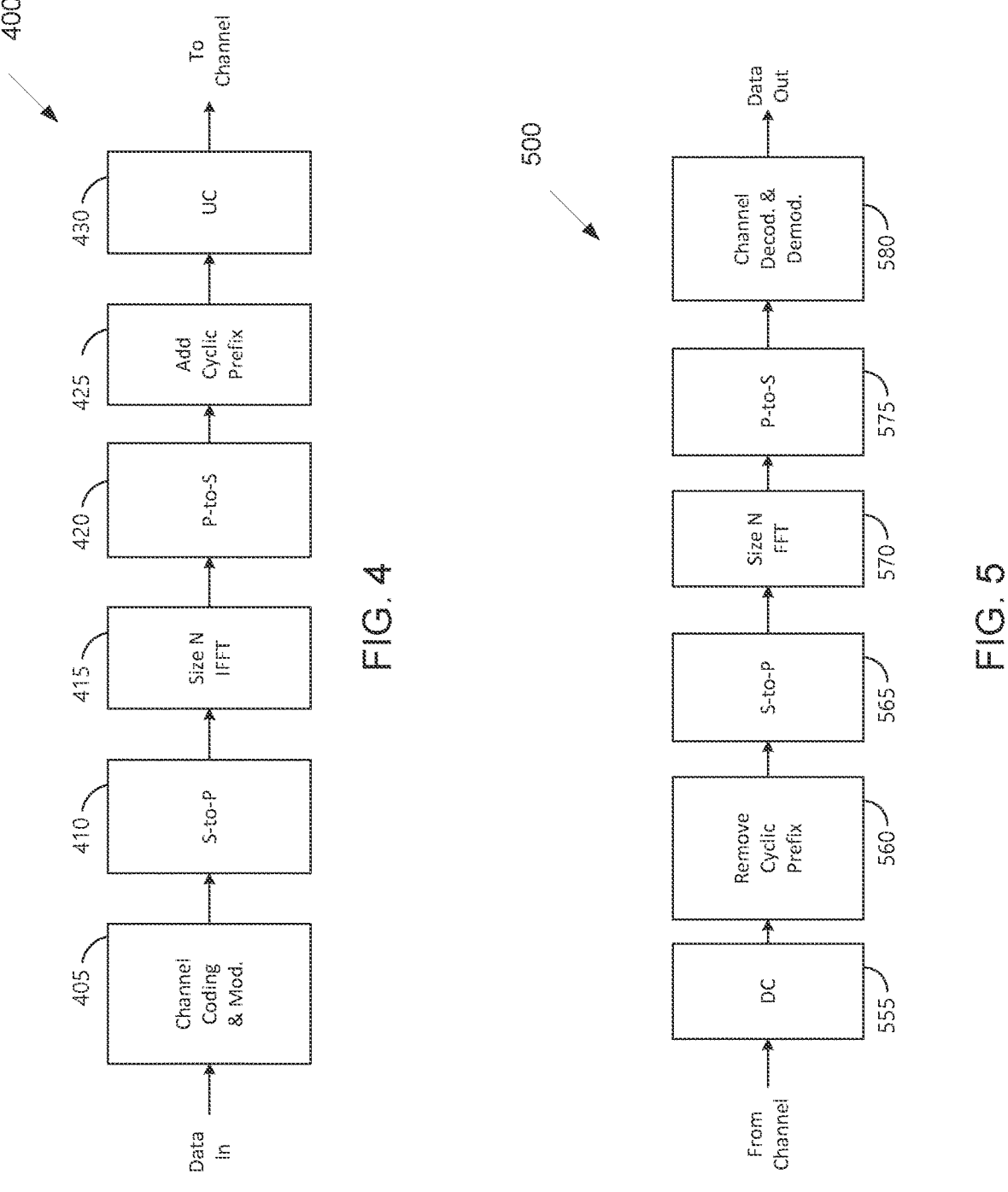
FIGS. 4 and 5 illustrate example wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
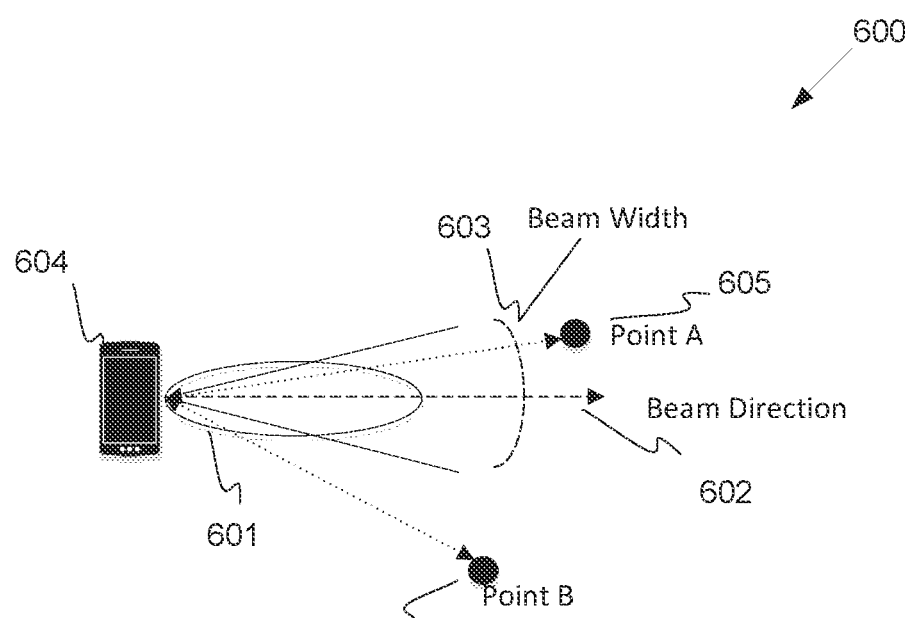
FIG. 6A illustrates an example of a beam in a wireless system according to embodiments of the present disclosure.

FIG. 6A illustrate an example of a beam in a wireless system 600 according to embodiments of the present disclosure. An embodiment of the beam shown in FIG. 6A is for illustration only.

As illustrated in FIG. 6A, in the wireless system 600, a beam 601, for a device 604, can be characterized by a beam direction 602 and a beam width 603. For example, a device 604 with a transmitter transmits RF energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604. A device at point B (606) cannot receive from and transmit to device (604) as Point B is outside a beam width and direction of a beam from device (604). While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
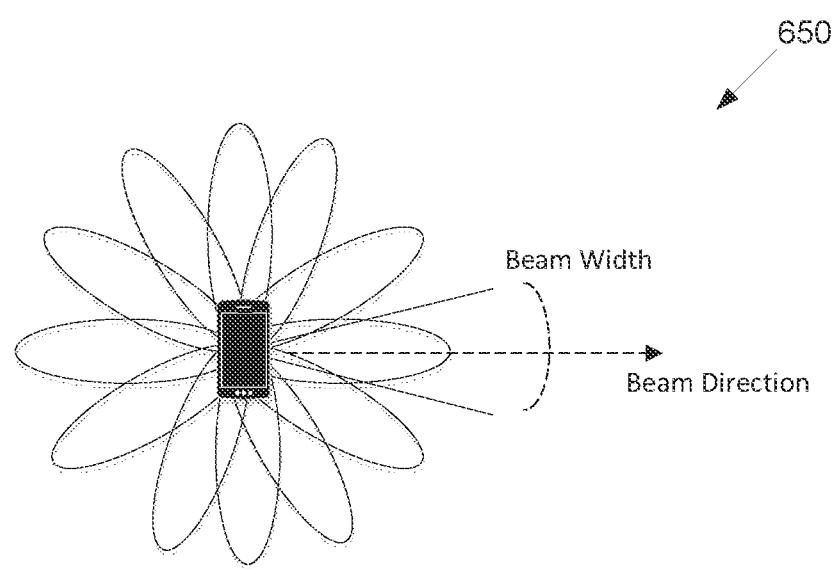
FIG. 6B illustrates an example multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
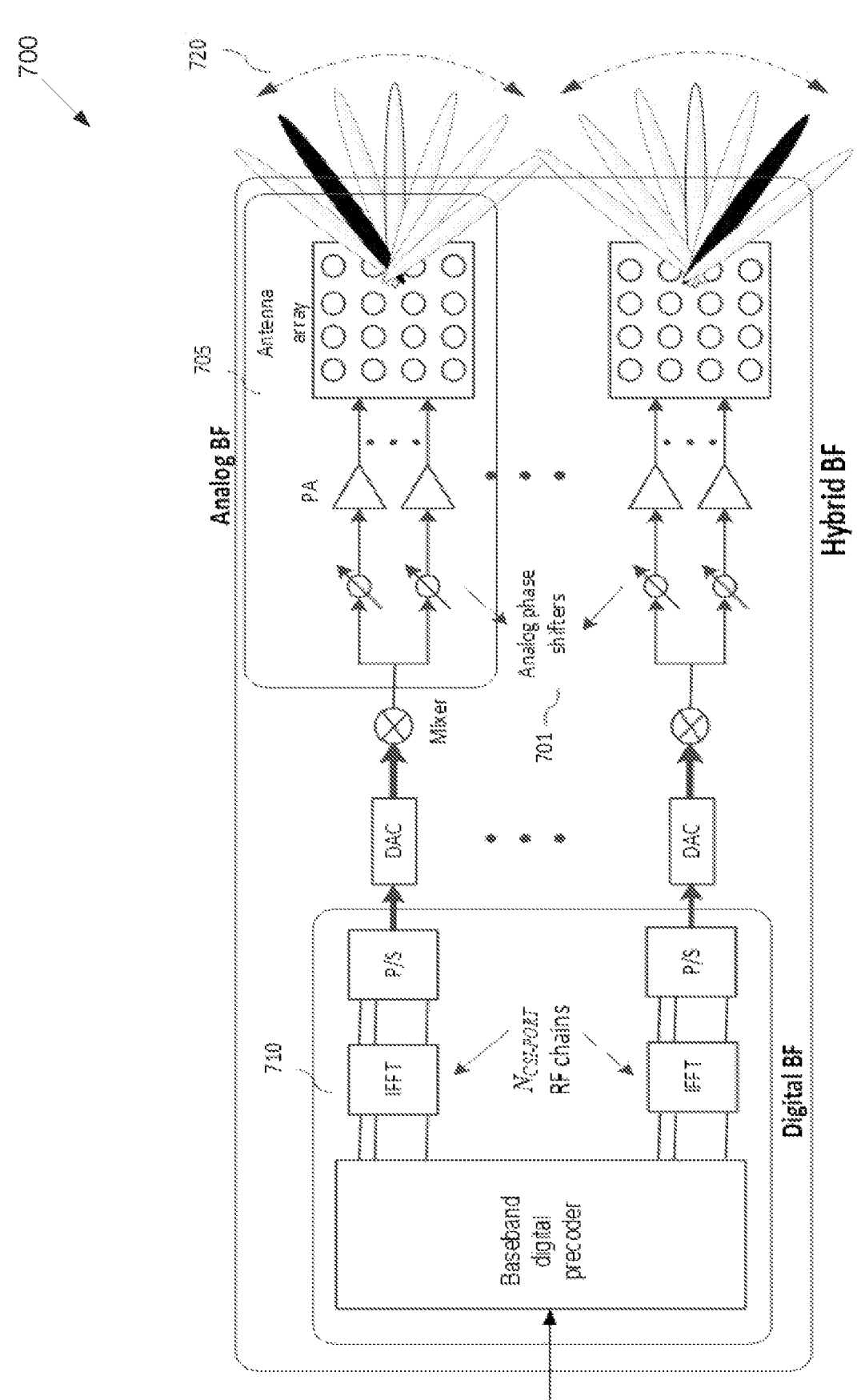
FIG. 7 illustrates an example antenna structure according to embodiments of the present disclosure.

FIG. 7 illustrates an example antenna structure 700 according to embodiments of the present disclosure. An embodiment of the antenna structure 700 shown in FIG. 7 is for illustration only. For example, the antenna structure 700 may be present in a wireless communication device, such as, for example, the UE 116 or the gNB 102 in FIG. 1.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The described system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

To improve the efficiency of beam management, the following concepts have been provided: (i) L1 based beam common or joint indication of transmission configuration indicator (TCI) state, for data and control channels and for downlink and uplink channel with beam correspondence at the UE. The L1 based beam indication can be included in a DL related DCI, e.g., DCI Format 1_0 or DCI Format 1_1 or DCI Format 1_2, (e.g., DCI with downlink assignments or DCI without downlink assignment), an UL related DCI, e.g., DCI Format 0_0 or DCI Format 0_1 or DCI Format 0_2, (e.g., DCI with UL grant or DCI without UL grant), or a dedicated DCI for TCI, (e.g., TCI DCI—if conveying DL and UL TCI, or DL TCI DCI—if conveying DL TCI, or UL DCI TCI if conveying UL TCI); (ii) a group UE TCI indication, wherein a DCI conveys a TCI to a group of UEs; and (iii) two stage TCI beam indication, wherein a TCI is conveyed through a first stage/part TCI indication and a second stage/part TCI indication.

One of the unique characteristics of high speed train (HST), in addition to the fact that users are moving at a high speed (e.g., 500 km/hr) is that users move along a fixed, known and repeatable trajectory. Considering the following example (TR 38.913 section 6.1.5): (i) remote radio head (RRH) or a TRP or a gNB or base station located at a distance of 5 meters from the railway track; (ii) train carriage with width 3.38 m and train carriage length of 20 m; (iii) assume that the users in one carriage (or part of a carriage) form a UE group, with a lead UE for the group located in or near the middle of the carriage (or part of the carriage); (iv) the train is assumed to be travelling at a speed of 125 m/s (i.e., 450 km/hr).

In the following, both FDD and TDD are considered as a duplex method for DL and UL signaling. Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in 3GPP standard Specification Rel-15 NR, a beam report includes at least one layer 1-reference signal receive power (L1-RSRP) accompanied by at least one CSI-RS resource indicator (CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS or can be configured with a certain time-domain behavior, such as a periodicity and offset in case of periodic RS or can be a combination of such configuration and activation/deactivation in case of semi-persistent RS.

For mmWave bands, FR2 (which may include two ranges under a FR2 common range: FR2-1 for 24.25-52.6 GHz and FR2-2 for 52.6-71 GHz), and/or for higher frequency bands (such as >52.6 GHz) where multi-beam operation is especially relevant, a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs.

Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence. In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

FIG. 8 illustrates a flowchart of a method 800 for a DL multi-beam operation according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In one example, as illustrated in FIG. 8 (embodiment A-1), a DL multi-beam operation of method 800 starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated L1-RSRP/L1-RSRQ/L1-SINR/CQI.

Upon receiving the beam report from the UE, the gNB/NW can use the beam report to select a DL RX beam for the UE and indicate the DL RX beam selection (step 804) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

FIG. 9 illustrates another flowchart of a method 900 for a DL multi-beam operation according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In another example, as illustrated in FIG. 9 (embodiment A-2), a DL multi-beam operation of method 900 starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

For this embodiment (A-2), as described above, the UE selects the DL RX beam based on the UL TX beam associated with the reference RS (AP-SRS) index signaled via the TCI-state field.

Similar, for a UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping," and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS and a UE receives and measures the CSI-RS. This embodiment can be used, for instance, at least when there is reciprocity between the UL and DL beam-pair-link (BPL). This condition is termed "UL-DL beam correspondence."

In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

Figures 10, 11:
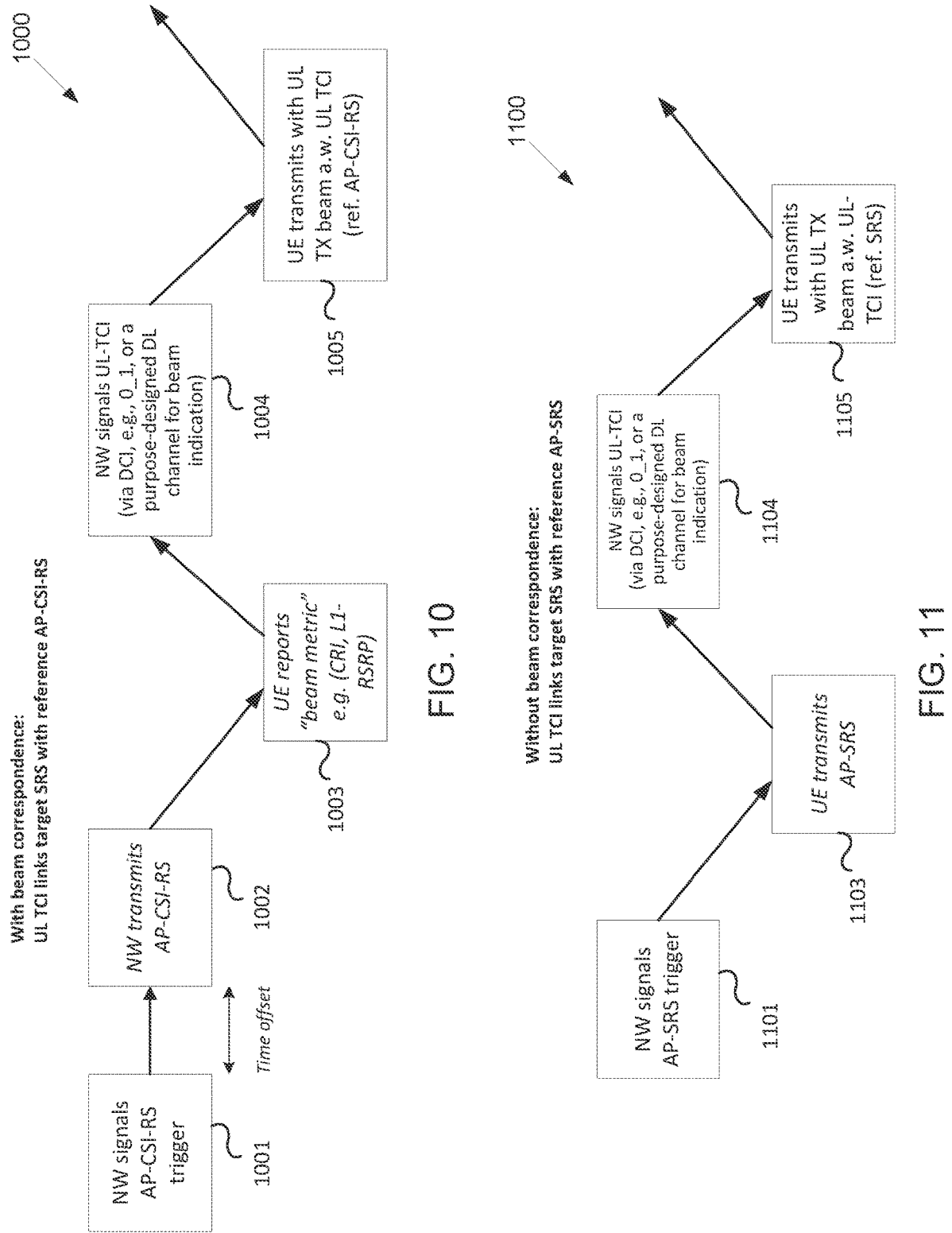
FIG. 10 illustrates a flowchart of a method for a UL multi-beam operation according to embodiments of the present disclosure.
FIG. 11 illustrates another flowchart of a method for a UL multi-beam operation according to embodiments of the present disclosure.

FIG. 10 illustrates a flowchart of a method 1000 for a UL multi-beam operation according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In one example, as illustrated in FIG. 10 (embodiment B-1), an UL multi-beam operation of method 1000 starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CRI or SSB resource indicator (SSB-RI) together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 105).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

FIG. 11 illustrates another flowchart of a method 1100 for a UL multi-beam operation according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In another example, as illustrated in FIG. 11 (embodiment B-2), an UL multi-beam operation of method 1100 starts with the gNB/NW signaling to a UE an aperiodic SRS (AP-SRS) trigger or request (step 1101). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105).

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105).

For this embodiment (B-2), as described above, the UE selects the UL TX beam from the reference RS (in this case SRS) index signaled via the value of the TCI-state field.

In any of the following components, examples and sub-examples, flowcharts and diagrams maybe used for illustrative purposes. The present disclosure covers any possible variation of the flowcharts and diagrams as long as at least some of the components are included.

In the following examples, a TCI DCI is a downlink control channel transmission on a PDCCH channel carrying beam indication information e.g., TCI state information to one or multiple UEs. A TCI DCI can be a dedicated channel for beam indication information, i.e., a purposed designed DL channel for beam indication. TCI DCI can also be a dedicated DCI (specified for the purpose of beam indication or TCI state update) transmitted via PDCCH.

Figure 12:
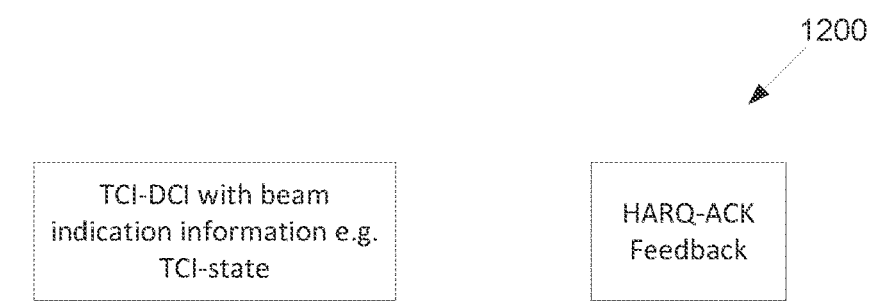
FIG. 12 illustrates an example TCI-DCI with beam indication and HARQ-ACK feedback according to embodiments of the present disclosure.

FIG. 12 illustrates an example TCI-DCI with beam indication and HARQ-ACK feedback 1200 according to embodiments of the present disclosure. An embodiment of the TCI-DCI with beam indication and HARQ-ACK feedback 1200 shown in FIG. 12 is for illustration only.

Beam indication information can also be included in a DL-related DCI (e.g. DCI Format 1_0 or DCI Format 1_1 or DCI Format 1_2 with or without a DL assignment) or in an UL-related DCI (e.g. DCI Format 0_0 or DCI Format 0_1 or DCI Format with or without an UL grant). A DL-related DCI (e.g. DCI Format 1_0 or DCI Format 1_1 or DCI Format 1_2) without a DL assignment can be considered a special case of a purpose-designed DCI for beam indication. An UL-related DCI (e.g. DCI Format 0_0 or DCI Format 0_1 or DCI Format 1_2) without an UL grant can be considered a special case of a purpose-designed DCI for beam indication. As illustrated in FIG. 12, a UE can transmit HARQ-ACK feedback in response to a TCI DCI. In this disclosure, the aspects related to the design of the HARQ-ACK feedback is provided. The beam indication information for a UE can include one or more of following examples.

In one example, DL TCI-state information, wherein the DL TCI-state information can be a single TCI-state for PDSCH and PDCCH or multiple TCI-states, for different physical entities, wherein a physical entity can be a component carrier, cell (e.g., PCell, SCell), frequency band, a frequency range, a BWP, a TRP, a base station antenna panel, a UE antenna panel, data/control physical channels and signals, etc. The DL TCI state can be common across some physical entities and distinct across other physical entities. Where "some" can include "all", "part of" or "none."

In another example, UL TCI-state information, wherein the UL TCI-state information can be a single TCI-state for PUSCH and PUCCH and possibly SRS or multiple TCI-states, for different physical entities, wherein a physical entity can be a component carrier, cell (e.g., PCell, SCell), frequency band, a frequency range, a BWP, a TRP, a base station antenna panel, a UE antenna panel, data/control physical channels and signals, etc. The UL TCI state can be common across some physical entities and distinct across other physical entities. Where "some" can include "all", "part of" or "none."

In yet another example, common TCI-state information (e.g., joint), wherein the DL TCI-state information can be a single TCI-state for UL and DL data and control channels and signals or multiple TCI-states, for different physical entities, wherein a physical entity can be a component carrier, cell (e.g., PCell, SCell), frequency band, a frequency range, a BWP, a TRP, a base station antenna panel, a UE antenna panel, data/control physical channels and signals, UL/DL physical channels and signals etc. The common TCI state can be common across some physical entities and distinct across other physical entities. Where "some" can include "all", "part of" or "none."

In yet another example, SRS resource indicator (SRI) for UL, wherein the SRI can be a single SRI for PUSCH and PUCCH and possibly SRS or multiple TCI-states, for different physical entities, wherein a physical entity can be a carrier, frequency band, a frequency range, a BWP, a TRP, a base station antenna panel, a UE antenna panel, data/control physical channel, etc. The SRI can be common across some physical entities and distinct across other physical entities. Where "some" can include "all", "part of" or "none."

In the following examples in regard to the number of DCI stages, it may be considered two designs: (1) a single-stage/part DCI design, wherein beam indication information is transmitted in one DCI stage/part (e.g., as contrasted with U.S. patent application Ser. No. 17/249,115 filed Feb. 19, 2021 incorporated herein by reference); or (2) a two-stage/part DCI design, wherein beam indication information is transmitted across two DCI parts/stages. A first stage/part DCI for beam indication information and a second stage/part DCI for beam indication information (e.g., as contrasted with U.S. patent application Ser. No. 17/249,115 filed Feb. 19, 2021 incorporated herein by reference).

In the following examples in regard to the number of UEs addressed (beam indication configured for) by a TCI DCI, it may consider two designs: (1) a single UE is addressed by a TCI DCI, i.e., the TCI DCI includes the beam indication information of one UE; or (2) multiple UEs are addressed by a TCI DCI, i.e., the TCI DCI includes the beam indication information of more than one UE (e.g., as contrasted with U.S. patent application Ser. No. 17/151,051 filed Jan. 15, 2021 incorporated herein by reference).

In one embodiment (component 1), HARQ-ACK information in response to a TCI DCI is provided.

In one example 1.1, a TCI DCI includes beam indication information for a single UE, and the TCI DCI has a single stage/part. The beam (spatial filter) used to transmit (at the gNB) or receive (at the UE) the TCI DCI can be a wider beam (spatial filter) than the beam (spatial filter) used to transmit or receive other data and control channels and signals, alternatively multiple beams or one or more of multiple beams are used for the transmission of the TCI DCI, at the UE multiple Rx beams or blind decoding across multiple Rx beam hypothesis can be used to receive the TCI DCI. (e.g., as contrasted with U.S. patent application Ser. No. 17/148,517 filed Jan. 13, 2021 incorporated herein by reference and U.S. patent application Ser. No. 17/151,051 filed Jan. 15, 2021 incorporated herein by reference). Alternatively, the beam (spatial filter) used to transmit (at the gNB) or receive (at the UE) the TCI DCI can be the same beam (spatial filter) used to transmit or receive other data and control channels and signals.

In the following examples, there is an initial transmission of a TCI DCI and retransmission(s) of TCI DCI. In one example, an initial TCI DCI transmission and a subsequent TCI DCI (re)-transmission(s) use a same Tx beam (spatial domain transmission filter) at the gNB or a same Rx beam (spatial domain reception filter) at the UE. In another example, an initial TCI DCI transmission uses a first Tx beam, each subsequent TCI DCI (re)transmission can use a different Tx beam (spatial domain transmission filter) and different Rx beams (spatial domain reception filter) at the UE, wherein a sequence of Tx beams (Rx beams at the UE), for the initial transmission and (re)transmissions is configured/updated to the UE by RRC signaling and/or MAC CE signaling and/or L1 control signaling.

In another example, an initial TCI DCI transmission uses a Tx beam, each subsequent TCI DCI (re)transmission can use a different Tx beam, wherein a sequence of Tx beams at the gNB and Rx beams at the UE for the initial transmission and (re)transmissions is determined by the gNB/Network. In this case, the beams can correspond to a set of (pre-) configured TCI states for TCI DCI.

In one example 1.1.1, a TCI DCI is event-triggered and transmitted, e.g., if a gNB/network determines a change in beam indication information a TCI DCI is transmitted to a UE. A UE that successfully receives and decodes a TCI DCI transmits a positive acknowledgement (positive HARQ-ACK) to the gNB/network. Otherwise, a UE that does not successfully decode a TCI DCI, does not transmit any feedback (DTX in this case) to the gNB/network. For the HARQ-ACK codebook a UE can transmit NACK in case of a DTX.

Figure 13:
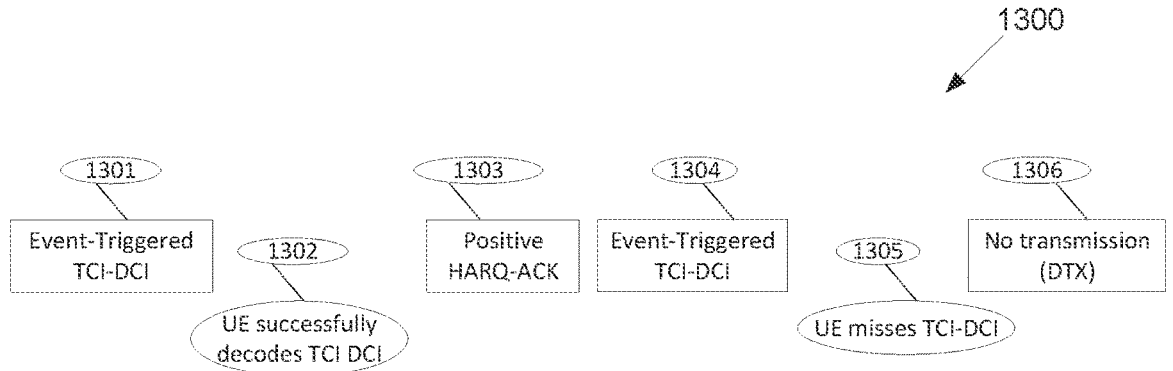
FIG. 13 illustrates an example TCI-DCI transmission according to embodiments of the present disclosure.

FIG. 13 illustrates an example TCI-DCI transmission 1300 according to embodiments of the present disclosure. An embodiment of the TCI-DCI transmission 1300 shown in FIG. 13 is for illustration only.

As illustrated in FIG. 13, at step 1301, a first event-triggered TCI DCI transmission is triggered. A UE successfully receives and decodes the first event-triggered TCI DCI in step 1302. In step 1303, a positive HARQ-ACK feedback is sent by the UE. In step 1304 a second event-triggered TCI DCI transmission is triggered. In step 1305, a UE misses the second event-triggered TCI DCI. In step 1306, no HARQ-ACK feedback is provided by the UE, i.e., DTX for HARQ-ACK feedback. For the HARQ-ACK codebook a UE can transmit NACK in case of a DTX.

If a gNB/network does not receive HARQ-ACK feedback for an event-triggered TCI DCI, either: the gNB/network retransmits the same TCI DCI (e.g., using the same beam (spatial domain transmission filter)); or the gNB/network can retransmit the same TCI DCI (e.g., using the same beam) or a new TCI DCI (e.g., using a different beam or the same beam).

A maximum number of retransmissions of TCI DCI and/or a maximum number of new transmissions of TCI DCI until a gNB/NW receives positive HARQ-ACK feedback, in response to the transmission/retransmission of TCI DCI, can be specified in system specifications and/or configured/ updated by RRC signaling and/or configured/updated by MAC CE signaling and/or L1 control signaling. The configuration/update can be UE-specific and/or UE-group specific and/or cell-specific.

It can be specified in the system specifications and/or configured/updated by RRC signaling and/or configured/ updated by MAC CE signaling and/or L1 control signaling or left to gNB implementation whether a gNB/network can provide a same TCI DCI and/or a new TCI DCI in response to no HARQ-ACK feedback (DTX). The configuration/ update can be UE-specific and/or UE-group specific and/or cell-specific.

If a gNB/network does not receive a positive HARQ-ACK feedback before the specified/configured/updated maximum number of transmissions/retransmissions is reached: a gNB/network can declare a radio link failure; or alternatively, a gNB/network can try transmitting a TCI DCI on a different beam.

In another example 1.1.2, a TCI DCI has configured time-frequency resources, a gNB/network transmits beam indication information in the configured resources of a TCI DCI. In this example, if there is no change in beam information, a same previously transmitted beam indication information is transmitted in the configured resources of a TCI DCI. If there is a change in beam information, a new beam indication information is transmitted in the configured resources of a TCI DCI. A UE can attempt to receive and decode a TCI DCI in the configured resources of the TCI DCI. A UE that successfully receives and decodes a TCI DCI transmits a positive acknowledgement (positive HARQ-ACK) to the gNB/network. Otherwise, a UE that does not successfully decode a TCI DCI: (1) transmits a negative acknowledgement (negative HARQ-ACK or NACK) to the gNB/network; or (2) alternatively, the UE does not transmit any feedback (DTX in this case) to the gNB/network. For the HARQ-ACK codebook a UE can transmit NACK in case of a DTX.

It can be specified in the system specifications and/or configured/updated by RRC signaling and/or configured/ updated by MAC CE signaling and/or L1 control signaling whether a UE provides negative HARQ-ACK feedback or DTX when the UE fails to decode a TCI DCI in a configured TCI DCI resource. The configuration/update can be UE-specific and/or UE-group specific and/or cell-specific.

Figure 14:
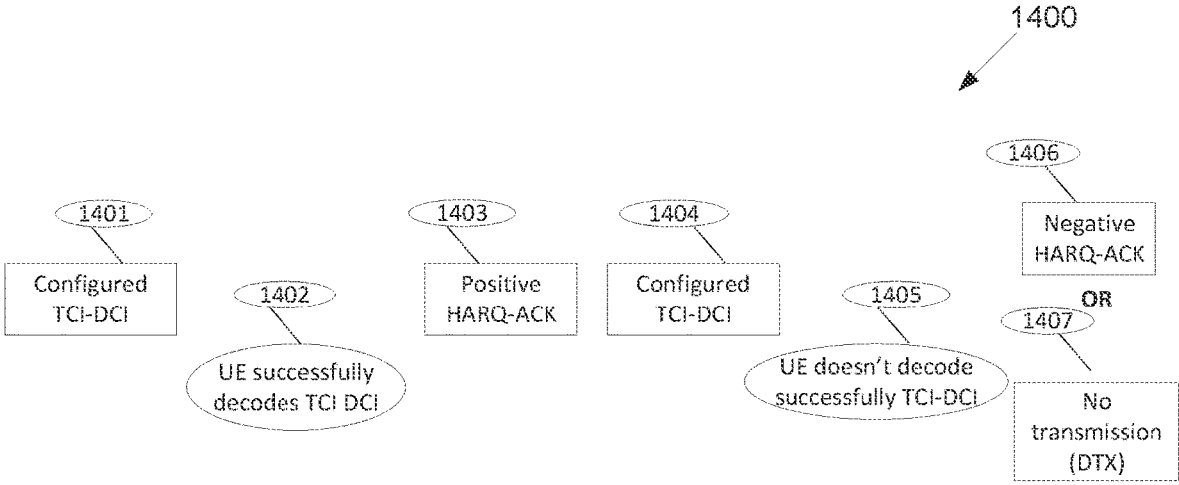
FIG. 14 illustrates another example TCI-DCI transmission according to embodiments of the present disclosure.

FIG. 14 illustrates another example TCI-DCI transmission 1400 according to embodiments of the present disclosure. An embodiment of the TCI-DCI transmission 1400 shown in FIG. 14 is for illustration only.

As illustrated in FIG. 14, in step 1401, a first configured TCI DCI transmission is triggered. A UE successfully receives and decodes the first configured TCI DCI in step 1402. In step 1403, a positive HARQ-ACK feedback is sent by the UE. In step 1404, a second configured TCI DCI transmission is triggered. In step 1405, a UE attempts to receive but does not successfully decode the second configured TCI DCI. In 1406/1407, a UE can be either provide a negative HARQ-ACK feedback (1406), or no HARQ-ACK feedback, i.e., DTX (1407).

If a gNB/network does not receive positive HARQ-ACK feedback for a TCI DCI on a configured resource, either: the gNB/network retransmits the same TCI DCI (e.g., using the same beam); or the gNB/network can retransmit the same TCI DCI (e.g., using the same beam) or a new TCI DCI (e.g., using a different beam or the same beam).

A maximum number of retransmissions of TCI DCI and/or a maximum number of new transmissions of TCI DCI until a gNB/Network receives positive HARQ-ACK feedback, in response to the transmission/retransmission of TCI DCI, can be specified in system specifications and/or configured/updated by RRC signaling and/or configured/updated by MAC CE signaling and/or L1 control signaling. The configuration/update can be UE-specific and/or UE-group specific and/or cell-specific.

It can be specified in the system specifications and/or configured/updated by RRC signaling and/or configured/updated by MAC CE signaling and/or L1 control signaling or left to gNB implementation whether a gNB/network can provide a same TCI DCI and/or a new TCI DCI in response to negative HARQ-ACK feedback or no HARQ-ACK feedback (DTX). The configuration/update can be UE-specific and/or UE-group specific and/or cell-specific.

If a gNB/network does not receive a positive HARQ-ACK feedback before the specified/configured/updated maximum number of transmissions/retransmissions is reached: (1) a gNB/network can declare a radio link failure; or alternatively, a gNB/network can try transmitting a TCI DCI on a different beam.

In another example 1.1.3, a TCI DCI has configured time-frequency resources, a gNB/network transmits beam indication information in the configured resources of a TCI DCI, in case of new beam indication information. In this example, if there is no change in beam information, there is no TCI DCI transmission on a configured TCI DCI resource. If there is a change in beam information, a new beam indication information is transmitted in the configured resources of a TCI DCI. A UE can attempt to receive and decode a TCI DCI in the configured resources of the TCI DCI. A UE that successfully receives and decodes a TCI DCI transmits a positive acknowledgement (positive HARQ-ACK) to the gNB/network. Otherwise, a UE that does not successfully decode a TCI DCI: (1) transmits a negative acknowledgement (negative HARQ-ACK or NACK) to the gNB/network; (2) alternatively, the UE does not transmit any feedback (DTX in this case) to the gNB/network, for the HARQ-ACK codebook a UE can transmit NACK in case of a DTX; or (3) alternatively, the UE measures a signal quality, e.g., RSRP, or SINR, of a configured TCI DCI resource if the signal quality is above a threshold the UE transmits a negative acknowledgement, else the UE provides no HARQ-ACK feedback (DTX).

It can be specified in the system specifications and/or configured/updated by RRC signaling and/or configured/updated by MAC CE signaling and/or L1 control signaling whether a UE provides negative HARQ-ACK feedback or DTX or negative HARQ-ACK feedback/DTX depending on the signal quality when the UE fails to decode a TCI DCI in a configured TCI DCI resource. The configuration/update can be UE-specific and/or UE-group specific and/or cell-specific. Furthermore, the threshold for the signal quality, if applicable, can be configured/updated by RRC signaling and/or configured/updated by MAC CE signaling and/or L1 control signaling. The configuration/update can be UE-specific and/or UE-group specific and/or cell-specific.

Figure 15:
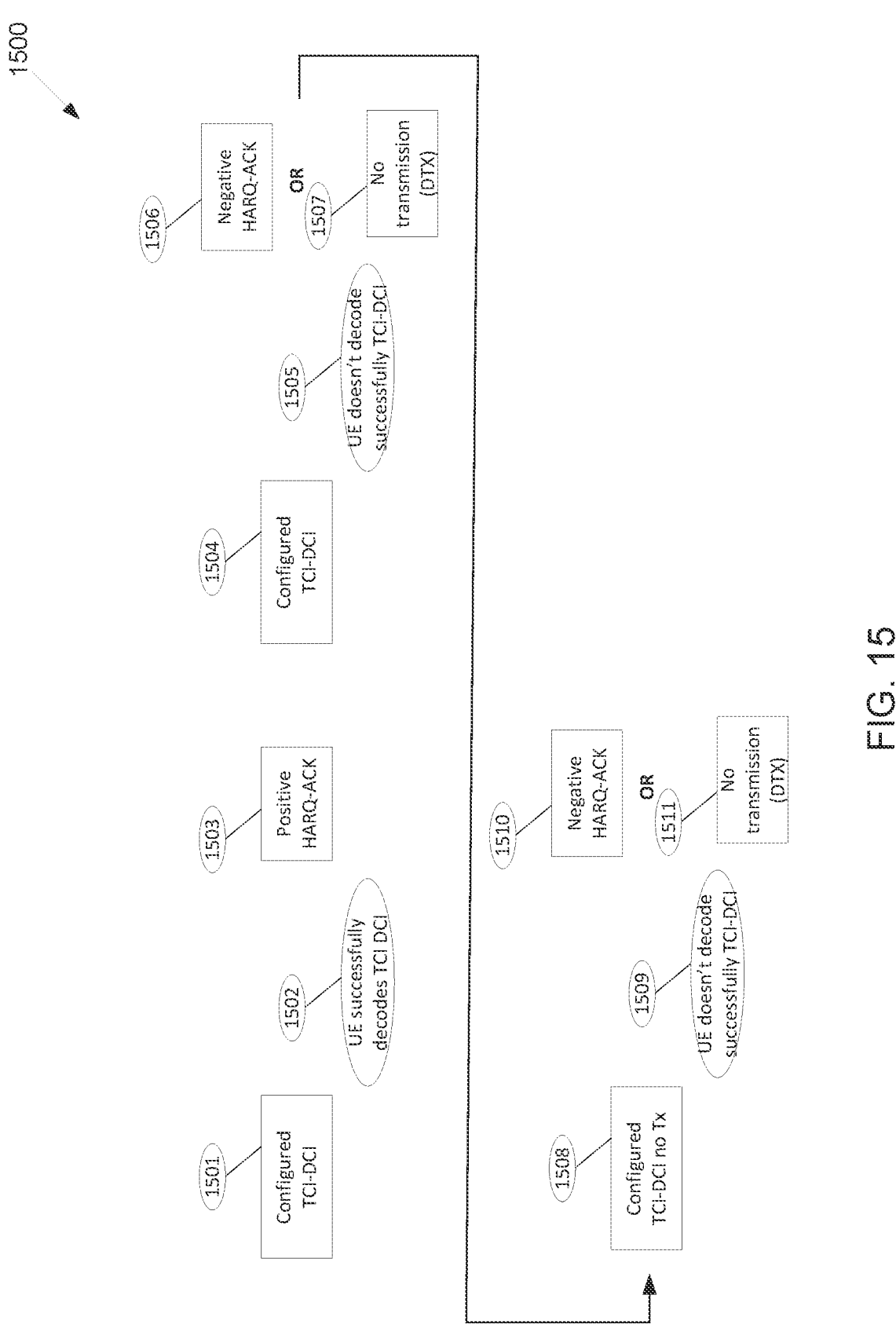
FIG. 15 illustrates yet another example TCI-DCI transmission according to embodiments of the present disclosure.

FIG. 15 illustrates yet another example TCI-DCI transmission 1500 according to embodiments of the present disclosure. An embodiment of the TCI-DCI transmission 1500 shown in FIG. 15 is for illustration only.

As illustrated in FIG. 15, in step 1501, a first configured TCI DCI resource with a TCI DCI transmission is triggered. A UE successfully receives and decodes the first configured TCI DCI in step 1502. In step 1503, a positive HARQ-ACK feedback is sent by the UE. In step 1504, a second configured TCI DCI resource with a TCI DCI transmission is triggered. In step 1505, a UE attempts to receive but does not successfully decode the second configured TCI DCI. The UE could determine based on the signal quality of the TCI DCI resource that there is a TCI DCI transmission. In steps 1506 and 1507, a UE can be either provide a negative HARQ-ACK feedback (1506), or no HARQ-ACK feedback, i.e., DTX (1507). In step 1508, a third configured TCI DCI resource but with no TCI DCI transmission is triggered. In step 1509, a UE attempts to receive but does not successfully decode the third configured TCI DCI. The UE could determine based on the signal quality of the TCI DCI resource that there is no TCI DCI transmission. In steps 1510 and 1511, a UE can be either provide a negative HARQ-ACK feedback (1510), or no HARQ-ACK feedback, i.e., DTX (1511).

If a gNB/network does not receive positive HARQ-ACK feedback for a TCI DCI on a configured resource, either: the gNB/network retransmits the same TCI DCI; or the gNB/network can retransmit the same TCI DCI or a new TCI DCI.

A maximum number of retransmissions of TCI DCI and/or a maximum number of new transmissions of TCI DCI until a gNB/Network receives positive HARQ-ACK feedback, in response to the transmission/retransmission of TCI DCI, can be specified in system specifications and/or configured/updated by RRC signaling and/or configured/updated by MAC CE signaling and/or L1 control signaling. The configuration/update can be UE-specific and/or UE-group specific and/or cell-specific.

It can be specified in the system specifications and/or configured/updated by RRC signaling and/or configured/updated by MAC CE signaling and/or L1 control signaling or left to gNB implementation whether a gNB/network can provide a same TCI DCI and/or a new TCI DCI in response to negative HARQ-ACK feedback or no HARQ-ACK feedback (DTX). The configuration/update can be UE-specific and/or UE-group specific and/or cell-specific.

If a gNB/network does not receive a positive HARQ-ACK feedback before the specified/configured/updated maximum number of transmissions/retransmissions is reached: (1) a gNB/network can declare a radio link failure; or (2) alternatively, a gNB/network can try transmitting a TCI DCI on a different beam.

In another example 1.1.4, a TCI DCI has configured time-frequency resources, a gNB/network transmits beam indication information in the configured resources of a TCI DCI. In this example, either one of the following can be supported: (1) if there is no change in beam information, a same previously transmitted beam indication information is transmitted in the configured resources of a TCI DCI. If there is a change in beam information, a new beam indication information is transmitted in the configured resources of a TCI DCI; or (2) if there is no change in beam information, there is no TCI DCI transmission on a configured TCI DCI resource. If there is a change in beam information, a new beam indication information is transmitted in the configured resources of a TCI DCI.

A UE can attempt to receive and decode a TCI DCI in the configured resources of the TCI DCI. A UE that successfully receives and decodes a TCI DCI transmission does not transmit HARQ-ACK feedback. Otherwise, a UE that does not successfully decode a TCI DCI transmits a negative acknowledgement (negative HARQ-ACK or NACK) to the gNB/network.

Figures 16, 17:
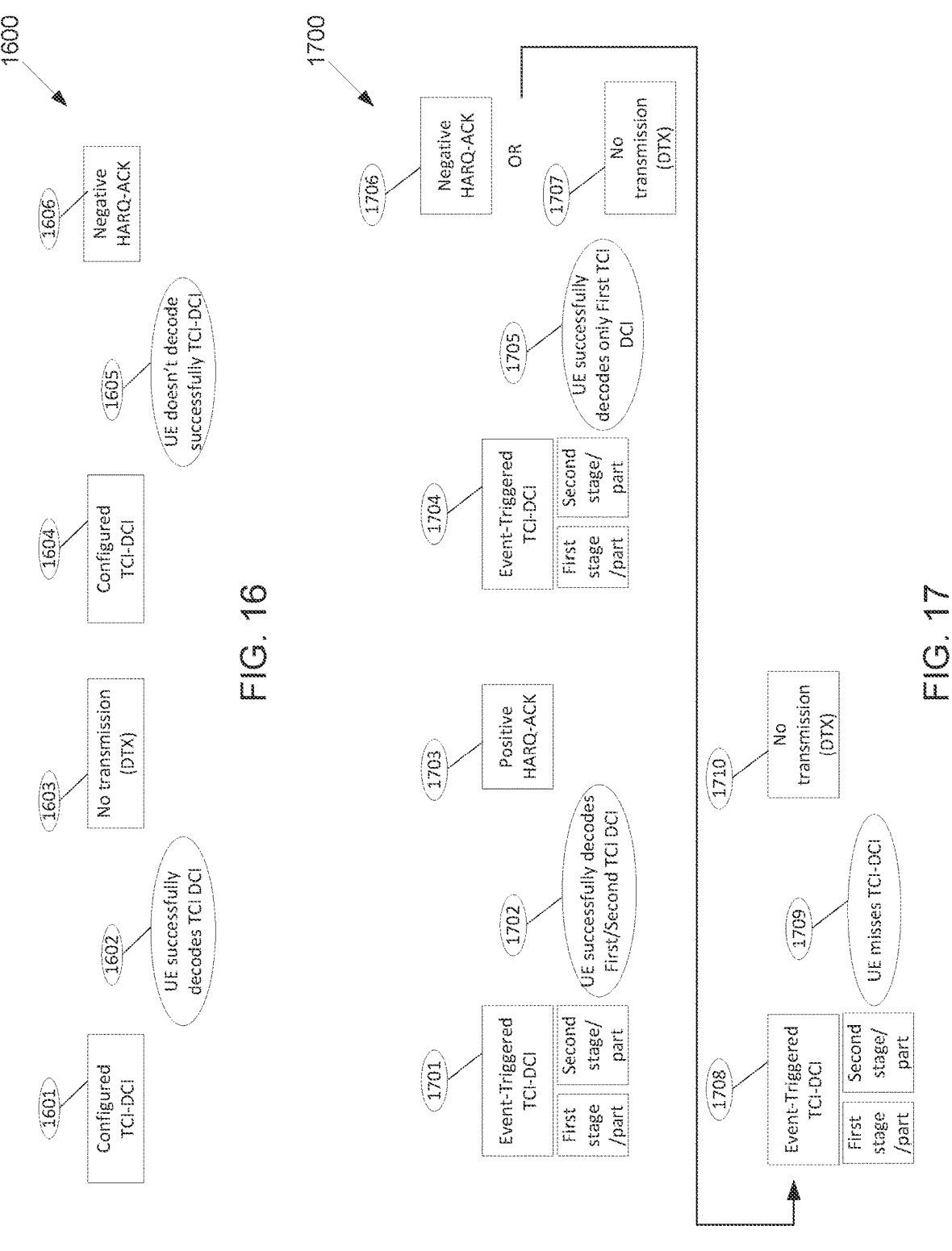
FIG. 16 illustrates yet another example TCI-DCI transmission according to embodiments of the present disclosure.
FIG. 17 illustrates yet another example TCI-DCI transmission according to embodiments of the present disclosure.

FIG. 16 illustrates yet another example TCI-DCI transmission 1600 according to embodiments of the present disclosure. An embodiment of the TCI-DCI transmission 1600 shown in FIG. 16 is for illustration only.

As illustrated in FIG. 16, in step 1601, a first configured TCI DCI resource with a TCI DCI transmission is triggered. A UE successfully receives and decodes the first configured TCI DCI in step 1602. In step 1603, no HARQ-ACK feedback, i.e., DTX, is sent by the UE. In step 1604, a second configured TCI DCI resource with or without a TCI DCI transmission is triggered. In step 1605, a UE attempts to receive but does not successfully decode the second configured TCI DCI. In step 1606, a UE provides a negative HARQ-ACK (NACK) feedback.

If a gNB/network receives negative HARQ-ACK (NACK) feedback for a TCI DCI on a configured resource, either: the gNB/network retransmits the same TCI DCI; or the gNB/network can retransmit the same TCI DCI or a new TCI DCI.

A maximum number of retransmissions of TCI DCI and/or a maximum number of new transmissions of TCI DCI until a gNB/Network does not receive negative HARQ-ACK (NACK) feedback, in response to the transmission/retransmission of TCI DCI, can be specified in system specifications and/or configured/updated by RRC signaling and/or configured/updated by MAC CE signaling and/or L1 control signaling. The configuration/update can be UE-specific and/or UE-group specific and/or cell-specific.

It can be specified in the system specifications and/or configured/updated by RRC signaling and/or configured/updated by MAC CE signaling and/or L1 control signaling or left to gNB implementation whether a gNB/network can provide a same TCI DCI and/or a new TCI DCI in response to negative HARQ-ACK feedback. The configuration/update can be UE-specific and/or UE-group specific and/or cell-specific.

If a gNB/network continues to receive a negative HARQ-ACK feedback until a specified/configured/updated maximum number of transmissions/retransmissions is reached: a gNB/network can declare a radio link failure; or alternatively, a gNB/network can try transmitting a TCI DCI on a different beam.

In examples 1.1.2, 1.1.3 and 1.1.4, the time/frequency resources of a configured TCI DCI resource can be configured/updated by RRC signaling and/or by MAC CE signaling and/or L1 control signaling.

In another example 1.2, a TCI DCI includes beam indication information for a single UE, and the TCI DCI has two stages/parts. The beam (spatial filter) used to transmit (at the gNB) or receive (at the UE) the two stage/part TCI DCI can be a wider beam (spatial filter) than the beam (spatial filter) used to transmit or receive other data and control channels and signals, alternatively multiple beams or one or more of multiple beams are used for the transmission of the two stage/part TCI DCI, at the UE multiple Rx beams or blind decoding across multiple Rx beam hypothesis can be used to receive the TCI DCI. (e.g., as contrasted with U.S. patent application Ser. No. 17/148,517 filed Jan. 13, 2021 incorporated herein by reference and U.S. patent application Ser. No. 17/151,051 filed Jan. 15, 2021 incorporated herein by reference). Alternatively, the beam (spatial filter) used to transmit (at the gNB) or receive (at the UE) the two stage/part TCI DCI can be the same beam (spatial filter) used to transmit or receive other data and control channels and signals.

In one example, a same Tx beam(s) (spatial domain transmission filter(s)) is used for the transmission of the first stage/part TCI DCI and the second stage/part TCI DCI, a same Rx beam(s) (spatial domain reception filter(s)), at the UE, is used for the reception of the first stage/part TCI DCI and the second stage/part TCI DCI. In another example, a first Tx beam(s) at gNB or Rx beam(s) at UE is used for the first stage/part TCI DCI and a second Tx beam(s) at gNB or Rx beam(s) at UE is used for the second stage/part TCI DCI, wherein the second Tx beam(s) at gNB or Rx beam(s) at UE of the second stage/part TCI DCI is determined based on information included in the first stage/part TCI DCI.

In the following examples, there is an initial transmission of a first and second stage/part TCI DCI and retransmission(s) of a first and second stage/part TCI DCI. In one example, an initial first and second stage/part TCI DCI transmission and a subsequent first and second stage/part TCI DCI (re)-transmission(s) use respectively a same Tx beam (spatial domain transmission filter) at the gNB and a same Rx beam (spatial domain reception filter) at the UE. In another example, an initial first and second stage/part TCI DCI transmission use a first Tx beam or Rx beam, each subsequent first and second stage/part TCI DCI (re)transmission can use respectively a different Tx beam, and different Rx beams (spatial domain reception filter) at the UE, wherein a sequence of Tx beams, (Rx beam at the UE), for the initial transmission and (re)transmissions is configured/updated to the UE by RRC signaling and/or MAC CE signaling and/or L1 control signaling. In another example, an initial first and second stage/part TCI DCI transmission use a first Tx beam (spatial domain transmission filter) or a first Rx beam (spatial domain reception filter) at the UE, each subsequent first and second stage/part TCI DCI (re) transmission can use respectively a different Tx beam or Rx beam, wherein a sequence of Tx beams or Rx beams for the initial transmission and (re)transmissions is determined by the gNB/Network.

In another example, an initial first stage/part TCI DCI transmission uses a first Tx beam or a first Rx beam at the UE, each subsequent first stage/part TCI DCI (re)transmission can use a different Tx beam or Rx beam, wherein a sequence of Tx beams or Rx beams at the UE for the initial transmission and (re)transmissions is configured/updated to the UE by RRC signaling and/or MAC CE signaling and/or L1 control signaling, a Tx beam or Rx beam for a second stage/part TCI is determined based on information included in the first stage/part TCI DCI. In another example, an initial first stage/part TCI DCI transmission uses a first Tx beam or a first Rx beam at the UE, each subsequent first stage/part TCI DCI (re)transmission can use a different Tx beam or Rx beam, wherein a sequence of Tx beams or Rx beams for the initial transmission and (re)transmissions is determined by the gNB/Network, a Tx beam or Rx beam for a second stage/part TCI is determined based on information included in the first stage/part TCI DCI.

In one example 1.2.1, a two stage/part TCI DCI is event-triggered and transmitted, e.g., if a gNB/network determines a change in beam indication information a TCI DCI is transmitted to a UE. In one example, a UE that successfully receives and decodes a first and second stage/part of a TCI DCI transmits a positive acknowledgement (positive HARQ-ACK) to the gNB/network. In another example, a UE that successfully receives and decodes a first stage/part of a TCI DCI but does not successfully decode a second stage part of a TCI DCI can either: transmit a negative acknowledgement (negative HARQ-ACK or NACK) to the gNB/network; or alternatively, the UE does not transmit any feedback (DTX in this case) to the gNB/network. For the HARQ-ACK codebook a UE can transmit NACK in case of a DTX.

It can be specified in the system specifications and/or configured/updated by RRC signaling and/or configured/updated by MAC CE signaling and/or L1 control signaling whether a UE provides negative HARQ-ACK feedback or DTX when the UE fails to decode a second stage/part TCI DCI after successfully decoding the corresponding first stage/part TCI DCI. The configuration/update can be UE-specific and/or UE-group specific and/or cell-specific.

A UE that does not successfully decode a first stage/part TCI DCI, does not transmit any feedback (DTX in this case) to the gNB/network. For the HARQ-ACK codebook a UE can transmit NACK in case of a DTX.

FIG. 17 illustrates yet another example TCI-DCI transmission 1700 according to embodiments of the present disclosure. An embodiment of the TCI-DCI transmission 1700 shown in FIG. 17 is for illustration only.

As illustrated in FIG. 17, In step 1701, a first event-triggered two stage/part TCI DCI transmission is triggered. A UE successfully receives and decodes the first and second stage/part of first event-triggered TCI DCI in step 1702. In step 1703, a positive HARQ-ACK feedback is sent by the UE. In step 1704, a second event-triggered two stage/part TCI DCI transmission is triggered. A UE successfully receives and decodes only the first stage/part of the second event-triggered TCI DCI in step 1705. In steps 1706 and 1707, a UE can be either provide a negative HARQ-ACK feedback (1706), or no HARQ-ACK feedback, i.e., DTX (1707). For the HARQ-ACK codebook a UE can transmit NACK in case of a DTX. In step 1708, a third event-triggered two stage/part TCI-DCI transmission is triggered. In step 1709, a UE misses the first stage/part of the third event-triggered TCI DCI. In 1710, no HARQ-ACK feedback is provided by the UE, i.e., DTX for HARQ-ACK feedback. For the HARQ-ACK codebook, a UE can transmit NACK in case of a DTX.

If a gNB/network does not receive HARQ-ACK feedback for an event-triggered TCI DCI, either: the gNB/network retransmits the same TCI DCI; or the gNB/network can retransmit the same TCI DCI or a new TCI DCI.

A maximum number of retransmissions of TCI DCI and/or a maximum number of new transmissions of TCI DCI until a gNB/Network receives positive HARQ-ACK feedback, in response to the transmission/retransmission of TCI DCI, can be specified in system specifications and/or configured/updated by RRC signaling and/or configured/updated by MAC CE signaling and/or L1 control signaling. The configuration/update can be UE-specific and/or UE-group specific and/or cell-specific.

It can be specified in the system specifications and/or configured/updated by RRC signaling and/or configured/updated by MAC CE signaling and/or L1 control signaling or left to gNB implementation whether a gNB/network can provide a same TCI DCI and/or a new TCI DCI in response to no HARQ-ACK feedback (DTX). The configuration/update can be UE-specific and/or UE-group specific and/or cell-specific.

If a gNB/network does not receive a positive HARQ-ACK feedback before the specified/configured/updated maximum number of transmissions/retransmissions is reached: a gNB/network can declare a radio link failure; or alternatively, a gNB/network can try transmitting a TCI DCI on a different beam.

In another example 1.2.2, a two-stage/part TCI DCI has configured time-frequency resources, a gNB/network transmits beam indication information in the configured resources of a TCI DCI. In this example, if there is no change in beam information, a same previously transmitted beam indication information is transmitted in the configured resources of a TCI DCI. If there is a change in beam information, a new beam indication information is transmitted in the configured resources of a TCI DCI. A UE can attempt to receive and decode a TCI DCI in the configured resources of the two stage/part TCI DCI. In one example, a UE that successfully receives and decodes a first and second stage/part of a TCI DCI transmits a positive acknowledgement (positive HARQ-ACK) to the gNB/network. In another example, a UE that successfully receives and decodes a first stage/part of a TCI DCI but does not successfully decode a second stage part of a TCI DCI can either: transmit a negative acknowledgement (negative HARQ-ACK or NACK) to the gNB/network; or alternatively, the UE does not transmit any feedback (DTX in this case) to the gNB/network. For the HARQ-ACK codebook a UE can transmit NACK in case of a DTX.

It can be specified in the system specifications and/or configured/updated by RRC signaling and/or configured/updated by MAC CE signaling and/or L1 control signaling whether a UE provides negative HARQ-ACK feedback or DTX when the UE fails to decode a second stage/part TCI DCI after successfully decoding the corresponding first stage/part TCI DCI. The configuration/update can be UE-specific and/or UE-group specific and/or cell-specific denoted as parameter P1.

In yet another example, a UE that does not successfully decode a first stage/part TCI DCI can either; transmit a negative acknowledgement (negative HARQ-ACK or NACK) to the gNB/network; or alternatively, the UE does not transmit any feedback (DTX in this case) to the gNB/network. For the HARQ-ACK codebook a UE can transmit NACK in case of a DTX.

It can be specified in the system specifications and/or configured/updated by RRC signaling and/or configured/updated by MAC CE signaling and/or L1 control signaling whether a UE provides negative HARQ-ACK feedback or DTX when the UE fails to decode a first stage/part TCI DCI in a configured TCI DCI resource. The configuration/update can be UE-specific and/or UE-group specific and/or cell-specific. This parameter can be the same or a separate parameter from parameter P1.

Figure 18:
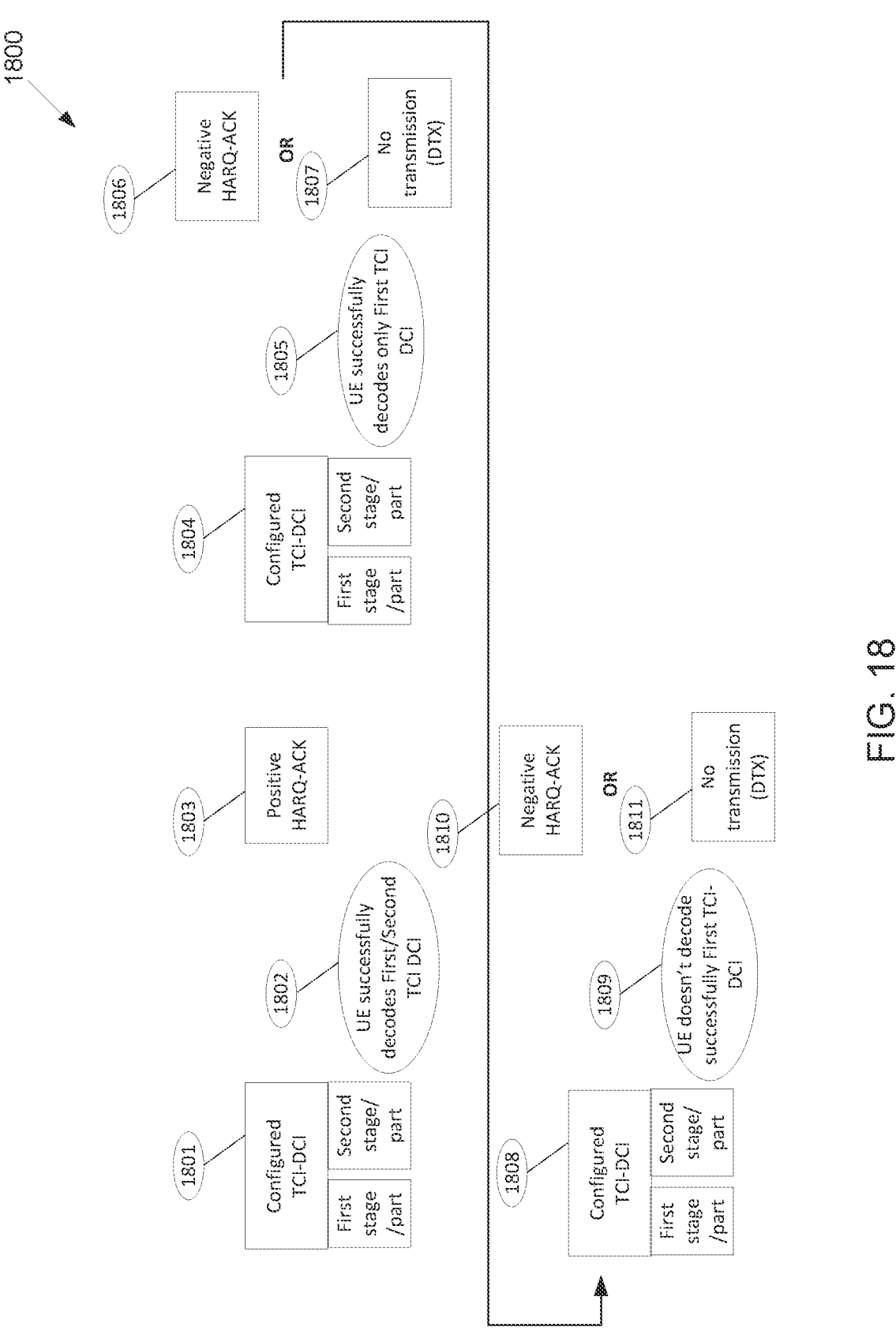
FIG. 18 illustrates yet another example TCI-DCI transmission according to embodiments of the present disclosure.

FIG. 18 illustrates yet another example TCI-DCI transmission 1800 according to embodiments of the present disclosure. An embodiment of the TCI-DCI transmission 1800 shown in FIG. 18 is for illustration only.

As illustrated in FIG. 18, in step 1801, a first configured two stage/part TCI DCI transmission is triggered. A UE successfully receives and decodes the first and second stage/part of first configured TCI DCI in step 1802. In step 1803, a positive HARQ-ACK feedback is sent by the UE. In step 1804, a second configured two stage/part TCI DCI transmission is triggered. A UE successfully receives and decodes only the first stage/part of the second configured TCI DCI in step 1805. In steps 1806 and 1807, a UE can be either provide a negative HARQ-ACK feedback (1806), or no HARQ-ACK feedback, i.e., DTX (1807). For the HARQ-ACK codebook a UE can transmit NACK in case of a DTX. In step 1808, a third configured two stage/part TCI DCI transmission is triggered. In step 1809, a UE misses the first stage/part of the third configured TCI DCI. In steps 1810 and 1811, a UE can be either provide a negative HARQ-ACK feedback (1810), or no HARQ-ACK feedback, i.e., DTX (1811). For the HARQ-ACK codebook a UE can transmit NACK in case of a DTX.

If a gNB/network does not receive positive HARQ-ACK feedback for a TCI DCI on a configured resource, either: the gNB/network retransmits the same TCI DCI; or the gNB/network can retransmit the same TCI DCI or a new TCI DCI.

A maximum number of retransmissions of TCI DCI and/or a maximum number of new transmissions of TCI DCI until a gNB/Network receives positive HARQ-ACK feedback, in response to the transmission/retransmission of TCI DCI, can be specified in system specifications and/or configured/updated by RRC signaling and/or configured/updated by MAC CE signaling and/or L1 control signaling. The configuration/update can be UE-specific and/or UE-group specific and/or cell-specific.

It can be specified in the system specifications and/or configured/updated by RRC signaling and/or configured/updated by MAC CE signaling and/or L1 control signaling or left to gNB implementation whether a gNB/network can provide a same TCI DCI and/or a new TCI DCI in response to negative HARQ-ACK feedback or no HARQ-ACK feedback (DTX). The configuration/update can be UE-specific and/or UE-group specific and/or cell-specific.

If a gNB/network does not receive a positive HARQ-ACK feedback before the specified/configured/updated maximum number of transmissions/retransmissions is reached: a gNB/network can declare a radio link failure; or alternatively, a gNB/network can try transmitting a TCI DCI on a different beam.

In another example 1.2.3, a two-stage/part TCI DCI has configured time-frequency resources, a gNB/network transmits beam indication information in the configured resources of a TCI DCI, in case of new beam indication information. In this example, if there is no change in beam information, there is no TCI DCI transmission in the configured TCI DCI resource. If there is a change in beam information, a new beam indication information is transmitted in the configured resources of a two-stage/part TCI DCI. A UE can attempt to receive and decode a TCI DCI in the configured resources of the two-stage/part TCI DCI. In one example, a UE that successfully receives and decodes a first and second stage/part of TCI DCI transmits a positive acknowledgement (positive HARQ-ACK) to the gNB/network. In another example, a UE that successfully receives and decodes a first stage/part of a TCI DCI but does not successfully decode a second stage part of a TCI DCI can either: transmits a negative acknowledgement (negative HARQ-ACK or NACK) to the gNB/network; or alternatively, the UE does not transmit any feedback (DTX in this case) to the gNB/network. For the HARQ-ACK codebook a UE can transmit NACK in case of a DTX.

It can be specified in the system specifications and/or configured/updated by RRC signaling and/or configured/updated by MAC CE signaling and/or L1 control signaling whether a UE provides negative HARQ-ACK feedback or DTX when the UE fails to decode a second stage/part TCI DCI after successfully decoding the corresponding first stage/part TCI DCI. The configuration/update can be UE-specific and/or UE-group specific and/or cell-specific denoted as parameter P2.

In yet another example, a UE that does not successfully decode a first stage/part TCI DCI can either: transmit a negative acknowledgement (negative HARQ-ACK or NACK) to the gNB/network; alternatively, the UE does not transmit any feedback (DTX in this case) to the gNB/network. For the HARQ-ACK codebook a UE can transmit NACK in case of a DTX. Alternatively, the UE measures a signal quality, e.g., RSRP, or SINR, of a configured TCI DCI resource if the signal quality is above a threshold the UE transmits a negative acknowledgement, else the UE provides no HARQ-ACK feedback (DTX). For the HARQ-ACK codebook a UE can transmit NACK in case of a DTX.

It can be specified in the system specifications and/or configured/updated by RRC signaling and/or configured/updated by MAC CE signaling and/or L1 control signaling whether a UE provides negative HARQ-ACK feedback or DTX or negative HARQ-ACK/DTX depending on the signal quality when the UE fails to decode a TCI DCI in a configured TCI DCI resource. The configuration/update can be UE-specific and/or UE-group specific and/or cell-specific. This parameter can be the same or a separate parameter from parameter P2.

Furthermore, the threshold for the signal quality, if applicable, can be configured/updated by RRC signaling and/or configured/updated by MAC CE signaling and/or L1 control signaling. The configuration/update can be UE-specific and/or UE-group specific and/or cell-specific.

Figure 19:
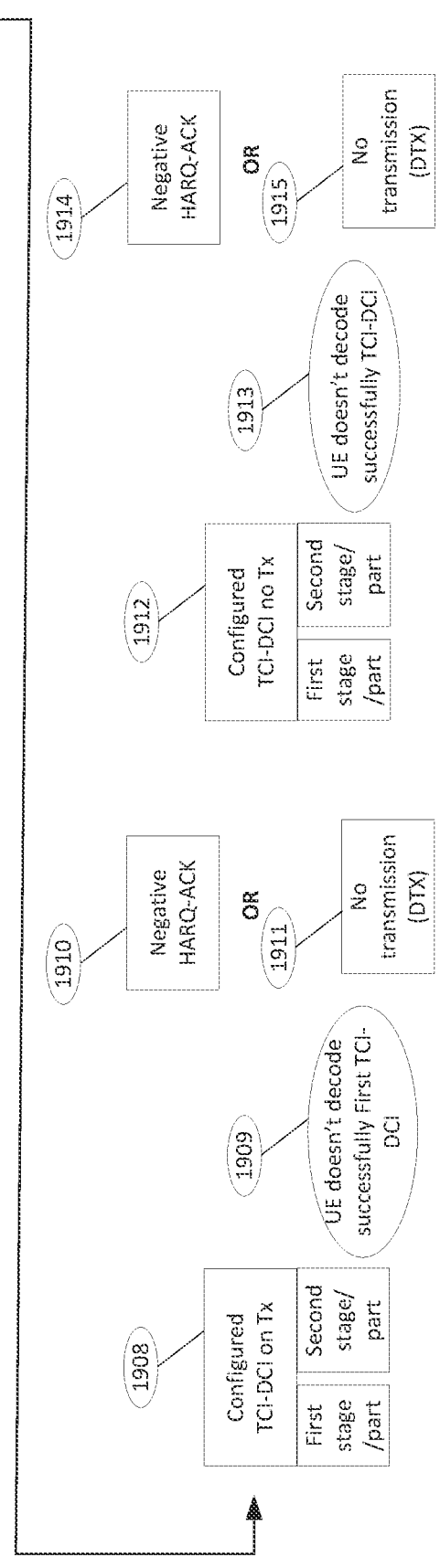
FIG. 19 illustrates yet another example TCI-DCI transmission according to embodiments of the present disclosure.

FIG. 19 illustrates yet another example TCI-DCI transmission 1900 according to embodiments of the present disclosure. An embodiment of the TCI-DCI transmission 1900 shown in FIG. 19 is for illustration only.

As illustrated in FIG. 19, in step 1901, a first configured two stage/part TCI DCI resource with a TCI DCI transmission is triggered. A UE successfully receives and decodes the first and second stage/part of the first configured TCI DCI in step 1902. In step 1903, a positive HARQ-ACK feedback is sent by the UE. In step 1904, a second configured two stage/part TCI DCI resource with a TCI DCI transmission is triggered. A UE successfully receives and decodes only the first stage/part of the second configured TCI DCI in step 1905. In steps 1906 and 1907, a UE can be either provide a negative HARQ-ACK feedback (1906), or no HARQ-ACK feedback, i.e., DTX (1907). For the HARQ-ACK codebook a UE can transmit NACK in case of a DTX. In step 1908, a third configured two stage/part TCI DCI resource with a TCI DCI transmission is triggered. In step 1909, a UE attempts to receive but does not successfully decode the first stage/part of the third configured TCI DCI. The UE could determine based on the signal quality of the TCI DCI resource that there is a TCI DCI transmission. In steps 1910 and 1911, a UE can be either provide a negative HARQ-ACK feedback (1910), or no HARQ-ACK feedback, i.e., DTX (1911). For the HARQ-ACK codebook a UE can transmit NACK in case of a DTX. In step 1912, a fourth configured two stage/part TCI DCI resource but with no TCI DCI transmission is triggered. In step 1913, a UE attempts to receive but does not successfully decode the first stage/part of the fourth configured TCI DCI. The UE could determine based on the signal quality of the TCI DCI resource that there is no TCI DCI transmission. In steps 1914 and 1915, a UE can be either provide a negative HARQ-ACK feedback (1914), or no HARQ-ACK feedback, i.e., DTX (1915). For the HARQ-ACK codebook a UE can transmit NACK in case of a DTX.

If a gNB/network does not receive HARQ-ACK feedback for a TCI DCI on a configured resource, either: the gNB/network retransmits the same TCI DCI; or the gNB/network can retransmit the same TCI DCI or a new TCI DCI.

A maximum number of retransmissions of TCI DCI and/or a maximum number of new transmissions of TCI DCI until a gNB/Network receives positive HARQ-ACK feedback, in response to the transmission/retransmission of TCI DCI, can be specified in system specifications and/or configured/updated by RRC signaling and/or configured/updated by MAC CE signaling and/or L1 control signaling. The configuration/update can be UE-specific and/or UE-group specific and/or cell-specific.

It can be specified in the system specifications and/or configured/updated by RRC signaling and/or configured/updated by MAC CE signaling and/or L1 control signaling or left to gNB implementation whether a gNB/network can provide a same TCI DCI and/or a new TCI DCI in response to negative HARQ-ACK feedback or no HARQ-ACK feedback (DTX). The configuration/update can be UE-specific and/or UE-group specific and/or cell-specific.

If a gNB/network does not receive a positive HARQ-ACK feedback before the specified/configured/updated maximum number of transmissions/retransmissions is reached: a gNB/network can declare a radio link failure; or alternatively, a gNB/network can try transmitting a TCI DCI on a different beam.

In another example 1.2.4, a two-stage/part TCI DCI has configured time-frequency resources, a gNB/network transmits beam indication information in the configured resources of a TCI DCI. In this example, either one of the following can be supported: (1) if there is no change in beam information, a same previously transmitted beam indication information is transmitted in the configured resources of a two-stage/part TCI DCI. If there is a change in beam information, a new beam indication information is transmitted in the configured resources of a two-stage/part TCI DCI; or (2) if there is no change in beam information, there is no TCI DCI transmission on configured two-stage/part TCI DCI resource. If there is a change in beam information, a new beam indication information is transmitted in the configured resources of a two-stage/part TCI DCI.

A UE can attempt to receive and decode a first stage/part TCI DCI and if applicable a second stage/part TCI DCI in the configured resources of the two-stage/part TCI DCI. A UE that successfully receives and decodes a first and second stage/part of a TCI DCI transmission does not transmit HARQ-ACK feedback. Otherwise, a UE that does not successfully decode a first stage/part TCI DCI or a second stage/part TCI DCI transmits a negative acknowledgement (negative HARQ-ACK or NACK) to the gNB/network.

Figure 20:
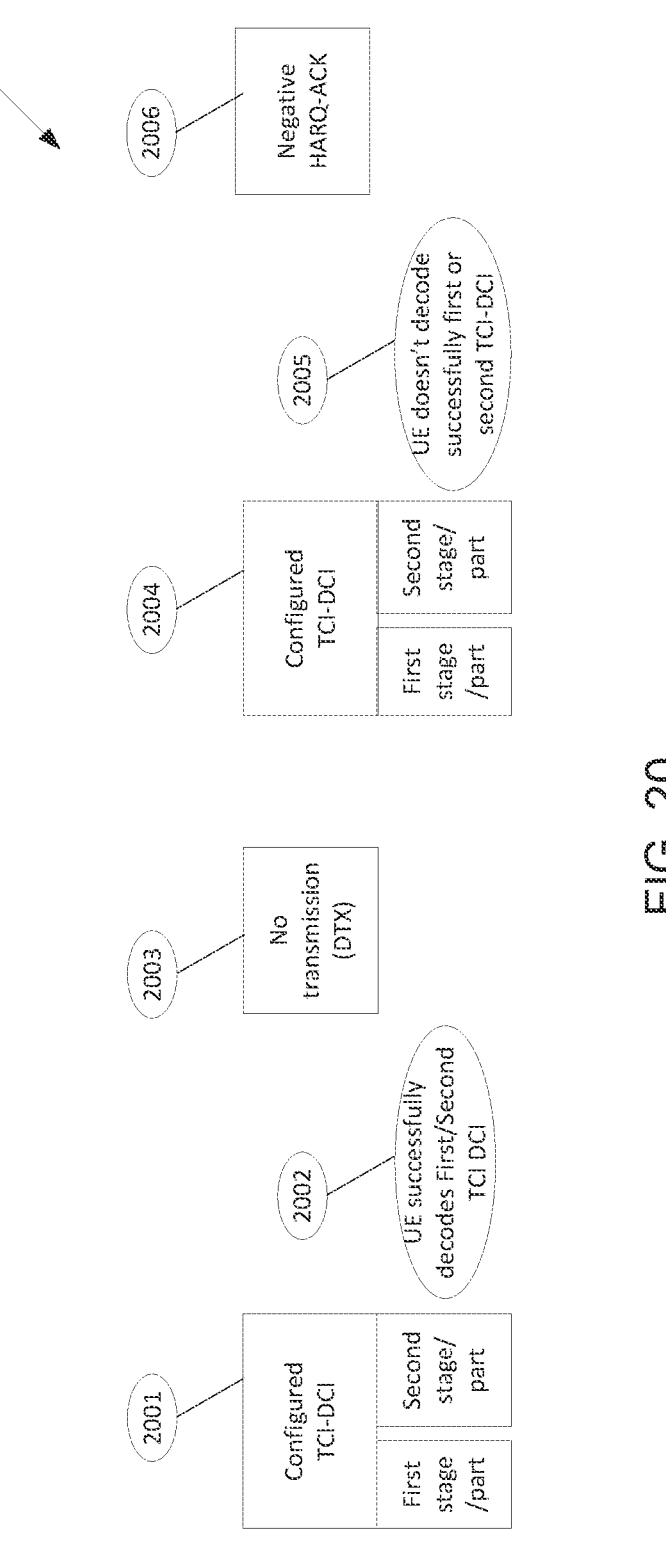
FIG. 20 illustrates yet another example TCI-DCI transmission according to embodiments of the present disclosure.

FIG. 20 illustrates yet another example TCI-DCI transmission 2000 according to embodiments of the present disclosure. An embodiment of the TCI-DCI transmission 2000 shown in FIG. 20 is for illustration only.

As illustrated in FIG. 20, in step 2001, a first configured two stage/part TCI DCI resource with a TCI DCI transmission is triggered. A UE successfully receives and decodes the first and second stage/part of the first configured TCI DCI in step 2002. In step 2003, no HARQ-ACK feedback, i.e., DTX, is sent by the UE. For the HARQ-ACK codebook a UE can transmit NACK in case of a DTX. In step 2004, a second configured two stage/part TCI DCI resource with or without a TCI DCI transmission is triggered. In step 2005, a UE attempts to receive but does not successfully decode the first or the second part of the second configured TCI DCI. In step 2006, a UE provides a negative HARQ-ACK (NACK) feedback.

If a gNB/network receives negative HARQ-ACK (NACK) feedback for a TCI DCI on a configured resource, either: the gNB/network retransmits the same TCI DCI; or the gNB/network can retransmit the same TCI DCI or a new TCI DCI.

A maximum number of retransmissions of TCI DCI and/or a maximum number of new transmissions of TCI DCI until a gNB/Network does not receive negative HARQ-ACK (NACK) feedback, in response to the transmission/retransmission of a two stage/part TCI DCI, can be specified in system specifications and/or configured/updated by RRC signaling and/or configured/updated by MAC CE signaling and/or L1 control signaling. The configuration/update can be UE-specific and/or UE-group specific and/or cell-specific.

It can be specified in the system specifications and/or configured/updated by RRC signaling and/or configured/updated by MAC CE signaling and/or L1 control signaling or left to gNB implementation whether a gNB/network can provide a same TCI DCI and/or a new TCI DCI in response to negative HARQ-ACK feedback. The configuration/update can be UE-specific and/or UE-group specific and/or cell-specific.

If a gNB/network continues to receive a negative HARQ-ACK feedback until a specified/configured/updated maximum number of transmissions/retransmissions is reached: a gNB/network can declare a radio link failure; or alternatively, a gNB/network can try transmitting a TCI DCI on a different beam.

In examples 1.2.2, 1.2.3 and 1.2.4, the time/frequency resources of a configured two stage/part TCI DCI resource can be configured/update by RRC signaling and/or by MAC CE signaling and/or L1 control signaling.

In another example 1.3, a TCI DCI includes beam indication information for a group of UEs, and the TCI DCI has a single stage/part. The beam (spatial filter) used to transmit (at the gNB) or receive (at the UE) the group TCI DCI can be a wider beam (spatial filter) than the beam (spatial filter) used to transmit or receiver other data and control channels and signals, alternatively multiple beams or one or more of multiple beams are used for the transmission of the TCI DCI, at the UE multiple Rx beams or blind decoding across multiple Rx beam hypothesis can be used to receive the TCI DCI. (e.g., as contrasted with U.S. patent application Ser. No. 17/148,517 filed Jan. 13, 2021 incorporated herein by reference and U.S. patent application Ser. No. 17/151,051 filed Jan. 15, 2021 incorporated herein by reference). Alternatively, the beam (spatial filter) used to transmit (at the gNB) or receive (at the UE) the group TCI DCI can be the same beam (spatial filter) used to transmit or receive other data and control channels and signals.

In the following examples, there is an initial transmission of a TCI DCI and retransmission(s) of TCI DCI. In one example, an initial TCI DCI transmission and a subsequent TCI DCI (re)-transmission(s) use a same Tx beam (spatial domain transmission filter) at the gNB or a same Rx beam (spatial domain reception filter) at the UE. In another example, an initial TCI DCI transmission uses a first Tx beam (first Rx beam at the UE), each subsequent TCI DCI (re)transmission can use a different Tx beam, and different Rx beams at the UE, wherein a sequence of Tx beams (Rx beams at the UE) for the initial transmission and (re) transmissions is configured/updated to the UE by RRC signaling and/or MAC CE signaling and/or L1 control signaling.

In another example, an initial TCI DCI transmission uses a first Tx beam at the gNB (first Rx beam at the UE), each subsequent TCI DCI (re)transmission can use a different Tx beam (Rx beam), wherein a sequence of Tx beams (or Rx beams) for the initial transmission and (re)transmissions is determined by the gNB/Network. In this case, the Tx beams (Rx beams at the UE) can correspond to a set of (pre-) configured TCI states for TCI DCI.

A TCI DCI includes beam indication information for more than one UE, referred to as a group of UEs. (e.g., as contrasted with U.S. patent application Ser. No. 17/151,051 filed Jan. 15, 2021 incorporated herein by reference). A UE can be configured an index within the group of UEs. In one example, the UE index within a group of UEs is a number between 0 and N−1, where N is the number of UEs in the group of UEs. The index of a UE within a group of UEs can be configured explicitly or implicitly. The configuration/ updating of the UE index within a group of UEs can be RRC signaling and/or MAC CE signaling and/or L1 control signaling.

In one example 1.3.1, a group TCI DCI is event-triggered and transmitted, e.g., if a gNB/network determines a change in beam indication information for any UE within a group of UEs, a TCI DCI is transmitted to the group of UEs. Following example 1.1.1, if a UE receives and successfully decodes a group TCI DCI, the UE transmits a positive acknowledgement (positive HARQ-ACK) to the gNB/network. Otherwise, a UE that does not successfully decode a TCI DCI, does not transmit any feedback (DTX in this case) to the gNB/network. The HARQ-ACK can be part of a UE's UE-specific HARQ-ACK codebook, in which case a UE can transmit NACK in case of a DTX. Alternatively, a UE is configured a dedicated resource for reporting positive HARQ-ACK feedback on PUCCH. The remaining details of example 1.1.1 follow for example 1.3.1.

In another example 1.3.2, a group TCI DCI has configured time-frequency resources, a gNB/network transmits beam indication information in the configured resources of a group TCI DCI. In this example, if there is no change in beam information for a UE, a same previously transmitted beam indication information, for the UE, is transmitted in the configured resources of a group TCI DCI. If there is a change in beam information for a UE, a new beam indication information, for the UE, is transmitted in the configured resources of a group TCI DCI. A UE can attempt to receive and decode a group TCI DCI in the configured resources of the group TCI DCI.

A UE that successfully receives and decodes a group TCI DCI transmits a positive acknowledgement (positive HARQ-ACK) to the gNB/network. Otherwise, a UE that does not successfully decode a TCI DCI: transmits a negative acknowledgement (negative HARQ-ACK or NACK) to the gNB/network; or alternatively, the UE does not transmit any feedback (DTX in this case) to the gNB/network.

It can be specified in the system specifications and/or configured/updated by RRC signaling and/or configured/ updated by MAC CE signaling and/or L1 control signaling whether a UE provides negative HARQ-ACK feedback or DTX when the UE fails to decode a TCI DCI in a configured TCI DCI resource. The configuration/update can be UE-specific and/or UE-group specific and/or cell-specific.

In one example 1.3.2.1, a UE is configured a dedicated resource for reporting positive HARQ-ACK feedback on PUCCH, and no resource is configured for negative HARQ-ACK (there is DTX in case of no successful reception and decoding of group TCI DCI).

In another example 1.3.2.2, a UE is configured a dedicated resource for reporting positive HARQ-ACK feedback and negative HARQ-ACK feedback on PUCCH.

In another example 1.3.2.3, a UE is configured a dedicated resource for reporting positive HARQ-ACK feedback. A common resource on PUCCH, common across all UEs of group, is configured for negative HARQ-ACK feedback. The common resource on PUCCH for negative HARQ-ACK feedback is configured by either: UE-specific configuration and signaling; or UE group-specific configuration and signaling.

In another example 1.3.2.4, a UE uses its HARQ-ACK codebook to convey the HARQ-ACK for beam indication.

The remaining details of example 1.1.2 follow for example 1.3.2.

In another example 1.3.3, a group TCI DCI has configured time-frequency resources, a gNB/network transmits beam indication information in the configured resources of a group TCI DCI, in case of new beam indication information for all UEs in the group of UEs. In this example, if there is no change in beam information for any UE in the group of UEs, there is no TCI DCI transmission on a configured TCI DCI resource. If there is a change in beam information for any UE in the group of UEs, a beam indication information is transmitted in the configured resources of a TCI DCI. A UE can attempt to receive and decode a TCI DCI in the configured resources of the TCI DCI.

A UE that successfully receives and decodes a TCI DCI transmits a positive acknowledgement (positive HARQ-ACK) to the gNB/network. Otherwise, a UE that does not successfully decode a TCI DCI; transmits a negative acknowledgement (negative HARQ-ACK or NACK) to the gNB/network; alternatively, the UE does not transmit any feedback (DTX in this case) to the gNB/network; or alternatively, the UE measures a signal quality, e.g., RSRP, or SINR, of a configured TCI DCI resource if the signal quality is above a threshold the UE transmits a negative acknowledgement, else the UE provides no HARQ-ACK feedback (DTX).

It can be specified in the system specifications and/or configured/updated by RRC signaling and/or configured/ updated by MAC CE signaling and/or L1 control signaling whether a UE provides negative HARQ-ACK feedback or DTX or negative HARQ-ACK/DTX depending on the signal quality when the UE fails to decode a TCI DCI in a configured TCI DCI resource. The configuration/update can be UE-specific and/or UE-group specific and/or cell-specific. Furthermore, the threshold for the signal quality, if applicable, can be configured/updated by RRC signaling and/or configured/updated by MAC CE signaling and/or L1 control signaling. The configuration/update can be UE-specific and/or UE-group specific and/or cell-specific.

In one example 1.3.3.1, a UE is configured a dedicated resource for reporting positive HARQ-ACK feedback on PUCCH, and no resource is configured for negative HARQ-ACK (there is DTX in case of no successful reception and decoding of group TCI DCI).

In another example 1.3.3.2, a UE is configured a dedicated resource for reporting positive HARQ-ACK feedback and negative HARQ-ACK feedback on PUCCH.

In another example 1.3.3.3, a UE is configured a dedicated resource for reporting positive HARQ-ACK feedback. A common resource on PUCCH, common across all UEs of group, is configured for negative HARQ-ACK feedback. The common resource on PUCCH for negative HARQ-ACK feedback is configured by either: UE-specific configuration and signaling; or UE group-specific configuration and signaling.

In another example 1.3.3.4, a UE uses its HARQ-ACK codebook to convey the HARQ-ACK for beam indication.

The remaining details of example 1.1.3 follow for example 1.3.3.

In another example 1.3.4, a group TCI DCI has configured time-frequency resources, a gNB/network transmits beam indication information of a group of UEs in the configured resources of a group TCI DCI. In this example, either one of the following can be supported: (1) if there is no change in beam information for all UEs in the group of UEs, a same previously transmitted beam indication information for the UE is transmitted in the configured resources of a TCI DCI. If there is a change in beam information for a UE in the group of UEs, a new beam indication information for the UE is transmitted in the configured resources of a TCI DCI; or (2) if there is no change in beam information for any UE in a group of UEs, there is no TCI DCI transmission on a configured TCI DCI resource. If there is a change in beam information for any UE in a group of UEs, a beam indication information is transmitted in the configured resources of a group TCI DCI.

A UE can attempt to receive and decode a TCI DCI in the configured resources of the TCI DCI. A UE that successfully receives and decodes a TCI DCI transmission does not transmit HARQ-ACK feedback. Otherwise, a UE that does not successfully decode a TCI DCI transmits a negative acknowledgement (negative HARQ-ACK or NACK) to the gNB/network.

In one example 1.3.4.1, s UE is configured a dedicated resource for reporting negative HARQ-ACK feedback on PUCCH.

In another example 1.3.4.2, a common resource on PUCCH, common across all UEs of group, is configured for negative HARQ-ACK feedback. The common resource on PUCCH for negative HARQ-ACK feedback is configured by either: UE-specific configuration and signaling; or UE group-specific configuration and signaling.

In another example 1.3.4.3, a UE uses its HARQ-ACK codebook to convey the HARQ-ACK for beam indication.

The remaining details of example 1.1.4 follow for example 1.3.4.

In examples 1.3.2, 1.3.3 and 1.3.4, the time/frequency resources of a configured TCI DCI resource can be configured/update by RRC signaling and/or by MAC CE signaling and/or L1 control signaling.

In the examples of 1.3, a gNB can re-transmit beam indication information or transmit beam indication information on a group TCI DCI in response to a negative acknowledgement (negative HARQ-ACK–NACK) or in response to not receiving and detecting a positive acknowledgement (positive HARQ-ACK) in response to a group TCI DCI in accordance with the following examples.

In one example, the retransmission of beam indication information or the transmission of beam indication information is in response to a negative acknowledgement (negative HARQ-ACK–NACK) or in response to not receiving and detecting a positive acknowledgement (positive HARQ-ACK) from UEs with beam indication information in the group TCI DCI.

In another example, the retransmission of beam indication information or the transmission of beam indication information is in response to a negative acknowledgement (negative HARQ-ACK–NACK) or in response to not receiving and detecting a positive acknowledgement (positive HARQ-ACK) from any UE in the group TCI DCI.

In yet another example, the retransmission of beam indication information or the transmission of beam indication information is in response to a negative acknowledgement (negative HARQ-ACK–NACK) from any UE in the group TCI DCI or in response to not receiving and detecting a positive acknowledgement (positive HARQ-ACK) from UEs with beam indication information in the group TCI DCI.

In another example 1.4, a TCI DCI includes beam indication information for a group of UEs, and the TCI DCI has two stages/parts. The beam (spatial filter) used to transmit (at the gNB) or receive (at the UE) the two stage/part group TCI DCI can be a wider beam (spatial filter) than the beam used to transmit or receive other data and control channels and signals, alternatively multiple beams or one or more of multiple beams are used for the transmission of the two stage/part TCI DCI, at the UE multiple Rx beams or blind decoding across multiple Rx beam hypothesis can be used to receive the TCI DCI. (e.g., as contrasted with U.S. patent application Ser. No. 17/148,517 filed Jan. 13, 2021 incorporated herein by reference and U.S. patent application Ser. No. 17/151,051 filed Jan. 15, 2021 incorporated herein by reference). Alternatively, the beam (spatial filter) used to transmit (at the gNB) or receive (at the UE) the two stage/part group TCI DCI can be the same beam (spatial filter) used to transmit or receive other data and control channels and signals.

In one example, a same Tx beam(s) (spatial domain transmission filter(s)) at the gNB (or Rx beam(s) (spatial domain reception filter(s)) at the UE) is used for the transmission of the first stage/part group TCI DCI and the second stage/part group TCI DCI. In another example, a first Tx beam(s) (or first Rx beam(s) at the UE) is used for the first stage/part group TCI DCI and a second Tx beam(s) is used for the second stage/part group TCI DCI, wherein the second Tx beam(s) (or second Rx beam(s) at the UE) of the second stage/part group TCI DCI is determined based on information included in the first stage/part group TCI DCI. In another example, a first Tx beam(s) (or first Rx beam(s) at the UE) is used for the first stage/part group TCI DCI and a second Tx beam(s) (or second Rx beam(s) at the UE) is used for the second stage/part group TCI DCI, wherein the second Tx beam(s) (or second Rx beam(s) at the UE) of the second stage/part group TCI DCI is determined based on UE(s) indicated in the first stage/part group TCI DCI.

In the following examples, there is an initial transmission of a first and second stage/part TCI DCI and retransmission(s) of a first and second stage/part TCI DCI. In one example, an initial first and second stage/part TCI DCI transmission and a subsequent first and second stage/part TCI DCI (re)-transmission(s) use respectively a same Tx beam (spatial domain transmission filter) at the gNB (same Rx beam (spatial domain reception filter) at the UE). In another example, an initial first and second stage/part TCI DCI transmission use a first Tx beam (first Rx beam at UE), each subsequent first and second stage/part TCI DCI (re) transmission can use respectively a different Tx beam (different Rx beam at the UE), wherein a sequence of Tx beams (Rx beams at the UE) for the initial transmission and (re)transmissions is configured/updated to the UE by RRC signaling and/or MAC CE signaling and/or L1 control signaling. In another example, an initial first and second stage/part TCI DCI transmission use a first Tx beam (first Rx beam at the UE), each subsequent first and second stage/part TCI DCI (re)transmission can use respectively a different Tx beam (Rx beam at the UE), wherein a sequence of Tx beams (Rx beams at the UE) for the initial transmission and (re)transmissions is determined by the gNB/Network.

In another example, an initial first stage/part TCI DCI transmission uses a first Tx beam at the gNB (first Rx beam at the UE), each subsequent first stage/part TCI DCI (re) transmission can use a different Tx beam (Rx beam at the UE), wherein a sequence of Tx beams (Rx beams at the UE) for the initial transmission and (re)transmissions is configured/updated to the UE by RRC signaling and/or MAC CE signaling and/or L1 control signaling, a Tx beam (Rx beam at the UE) for a second stage/part TCI is determined based on information included in the first stage/part TCI DCI or based on UE(s) indicated in the first stage/part group TCI DCI. In another example, an initial first stage/part TCI DCI transmission uses a first Tx beam (first Rx beam at the UE), each subsequent first stage/part TCI DCI (re)transmission can use a different Tx beam (spatial domain transmission filter) (different Rx beam (spatial domain reception filter) at the UE), wherein a sequence of Tx beams (Rx beams at the UE) for the initial transmission and (re)transmissions is determined by the gNB/Network, a Tx beam (Rx beam at the UE) for a second stage/part TCI is determined based on information included in the first stage/part TCI DCI or based on UE(s) indicated in the first stage/part group TCI DCI. In this case, the Tx beams (Rx beams at the UE) can correspond to a set of (pre-)configured TCI states for TCI DCI.

A two stage/part TCI DCI includes beam indication information for more than one UE, referred to as a group of UEs. (e.g., as contrasted with U.S. patent application Ser. No. 17/151,051 filed Jan. 15, 2021 incorporated herein by reference and with U.S. patent application Ser. No. 17/249, 115 filed Feb. 19, 2021 incorporated herein by reference). A UE can be configured an index within the group of UEs. In one example, the UE index within a group of UEs is a number between 0 and N−1, where N is the number of UEs in the group of UEs. The index of a UE within a group of UEs can be configured explicitly or implicitly. The configuration/updating of the UE index within a group of UEs can be by RRC signaling and/or MAC CE signaling and/or L1 control signaling. The first stage/part TCI DCI can indicate, based on an index for a UE, whether beam indication information for the UE is included in the second stage/part DCI.

In one example 1.4.1, a two stage/part group TCI DCI is event-triggered and transmitted, e.g., if a gNB/network determines a change in beam indication information for any UE in a group of UEs, a group TCI DCI is transmitted to the group of UEs. In one example, a UE that successfully receives and decodes a first and second stage/part of a TCI DCI transmits a positive acknowledgement (positive HARQ-ACK) to the gNB/network. In such example, if the first stage/part TCI DCI indicates to the UE that there is no beam indication information in the second stage/part TCI DCI, the UE does not decode the second stage/part TCI DCI, and the UE can transmit to the gNB/network a positive acknowledgement (positive HARQ-ACK), alternatively the UE can provide to the gNB/network no HARQ-ACK feedback. For the HARQ-ACK codebook a UE can transmit NACK in case of a DTX. This behavior can be configured/update by RRC signaling and/or MAC CE signaling and/or L1 control signaling.

In another example, a UE that successfully receives and decodes a first stage/part of a TCI DCI but does not successfully decode a second stage part of a TCI DCI can either: transmits a negative acknowledgement (negative HARQ-ACK or NACK) to the gNB/network; or alternatively, the UE does not transmit any feedback (DTX in this case) to the gNB/network. For the HARQ-ACK codebook a UE can transmit NACK in case of a DTX.

It can be specified in the system specifications and/or configured/updated by RRC signaling and/or configured/updated by MAC CE signaling and/or L1 control signaling whether a UE provides negative HARQ-ACK feedback or DTX when the UE fails to decode a second stage/part TCI DCI after successfully decoding the corresponding first stage/part TCI DCI. The configuration/update can be UE-specific and/or UE-group specific and/or cell-specific.

In yet another example, a UE that does not successfully decode a first stage/part TCI DCI, does not transmit any feedback (DTX in this case) to the gNB/network. For the HARQ-ACK codebook a UE can transmit NACK in case of a DTX.

In one example 1.4.1.1, a UE is configured a dedicated resource for reporting positive HARQ-ACK feedback on PUCCH, and no resource is configured for negative HARQ-ACK (there is DTX in case of no successful reception and decoding of a first stage/part or a second stage/part of a group TCI DCI).

In another example 1.4.1.2, a UE is configured a dedicated resource for reporting positive HARQ-ACK feedback and negative HARQ-ACK feedback on PUCCH.

In another example 1.4.1.3, a UE is configured a dedicated resource for reporting positive HARQ-ACK feedback. A common resource on PUCCH, common across all UEs of group, is configured for negative HARQ-ACK feedback. The common resource on PUCCH for negative HARQ-ACK feedback is configured by either: UE-specific configuration and signaling; or UE group-specific configuration and signaling.

In another example 1.4.1.4, a UE uses its HARQ-ACK codebook to convey the HARQ-ACK for beam indication.

The remaining details of example 1.2.1 follow for example 1.4.1.

In another example 1.4.2, a two-stage/part group TCI DCI has configured time-frequency resources, a gNB/network transmits beam indication information in the configured resources of a TCI DCI. In such, if there is a change in beam information for a UE, a new beam indication information, for a UE, is transmitted in the configured resources of a TCI DCI. If there is no change in beam indication information for UE, only a first stage/part TCI DCI can be transmitted indicating that there is no beam indication information update. In this case, there is no second stage/part TCI DCI, alternatively there can be a placeholder second stage/part TCI DCI.

A UE can attempt to receive and decode a TCI DCI in the configured resources of the two stage/part TCI DCI.

In one example, a UE that successfully receives and decodes a first stage/part group TCI DCI can determine if beam indication information for the UE is included in the second stage/part group TCI DCI. In such example, if there is no beam indication information for the UE in the second stage/part group TCI DCI. The UE can either: transmit no HARQ-ACK feedback to the gNB/network; or transmit positive acknowledgement (positive HARQ-ACK) feedback to the gNB network. For the HARQ-ACK codebook a UE can transmit ACK in this case, in instead of DTX. This behavior can be configured/updated by RRC signaling and/or MAC CE signaling and/or L1 control signaling.

In such example, if there is beam indication information for the UE in the second stage/part group TCI DCI. The UE attempts to decode the second stage part group TCI DCI. If: the UE successfully decodes the second stage/part of a group TCI DCI, the UE transmits a positive acknowledgement (positive HARQ-ACK) to the gNB/network. If the UE does not successfully decode the second stage part of a group TCI DCI, the UE can either: transmits a negative acknowledgement (negative HARQ-ACK or NACK) to the gNB/network; or alternatively, the UE does not transmit any feedback (DTX in this case) to the gNB/network. For the HARQ-ACK codebook a UE can transmit NACK in this case, in instead of DTX.

It can be specified in the system specifications and/or configured/updated by RRC signaling and/or configured/updated by MAC CE signaling and/or L1 control signaling whether a UE provides negative HARQ-ACK feedback or DTX when the UE fails to decode a second stage/part TCI DCI after successfully decoding the corresponding first stage/part TCI DCI. The configuration/update can be UE-specific and/or UE-group specific and/or cell-specific denoted as parameter P3.

In another example, a UE that does not successfully decode a first stage/part group TCI DCI can either: transmit a negative acknowledgement (negative HARQ-ACK or NACK) to the gNB/network; or alternatively, the UE does not transmit any feedback (DTX in this case) to the gNB/network. For the HARQ-ACK codebook a UE can transmit NACK in this case, in instead of DTX. It can be specified in the system specifications and/or configured/updated by RRC signaling and/or configured/updated by MAC CE signaling and/or L1 control signaling whether a UE provides negative HARQ-ACK feedback or DTX when the UE fails to decode a first stage/part TCI DCI in a configured TCI DCI resource. The configuration/update can be UE-specific and/or UE-group specific and/or cell-specific. This parameter can be the same or a separate parameter from parameter P3.

In one example 1.4.2.1, A UE is configured a dedicated resource for reporting positive HARQ-ACK feedback on PUCCH, and no resource is configured for negative HARQ-ACK (there is DTX in case of no successful reception and decoding of a first stage/part or a second stage/part of a group TCI DCI).

In another example 1.4.2.2, A UE is configured a dedicated resource for reporting positive HARQ-ACK feedback and negative HARQ-ACK feedback on PUCCH.

In another example 1.4.2.3, A UE is configured a dedicated resource for reporting positive HARQ-ACK feedback. A common resource on PUCCH, common across all UEs of group, is configured for negative HARQ-ACK feedback. The common resource on PUCCH for negative HARQ-ACK feedback is configured by either: UE-specific configuration and signaling; or UE group-specific configuration and signaling.

In another example 1.4.2.4, a UE uses its HARQ-ACK codebook to convey the HARQ-ACK for beam indication.

The remaining details of example 1.2.2 follow for example 1.4.2.

In another example 1.4.3, a two-stage/part group TCI DCI has configured time-frequency resources, a gNB/network transmits beam indication information in the configured resources of a TCI DCI, in case of new beam indication information. In this example, if there is no change in beam information for all UEs in a group of UEs, there is no TCI DCI transmission on a configured group TCI DCI resource.

If there is a change in beam information for some or all UEs in a group of UEs, a new beam indication information, for the UEs with beam change information, is transmitted in the configured resources of a two-stage/part TCI DCI. The first stage/part group TCI DCI indicates to a UE whether there is beam change information for the UE in the second stage/part TCI DCI.

A UE can attempt to receive and decode a TCI DCI in the configured resources of the two-stage/part group TCI DCI. In one example, a UE that successfully receives and decodes a first stage/part group TCI DCI can determine if beam indication information for the UE is included in the second stage/part group TCI DCI. In such example, if there is no beam indication information for the UE in the second stage/part group TCI DCI. The UE can either: transmit no HARQ-ACK feedback to the gNB/network (alternatively, for the HARQ-ACK codebook a UE can transmit ACK in this case, in instead of DTX); or transmit positive acknowledgement (positive HARQ-ACK) feedback to the gNB network. This behavior can be configured/updated by RRC signaling and/or MAC CE signaling and/or L1 control signaling.

In such example, if there is beam indication information for the UE in the second stage/part group TCI DCI. The UE attempts to decode the second stage part group TCI DCI. If: the UE successfully decodes the second stage/part of a group TCI DCI, the UE transmits a positive acknowledgement (positive HARQ-ACK) to the gNB/network. If the UE does not successfully decode the second stage part of a group TCI DCI, the UE can either; transmits a negative acknowledgement (negative HARQ-ACK or NACK) to the gNB/network; or alternatively, the UE does not transmit any feedback (DTX in this case) to the gNB/network. For the HARQ-ACK codebook a UE can transmit NACK in case of a DTX.

It can be specified in the system specifications and/or configured/updated by RRC signaling and/or configured/updated by MAC CE signaling and/or L1 signaling whether a UE provides negative HARQ-ACK feedback or DTX when the UE fails to decode a second stage/part TCI DCI after successfully decoding the corresponding first stage/part TCI DCI. The configuration/update can be UE-specific and/or UE-group specific and/or cell-specific denoted as parameter P4.

In another example, a UE that does not successfully decode a first stage/part TCI DCI can either: transmit a negative acknowledgement (negative HARQ-ACK or NACK) to the gNB/network; alternatively, the UE does not transmit any feedback (DTX in this case) to the gNB/network (For the HARQ-ACK codebook a UE can transmit NACK in case of a DTX); or alternatively, the UE measures a signal quality, e.g., RSRP, or SINR, of a configured TCI DCI resource if the signal quality is above a threshold the UE transmits a negative acknowledgement, else the UE provides no HARQ-ACK feedback (DTX). For the HARQ-ACK codebook a UE can transmit NACK in case of a DTX.

It can be specified in the system specifications and/or configured/updated by RRC signaling and/or configured/updated by MAC CE signaling and/or L1 control signaling whether a UE provides negative HARQ-ACK feedback or DTX or negative HARQ-ACK/DTX depending on the signal quality when the UE fails to decode a TCI DCI in a configured TCI DCI resource. The configuration/update can be UE-specific and/or UE-group specific and/or cell-specific. This parameter can be the same or a separate parameter from parameter P4.

Furthermore, the threshold for the signal quality, if applicable, can be configured/updated by RRC signaling and/or configured/updated by MAC CE signaling and/or L1 signaling. The configuration/update can be UE-specific and/or UE-group specific and/or cell-specific.

In one example 1.4.3.1, a UE is configured a dedicated resource for reporting positive HARQ-ACK feedback on PUCCH, and no resource is configured for negative HARQ-ACK (there is DTX in case of no successful reception and decoding of a first stage/part or a second stage/part of a group TCI DCI).

In another example 1.4.3.2, a UE is configured a dedicated resource for reporting positive HARQ-ACK feedback and negative HARQ-ACK feedback on PUCCH.

In another example 1.4.3.3, a UE is configured a dedicated resource for reporting positive HARQ-ACK feedback. A common resource on PUCCH, common across all UEs of group, is configured for negative HARQ-ACK feedback. The common resource on PUCCH for negative HARQ-ACK feedback is configured by either: UE-specific configuration and signaling; or UE group-specific configuration and signaling.

In another example 1.4.3.4, a UE uses its HARQ-ACK codebook to convey the HARQ-ACK for beam indication. The remaining details of example 1.2.3 follow for example 1.4.3.

In another example 1.4.4, a two-stage/part group TCI DCI has configured time-frequency resources, a gNB/network transmits beam indication information in the configured resources of a TCI DCI. In this example, either one of the following can be supported: (1) if there is a change in beam information for a UE, a new beam indication information, for a UE, is transmitted in the configured resources of a TCI DCI. If there is no change in beam indication information for all UEs, only a first stage/part TCI DCI can be transmitted indicating that there is no beam indication information update. In this case, there is no second stage/part TCI DCI, alternatively there can be a placeholder second stage/part TCI DCI; or (2) if there is no change in beam information for all UEs in a group of UEs, there is no TCI DCI transmission on a configured group TCI DCI resource. If there is a change in beam information for some or all UEs in a group of UEs, a new beam indication information, for the UEs with beam change information, is transmitted in the configured resources of a two-stage/part TCI DCI. The first stage/part group TCI DCI indicates to a UE whether there is beam change information for the UE in the second stage/part TCI DCI.

A UE can attempt to receive and decode a first stage/part TCI DCI and if applicable a second stage/part TCI DCI in the configured resources of the two-stage/part TCI DCI. In one example, a UE that successfully receives and decodes a first stage/part group TCI DCI can determine if beam indication information for the UE is included in the second stage/part group TCI DCI. In such example, if there is no beam indication information for the UE in the second stage/part group TCI DCI. The UE does not transmit HARQ-ACK feedback to the gNB/network. In such example, if there is beam indication information for the UE in the second stage/part group TCI DCI. The UE attempts to decode the second stage part group TCI DCI. If: the UE successfully decodes the second stage/part of a group TCI DCI, the UE does not transmit HARQ-ACK feedback to the gNB/network; and/or the UE does not successfully decode the second stage part of a group TCI DCI, the UE can transmit a negative acknowledgement (negative HARQ- ACK or NACK) to the gNB/network. Alternatively, for the HARQ-ACK codebook a UE can transmit NACK in this case, in instead of DTX.

In another example, a UE that does not successfully decode a first stage/part TCI DCI can transmit a negative acknowledgement (negative HARQ-ACK or NACK) to the gNB/network. For the HARQ-ACK codebook a UE can transmit NACK in case of a DTX.

In one example 1.4.4.1, A UE is configured a dedicated resource for reporting negative HARQ-ACK feedback on PUCCH.

In another example 1.4.4.2, A common resource on PUCCH, common across all UEs of group, is configured for negative HARQ-ACK feedback. The common resource on PUCCH for negative HARQ-ACK feedback is configured by either: UE-specific configuration and signaling; or UE group-specific configuration and signaling.

In another example 1.4.4.3, a UE uses its HARQ-ACK codebook to convey the HARQ-ACK for beam indication. The remaining details of example 1.2.4 follow for example 1.4.4.

In examples 1.4.2, 1.4.3 and 1.4.4, the time/frequency resources of a configured TCI DCI resource can be configured/update by RRC signaling and/or by MAC CE signaling and/or L1 signaling.

In the examples of 1.4, a gNB can re-transmit beam indication information or transmit beam indication information on a group TCI DCI in response to a negative acknowledgement (negative HARQ-ACK–NACK) or in response to not receiving and detecting a positive acknowledgement (positive HARQ-ACK) in response to a group TCI DCI in accordance with the following examples.

In one example, the retransmission of beam indication information or the transmission of beam indication information is in response to a negative acknowledgement (negative HARQ-ACK–NACK) or in response to not receiving and detecting a positive acknowledgement (positive HARQ-ACK) from UEs with beam indication information in the group TCI DCI.

In another example, the retransmission of beam indication information or the transmission of beam indication information is in response to a negative acknowledgement (negative HARQ-ACK–NACK) or in response to not receiving and detecting a positive acknowledgement (positive HARQ-ACK) from any UE in the group TCI DCI.

In another example, the retransmission of beam indication information or the transmission of beam indication information is in response to a negative acknowledgement (negative HARQ-ACK–NACK) from any UE in the group TCI DCI or in response to not receiving and detecting a positive acknowledgement (positive HARQ-ACK) from UEs with beam indication information in the group TCI DCI.

In the above examples, the retransmission of a TCI DCI can include only the beam indication information of the UE(s) that didn't positively acknowledge the reception of the previous TCI DCI transmission. This can apply to examples that have positive HARQ-ACK feedback.

Figure 21:
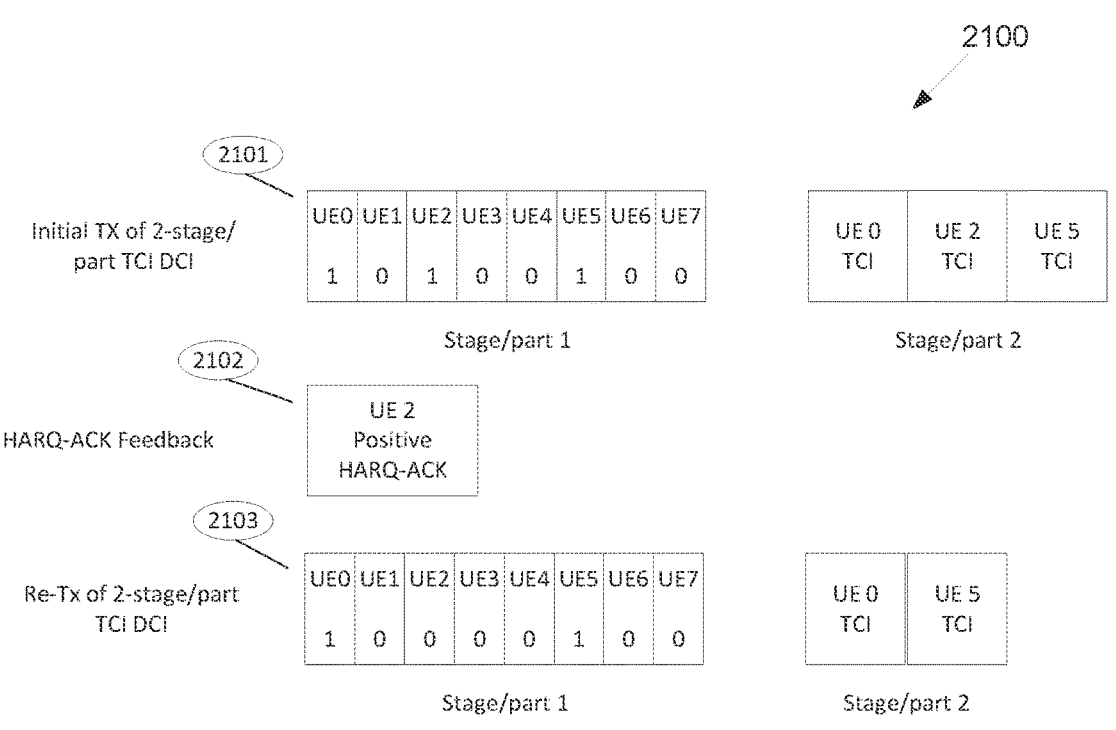
FIG. 21 illustrates an example two stage/part group TCI DCI according to embodiments of the present disclosure.

FIG. 21 illustrates an example two stage/part group TCI DCI 2100 according to embodiments of the present disclosure. An embodiment of the two stage/part group TCI DCI 2100 shown in FIG. 21 is for illustration only.

FIG. 21 is an example of a two stage/part group TCI DCI. The first stage/part TCI DCI includes an information indicating users whose TCI DCIs are indicated via the second stage/part TCI DCI. In one example, the information corresponds to a bit field with a bit associated with each user, a 1 indicates that a TCI DCI for this user is in the second stage/part TCI DCI; while a 0 indicates that there is no TCI DCI for this user in the second stage/part TCI DCI, or, alternatively, a 0 indicates that a TCI DCI for this user is in the second stage/part TCI DCI; while a 1 indicates that there is no TCI DCI for this user in the second stage/part TCI DCI. In this example, 8 users can be addressed by the two-stage/part group TCI DCI. The initial transmission (step 2101) of the two-stage/part TCI DCI includes TCI states for UE0, UE2 and UE5. UE2 sends a positive HARQ-ACK feedback to the gNB (step 2102). The next retransmission (step 2103) from the gNB includes TCI states for UE0 and UE5 as these UEs didn't positively acknowledge the initial TCI DCI transmission.

In the above examples, the retransmission of a TCI DCI can include the beam indication information included in the previous TCI DCI transmission, whether the beam indication information has been positively acknowledged or not, as long as at least one UE in the group TCI DCI didn't positive acknowledge the reception of the TCI DCI, or negatively acknowledged the reception of the TCI DCI.

Figure 22:
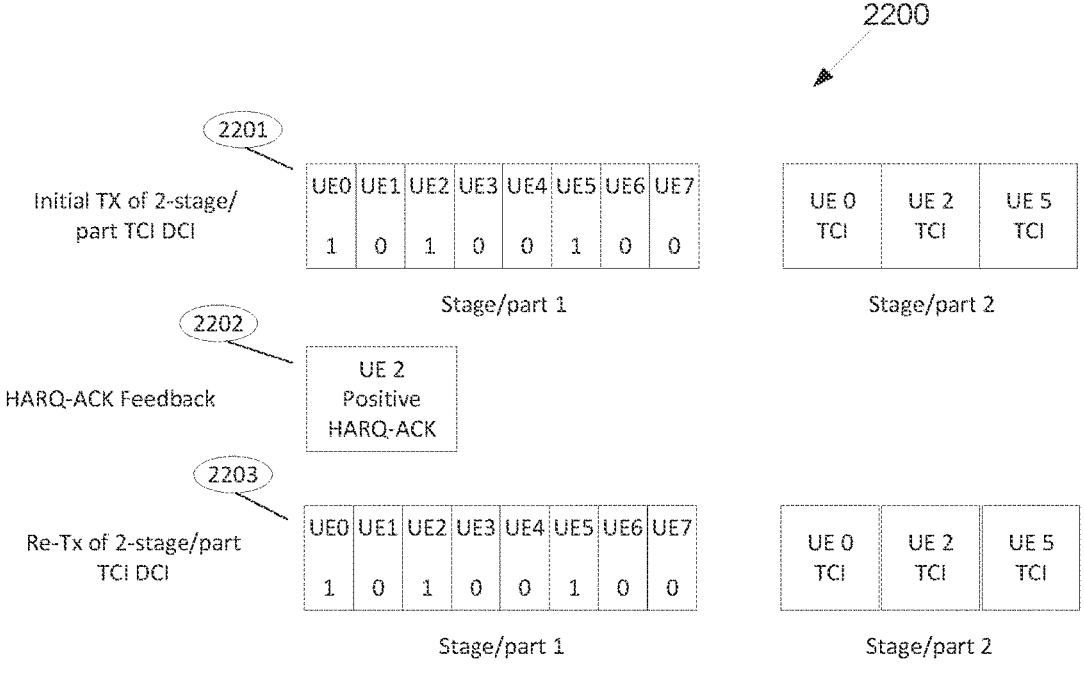
FIG. 22 illustrates another example two stage/part group TCI DCI according to embodiments of the present disclosure.

FIG. 22 illustrates another example two stage/part group TCI DCI 2200 according to embodiments of the present disclosure. An embodiment of the two stage/part group TCI DCI 2200 shown in FIG. 22 is for illustration only.

FIG. 22 is an example of a two stage/part group TCI DCI. The first stage/part TCI DCI includes an information indicating users whose TCI DCIs are indicated via the second stage/part TCI DCI. In one example, the information corresponds to a bit field with a bit associated with each user, a 1 indicates that a TCI DCI for this user is in the second stage/part TCI DCI; while a 0 indicates that there is no TCI DCI for this user in the second stage/part TCI DCI, or, alternatively, a 0 indicates that a TCI DCI for this user is in the second stage/part TCI DCI; while a 1 indicates that there is no TCI DCI for this user in the second stage/part TCI DCI. In this example, 8 users can be addressed by the two-stage/part group TCI DCI. The initial transmission (step 2201) of the two-stage/part TCI DCI includes TCI states for UE0, UE2 and UE5. UE2 sends a positive HARQ-ACK feedback to the gNB (step 2202). However, the next retransmission (step 2203) from the gNB includes TCI states for UE0, UE2 and UE5 i.e., the TCI DCI retransmission includes all the TCI states of the initial TCI DCI transmission. This can allow the UE to perform HARQ combining if the TCI states remain the same in the retransmission.

In the above examples, the retransmission of a TCI DCI can include only the beam indication information of the UE(s) that didn't positively acknowledge the reception of the previous TCI DCI transmission in addition to new beam indication information that becomes available since the previous TCI DCI transmission for the group TCI DCI. This can apply to examples that have positive HARQ-ACK feedback.

Figure 23:
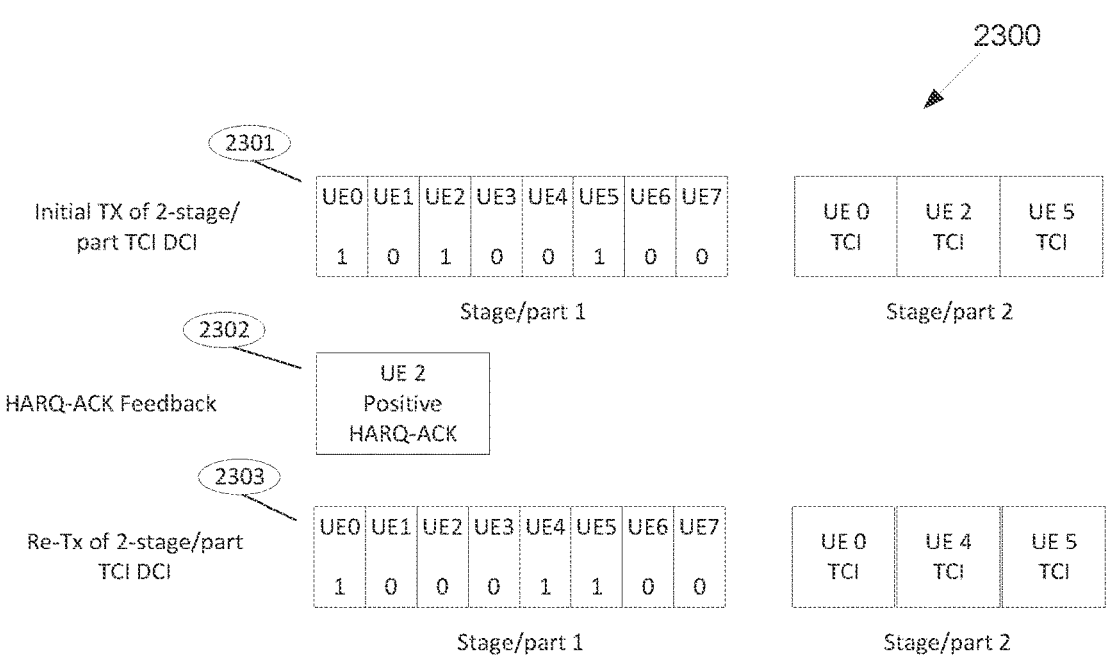
FIG. 23 illustrates yet another example two stage/part group TCI DCI according to embodiments of the present disclosure.

FIG. 23 illustrates yet another example two stage/part group TCI DCI 2300 according to embodiments of the present disclosure. An embodiment of the two stage/part group TCI DCI 2300 shown in FIG. 23 is for illustration only.

FIG. 23 is an example of a two stage/part group TCI DCI. The first stage/part TCI DCI includes an information indicating users whose TCI DCIs are indicated via the second stage/part TCI DCI. In one example, the information corresponds to a bit field with a bit associated with each user, a 1 indicates that a TCI DCI for this user is in the second stage/part TCI DCI; while a 0 indicates that there is no TCI DCI for this user in the second stage/part TCI DCI, or, alternatively, a 0 indicates that a TCI DCI for this user is in the second stage/part TCI DCI; while a 1 indicates that there is no TCI DCI for this user in the second stage/part TCI DCI. In this example, 8 users can be addressed by the two-stage/part group TCI DCI. The initial transmission (step 2301) of the two-stage/part TCI DCI includes TCI states for UE0, UE2 and UE5. The UE2 sends a positive HARQ-ACK feedback to the gNB (step 2302). The next retransmission (step 2303) from the gNB includes; TCI states for UE0 and UE5 as these UEs didn't positively acknowledge the initial TCI DCI transmission, as well a new TCI state for UE4.

In the above examples, the retransmission of a TCI DCI can include the beam indication information included in the previous TCI DCI transmission, whether the beam indication information has been positively acknowledged or not, as long as at least one UE in the group TCI DCI didn't positive acknowledge the reception of the TCI DCI, or negatively acknowledged the reception of the TCI DCI. In addition to new beam indication information that becomes available since the previous TCI DCI transmission for the group TCI DCI.

Figure 24:
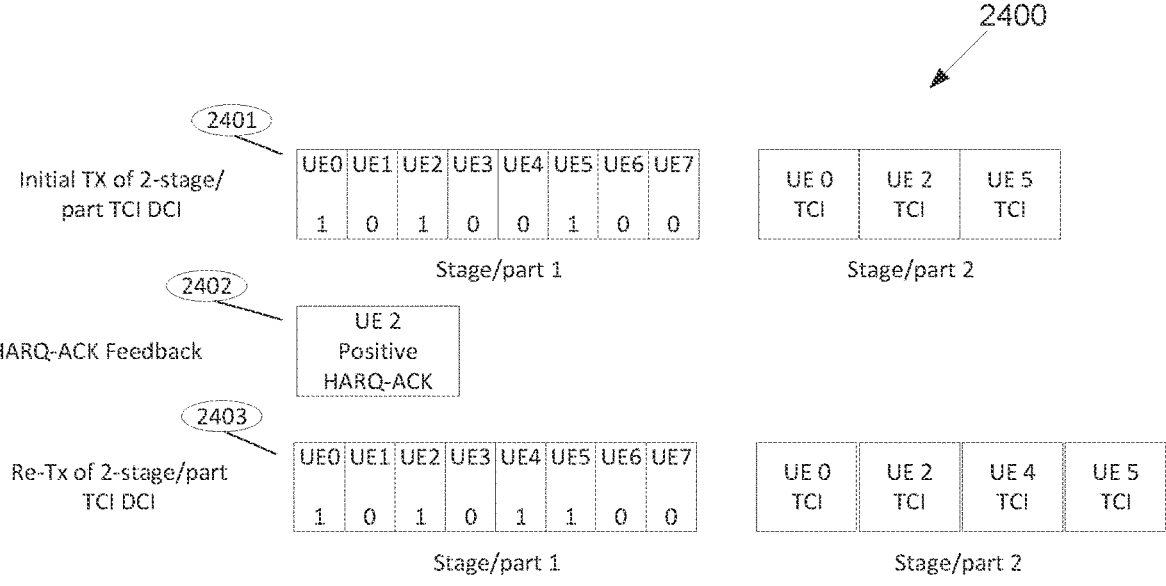
FIG. 24 illustrates yet another example two stage/part group TCI DCI according to embodiments of the present disclosure.

FIG. 24 illustrates yet another example two stage/part group TCI DCI 2400 according to embodiments of the present disclosure. An embodiment of the two stage/part group TCI DCI 2400 shown in FIG. 24 is for illustration only.

FIG. 24 is an example of a two stage/part group TCI DCI. The first stage/part TCI DCI includes an information indicating users whose TCI DCIs are indicated via the second stage/part TCI DCI. In one example, the information corresponds to a bit field with a bit associated with each user, a 1 indicates that a TCI DCI for this user is in the second stage/part TCI DCI; while a 0 indicates that there is no TCI DCI for this user in the second stage/part TCI DCI, or, alternatively, a 0 indicates that a TCI DCI for this user is in the second stage/part TCI DCI; while a 1 indicates that there is no TCI DCI for this user in the second stage/part TCI DCI. In this example, 8 users can be addressed by the two-stage/part group TCI DCI. The initial transmission (step 2401) of the two-stage/part TCI DCI includes TCI states for UE0, UE2 and UE5. UE2 sends a positive HARQ-ACK feedback to the gNB (step 2402). However, the next retransmission (step 2403) from the gNB includes TCI states for UE0, UE2 and UE5 i.e., the TCI DCI retransmission includes all the TCI states of the initial TCI DCI transmission, in addition the TCI DCI retransmission (step 2403) also includes a TCI state for UE4.

Figure 25:
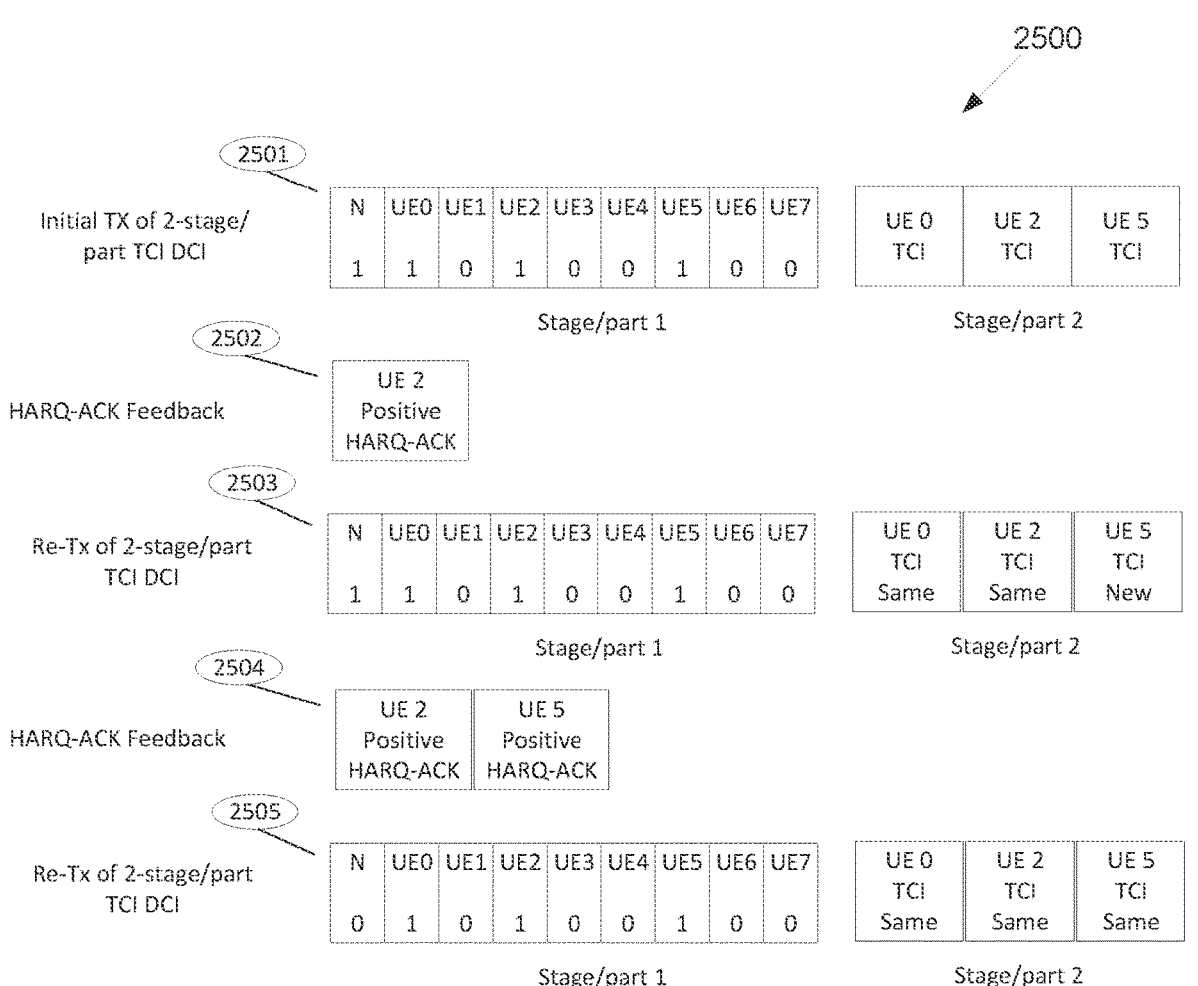
FIG. 25 illustrates yet another example two stage/part group TCI DCI according to embodiments of the present disclosure.

FIG. 25 illustrates yet another example two stage/part group TCI DCI 2500 according to embodiments of the present disclosure. An embodiment of the two stage/part group TCI DCI 2500 shown in FIG. 25 is for illustration only.

As an additional embodiment to the above examples, a first stage/part TCI DCI can include an additional information, e.g., an extra bit, which is designated as "N" in FIG. 25. The additional information, e.g., the extra bit, can indicate whether a retransmitted TCI DCI of any user is different from that of the previous TCI DCI transmission. In one example, bit N is set to 0 if the TCI states of all users included in the TCI DCI are the same as that of the previous transmission, otherwise if the TCI state of any user changes compared to the previous transmission bit N is set to 1. Alternatively, bit N can remain the same as the value of the previous transmission if the TCI states of all users included in the TCI DCI are the same as that of the previous transmission, otherwise if the TCI state of any user changes compared to the previous transmission bit N is toggled. In one example, the additional information can be transmitted separately (e.g., a separate field or parameter) from the information indicating users whose TCI DCIs are indicated via the second stage/part TCI DCI (e.g., FIGS. 21-24). In one example, the additional information can be transmitted jointly (e.g., a joint field or parameter) with the information indicating users whose TCI DCIs are indicated via the second stage/part TCI DCI (e.g., FIGS. 21-24).

FIG. 25 (which builds on the example of FIG. 22) is an example of a two stage/part group TCI DCI. The first stage/part TCI DCI includes a bit field with a bit associated with each user, a 1 indicates that a TCI DCI for this user is in the second stage/part TCI DCI; while a 0 indicates that there is no TCI DCI for this user in the second stage/part TCI DCI. In addition, bit N is set to 0 if the TCI states of all the users remain unchanged compared to the previous transmission, otherwise, if the TCI state of any user changes compared to the previous transmission, N is set to 1. In this example, 8 users can be addressed by the two-stage/part group TCI DCI. The initial transmission (step 2501) of the two-stage/part includes TCI states for UE0, UE2 and UE5. UE2 sends a positive HARQ-ACK feedback to the gNB (step 2502). However, the next retransmission (step 2503) from the gNB includes TCI states for UE0, UE2 and UE5 i.e., the TCI DCI retransmission includes all the TCI states of the initial TCI DCI transmission. In this example, the TCI state of UE5 is new, while the TCI states of UE0 and UE2 remain the same, hence bit N is set to 1. In this example, a UE receiving the retransmitted data can't perform HARQ combining as the payload has changed (new TCI state for UE5). UE2 and UE5 send positive HARQ-ACK feedback to the gNB (step 2504). The next retransmission (step 2505) from the gNB includes TCI states for UE0, UE2 and UE5 i.e., the TCI DCI retransmission includes all the TCI states of the previous TCI DCI transmission. In this example, the TCI states of all UEs (UE0, UE2 and UE5) remain the same, hence bit N is set to 0. In this example, a UE receiving the retransmitted data can perform HARQ combining as the payload remains unchanged (same TCI state for all users) compared to the previous transmission.

As an additional embodiment to the above examples, a first stage/part TCI DCI can include an extra bit for each user. This bit can indicate whether a retransmitted TCI DCI of a user is different from that of the previous TCI DCI transmission. In one example, the bit corresponding to a user is set to 0 if the TCI state of the user included in the TCI DCI is the same as that of the previous transmission, otherwise if the TCI state of the user changes compared to the previous transmission the corresponding bit for the user is set to 1. Alternatively, the bit corresponding to a user can remain the same as the value of the previous transmission if the TCI state of the user included in the TCI DCI is the same as that of the previous transmission, otherwise if the TCI state of the user changes compared to the previous transmission the corresponding bit for the user is toggled.

In one example 1.5, and following examples 1.1, 1.2, 1.3 and 1.4 and their sub-examples, a TCI DCI can be transmitted/retransmitted or repeated a number of times, e.g., blind retransmissions. (e.g., as contrasted with U.S. patent application Ser. No. 17/148,517 filed Jan. 13, 2021 incorporated herein by reference).

The maximum number of transmissions/retransmissions or repetitions can be specified by system specifications or configured/updated by RRC signaling and/or MAC CE signaling and/or L1 control signaling, the configuration/update can be done by UE-specific signaling and/or UE group specific signaling and/or cell-specific signaling.

In one example 1.5.1, a gNB/network transmits/retransmits or repeats the TCI DCI the specified/configured/updated maximum number of transmissions.

In another example 1.5.2, a gNB/network transmits/retransmits or repeats the TCI DCI until the gNB/network receives a positive acknowledgment (positive HARQ-ACK feedback) from all UEs with beam indication information in the TCI DCI.

In a further example to examples 1.5.1, and 1.5.2, different beams or spatial domain transmission/reception filters are used to transmit/receive the multiple transmissions/retransmissions or repetitions of TCI DCI, wherein, the best/latest Tx/Rx beam pair (Tx/Rx spatial domain filter pairs) are configured/provided to the UE.

In one embodiment (component 2), PUCCH resource configuration is provided.

In one example 2.1, a UE is configured with dedicated PUCCH resource for positive HARQ-ACK feedback and negative HARQ-ACK feedback.

In one example 2.1.1, a UE specific configuration configures PUCCH resource. Wherein, a PUCCH resource set is configured and a PUCCH resource index within the PUCCH resource set is further configured; and/or a PUCCH resource is configured with no reference to a PUCCH resource set.

In another example 2.1.2, a UE group specific configuration configures a PUCCH resource set, with N PUCCH resources. The UE specific configuration configures a PUCCH resource index within the PUCCH resource set.

In another example 2.1.3, a UE group specific configuration configures a PUCCH resource set, with N PUCCH resources. A UE determines a UE specific PUCCH resource within the PUCCH resource set based on the index of the UE within the group of UEs of the group TCI DCI. One example of such a rule can be the PUCCH resource index of a UE within the PUCCH resource set is the same as the index of the UE within the group of UEs of the group TCI DCI.

In another example 2.1.4, a UE group specific configuration configures a PUCCH resource set, with N PUCCH resources, furthermore UE group specific configuration configures a PUCCH resource index within the PUCCH resource set. A UE determines a UE specific PUCCH resource within the PUCCH resource set based on the index of the UE within the group of UEs of the group TCI DCI, and the group-configured PUCCH resource index. One example of such a rule can be the PUCCH resource index of a UE within the PUCCH resource set equals the index of the UE within the group of UEs of the group TCI DCI plus the configured PUCCH resource index possibly with modulo N operation to avoid exceeding the N resources of the PUCCH resource set.

In another example 2.1.5, a UE specific configuration configures a PUCCH resource set, with N PUCCH resources. A PUCCH resource index is indicated in the PUCCH Resource Index field of the TCI DCI (e.g., as in example 2.5). A UE determines a UE specific PUCCH resource within the PUCCH resource set based on the PUCCH resource index in the group TCI DCI. In two stage/part TCI DCI, the PUCCH resource index can be in the first stage/part of the group TCI DCI.

In another example 2.1.6, a UE group specific configuration configures a PUCCH resource set, with N PUCCH resources. A PUCCH resource index is indicated in the PUCCH Resource Index (PRI) field of the TCI DCI (e.g., as in example 2.5). A UE determines a UE specific PUCCH resource within the PUCCH resource set based on the index of the UE within the group of UEs of the group TCI DCI, and the PUCCH resource index in the group TCI DCI. One example of such a rule can be the PUCCH resource index of a UE within the PUCCH resource set equals the index of the UE within the group of UEs of the group TCI DCI plus the PUCCH resource index in the group TCI DCI possibly with modulo N operation to avoid exceeding the N resources of the PUCCH resource set. In two stage/part TCI DCI, the PUCCH resource index can be in the first stage/part of the group TCI DCI.

Examples 2.1.5 and 2.1.6 can apply for the case of two stage/part TCI DCI (e.g., example 1.2 and example 1.4), where a UE does not transmit HARQ-ACK feedback if it does not successfully decode the first stage/part DCI, and transmit negative HARQ-ACK feedback if the UE successfully decodes the first stage/part group TCI DCI but does not successfully decode the second stage/part group TCI DCI, and positive HARQ-ACK feedback if the UE successfully decodes the first and second stage group TCI DCI.

In the examples of 2.1, a PUCCH resource set and/or a PUCCH resource and/or a PUCCH resource index within a PUCCH resource set can be configured/updated by RRC signaling and/or MAC CE signaling and/or L1 control signaling.

In the examples of example 2.1, a PUCCH resource conveys positive HARQ-ACK, and negative HARQ-ACK. For PUCCH format 0 (as illustrated in 3GPP standard specification), two cyclic shifts are utilized one for positive HARQ-ACK and one for negative HARQ-ACK. The separation between the two cyclic shifts can be 6 cyclic shifts, following release 15 operation. In this example, one PUCCH Format0 PRB can have up to 6 PUCCH resources. For PUCCH format 1 (as determined in 3GPP standard specification), a single PUCCH format 1 resource provides feedback for positive HARQ-ACK and negative HARQ-ACK.

The examples of 2.1, can apply to a group TCI DCI or to a single UE TCI DCI.

In another example 2.2, a UE is configured with a dedicated PUCCH resource for positive HARQ-ACK feedback only.

In one example 2.2.1, a UE specific configuration configures PUCCH resource. Wherein, a PUCCH resource set is configured and a PUCCH resource index within the PUCCH resource set is further configured; and/or a PUCCH resource is configured with no reference to a PUCCH resource set.

In another example 2.2.2, a UE group specific configuration configures a PUCCH resource set, with N PUCCH resources. The UE specific configuration configures a PUCCH resource index within the PUCCH resource set.

In another example 2.2.3, a UE group specific configuration configures a PUCCH resource set, with N PUCCH resources. A UE determines a UE specific PUCCH resource within the PUCCH resource set based on the index of the UE within the group of UEs of the group TCI DCI. One example of such a rule can be the PUCCH resource index of a UE within the PUCCH resource set is the same as the index of the UE within the group of UEs of the group TCI DCI.

In another example 2.2.4, a UE group specific configuration configures a PUCCH resource set, with N PUCCH resources, furthermore UE group specific configuration configures a PUCCH resource index within the PUCCH resource set. A UE determines a UE specific PUCCH resource within the PUCCH resource set based on the index of the UE within the group of UEs of the group TCI DCI, and the group-configured PUCCH resource index. One example of such a rule can be the PUCCH resource index of a UE within the PUCCH resource set equals the index of the UE within the group of UEs of the group TCI DCI plus the configured PUCCH resource index possibly with modulo N operation to avoid exceeding the N resources of the PUCCH resource set.

In another example 2.2.5, a UE specific configuration configures a PUCCH resource set, with N PUCCH resources. A PUCCH resource index is indicated in the PUCCH Resource Index (PRI) field of the TCI DCI (e.g., as in example 2.5). A UE determines a UE specific PUCCH resource within the PUCCH resource set based on the PUCCH resource index in the group TCI DCI. In two stage/part TCI DCI, the PUCCH resource index can be in the first or second stage/part of the group TCI DCI. Else in a single stage TCI DCI, the PUCCH resource index can be in the single stage TCI DCI In another example 2.2.6, a UE group specific configuration configures a PUCCH resource set, with N PUCCH resources. A PUCCH resource index is indicated in the PUCCH Resource Index field of the TCI DCI (e.g., as in example 2.5). A UE determines a UE specific PUCCH resource within the PUCCH resource set based on the index of the UE within the group of UEs of the group TCI DCI, and the PUCCH resource index in the group TCI DCI. One example of such a rule can be the PUCCH resource index of a UE within the PUCCH resource set equals the index of the UE within the group of UEs of the group TCI DCI plus the PUCCH resource index in the group TCI DCI possibly with modulo N operation to avoid exceeding the N resources of the PUCCH resource set. In two stage/part TCI DCI, the PUCCH resource index can be in the first or second stage/part of the group TCI DCI. Else in a single stage TCI DCI, the PUCCH resource index can be in the single stage TCI DCI In the examples of 2.2, a PUCCH resource set and/or a PUCCH resource and/or a PUCCH resource index within a PUCCH resource set can be configured/updated by RRC signaling and/or MAC CE signaling and/or L1 control signaling.

In the examples of example 2.2, a PUCCH resource conveys positive HARQ-ACK only: (1) for PUCCH format 0 (as defined in 3GPP standard specification), one cyclic shift can be utilized for positive HARQ-ACK. In this example, one PUCCH Format0 PRB can have up to 12 PUCCH resources; (2) alternatively, for PUCCH format 0 (as defined in 3GPP standard specification), one cyclic shift can be utilized for positive HARQ-ACK, a second cyclic shift is left unused, wherein the second cyclic shift follows the negative HARQ-ACK cyclic shift position from release 15. In this example, one PUCCH Format0 PRB can have up to 6 PUCCH resources; and (3) for PUCCH format 1 (as determined in 3GPP standard specification), a single PUCCH format 1 resource provides feedback for positive HARQ-ACK only.

The examples of 2.2, can apply to a group TCI DCI or to a single UE TCI DCI.

In another example 2.3, a UE is configured with a dedicated PUCCH resource for negative HARQ-ACK feedback only.

In one example 2.3.1, a UE specific configuration configures PUCCH resource. Wherein, a PUCCH resource set is configured and a PUCCH resource index within the PUCCH resource set is further configured; and/or a PUCCH resource is configured with no reference to a PUCCH resource set.

In another example 2.3.2, a UE group specific configuration configures a PUCCH resource set, with N PUCCH resources. The UE specific configuration configures a PUCCH resource index within the PUCCH resource set.

In another example 2.3.3, a UE group specific configuration configures a PUCCH resource set, with N PUCCH resources. A UE determines a UE specific PUCCH resource within the PUCCH resource set based on the index of the UE within the group of UEs of the group TCI DCI. One example of such a rule can be the PUCCH resource index of a UE within the PUCCH resource set is the same as the index of the UE within the group of UEs of the group TCI DCI.

In another example 2.3.4, a UE group specific configuration configures a PUCCH resource set, with N PUCCH resources, furthermore UE group specific configuration configures a PUCCH resource index within the PUCCH resource set. A UE determines a UE specific PUCCH resource within the PUCCH resource set based on the index of the UE within the group of UEs of the group TCI DCI, and the group-configured PUCCH resource index. One example of such a rule can be the PUCCH resource index of a UE within the PUCCH resource set equals the index of the UE within the group of UEs of the group TCI DCI plus the configured PUCCH resource index possibly with modulo N operation to avoid exceeding the N resources of the PUCCH resource set.

In another example 2.3.5, a UE specific configuration configures a PUCCH resource set, with N PUCCH resources. A PUCCH resource index is indicated in the PUCCH Resource Index (PRI) field of the TCI DCI (e.g., as in example 2.5). A UE determines a UE specific PUCCH resource within the PUCCH resource set based on the PUCCH Resource Index (PRI) in the group TCI DCI. In two stage/part TCI DCI, the PUCCH Resource Index (PRI) can be in the first stage/part of the group TCI DCI.

In another example 2.3.6, UE group specific configuration configures a PUCCH resource set, with N PUCCH resources. A PUCCH resource index is indicated in the PUCCH resource index (PRI) field of the TCI DCI (e.g., as in example 2.5). A UE determines a UE specific PUCCH resource within the PUCCH resource set based on the index of the UE within the group of UEs of the group TCI DCI, and the PRI in the group TCI DCI. One example of such a rule can be the PUCCH resource index of a UE within the PUCCH resource set equals the index of the UE within the group of UEs of the group TCI DCI plus the PRI in the group TCI DCI possibly with modulo N operation to avoid exceeding the N resources of the PUCCH resource set. In two stage/part TCI DCI, the PRI can be in the first stage/part of the group TCI DCI.

Examples 2.3.5 and 2.3.6 can apply for the case of two stage/part TCI DCI (e.g., example 1.2 and example 1.4), where a UE does not transmit HARQ-ACK feedback if it does not successfully decode the first stage/part DCI, and transmit negative HARQ-ACK feedback if the UE successfully decodes the first stage/part group TCI DCI but does not successfully decode the second stage/part group TCI DCI.

In the examples of 2.3, a PUCCH resource set and/or a PUCCH resource and/or a PUCCH resource index within a PUCCH resource set can be configured/updated by RRC signaling and/or MAC CE signaling and/or L1 control signaling.

In the examples of example 2.3, a PUCCH resource conveys negative HARQ-ACK. For PUCCH format 0 (as defined in 3GPP standard specification), one cyclic shift can be utilized for negative HARQ-ACK. In this example, one PUCCH Format0 PRB can have up to 12 PUCCH resources. Alternatively, for PUCCH format 0 (as defined in 3GPP standard specification), one cyclic shift can be utilized for negative HARQ-ACK, a second cyclic shift is left unused, wherein the second cyclic shift follows the positive HARQ- ACK cyclic shift position from release 15. In this example, one PUCCH Format0 PRB can have up to 6 PUCCH resources. For PUCCH format 1 (as determined in 3GPP standard specification), a single PUCCH format 1 resource provides feedback for negative HARQ-ACK only.

The examples of 2.3 can be applied to a group TCI DCI or to a single UE TCI DCI.

In another example 2.4, a UE is configured with a common PUCCH resource for negative HARQ-ACK feedback only. The common PUCCH resource is common for UEs within a group of UEs included in a group TCI DCI.

In one example 2.4.1, a UE specific configuration configures PUCCH resource. Wherein, a PUCCH resource set is configured and a PUCCH resource index within the PUCCH resource set is further configured and a PUCCH resource is configured with no reference to a PUCCH resource set.

All UEs have the same configuration of the common PUCCH resource.

In another example 2.4.2, a UE group specific configuration configures a PUCCH resource set, with N PUCCH resources. The UE specific configuration configures a PUCCH resource index within the PUCCH resource set. All UEs have the same PUCCH resource index configuration of the common PUCCH resource.

In another example 2.4.3, a UE group specific configuration configures a PUCCH resource, i.e., the common PUCCH resource. Wherein, a PUCCH resource set is configured and a PUCCH resource index within the PUCCH resource set is further configured; and a PUCCH resource is configured with no reference to a PUCCH resource set.

In another example 2.4.4, a UE specific configuration configures a PUCCH resource set, with N PUCCH resources, a common PUCCH resource set is configured to all UEs. A PUCCH resource index is indicated in the PRI field of the TCI DCI (e.g., as in example 2.5). A UE determines the common PUCCH resource within the PUCCH resource set based on the PRI in the group TCI DCI. In two stage/part TCI DCI, the PRI can be in the first stage/part of the group TCI DCI.

In another example 2.4.5, a UE group specific configuration configures a PUCCH resource set, with N PUCCH resources. A PUCCH resource index is indicated in the PUCCH Resource Index (PRI) field of the TCI DCI (e.g., as in example 2.5). A UE determines the common PUCCH resource within the PUCCH resource set based on the PRI in the group TCI DCI. In two stage/part TCI DCI, the PRI can be in the first stage/part of the group TCI DCI.

Examples 2.4.4 and 2.4.5 can apply for the case of two stage/part TCI DCI (e.g., example 1.2 and example 1.4), where a UE does not transmit HARQ-ACK feedback if it does not successfully decode the first stage/part DCI, and transmit negative HARQ-ACK feedback if the UE successfully decodes the first stage/part group TCI DCI but does not successfully decode the second stage/part group TCI DCI.

In the examples of 2.4, a PUCCH resource set and/or a PUCCH resource and/or a PUCCH resource index within a PUCCH resource set can be configured/updated by RRC signaling and/or MAC CE signaling and/or L1 control signaling.

In the examples of example 2.4, a PUCCH resource conveys negative HARQ-ACK. For PUCCH format 0 (as determined in 3GPP standard specification), one cyclic shift can be utilized for negative HARQ-ACK. In this example, one PUCCH Format0 PRB can have up to 12 PUCCH resources. Alternatively, for PUCCH format 0, one cyclic shift can be utilized for negative HARQ-ACK, a second cyclic shift is left unused, wherein the second cyclic shift follows the positive HARQ-ACK cyclic shift position from release 15. In this example, one PUCCH Format0 PRB can have up to 6 PUCCH resources. For PUCCH format 1, a single PUCCH format 1 resource provides feedback for negative HARQ-ACK only.

The examples of 2.4, can be applied to a group TCI DCI or to a single UE TCI DCI.

In another example 2.5, a TCI DCI can include one or more of the following fields: a PRI, to indicate a PUCCH resource within a set of configured PUCCH resources; or TCI DCI HARQ_feedback timing indicator.

In one example 2.1.5.1, the "TCI DCI HARQ_feedback timing indicator" and/or "PRI" can be included in a first stage/part TCI DCI of a two stage/part TCI DCI.

In another example 2.1.5.2, the "TCI DCI HARQ_feedback timing indicator" and/or "PRI)" can be included in a second stage/part TCI DCI of a two stage/part TCI DCI.

In another example 2.1.5.3, the "TCI DCI HARQ_feedback timing indicator" and "PRI" can be included in different stages/parts of a two stage/part TCI DCI. i.e., "TCI DCI HARQ_feedback timing indicator" in one stage/part of the TCI DCI, while "PRI" in the other stage/part of the TCI DCI.

In one example 2.1.5.4, the "TCI DCI HARQ_feedback timing indicator" and/or "PRI" can be included in the TCI DCI of a single stage/part TCI DCI.

In one example 2.5.2, the "TCI DCI HARQ_feedback timing indicator" indicates the time between the TCI DCI and the corresponding PUCCH resource for HARQ-ACK feedback for the TCI DCI.

In one example 2.5.2.1, the "TCI DCI HARQ_feedback timing indicator" indicates the time in symbols.

In another example 2.5.2.2, the "TCI DCI HARQ_feedback timing indicator" indicates the time in slots.

In another example 2.5.2.3, the "TCI DCI HARQ_feedback timing indicator" indicates the time in symbols and slots.

In another example 2.5.2.3, the "TCI DCI HARQ_feedback timing indicator" indicates an index into a set of configured time duration values. The set of configured values can be configured/updated by RRC signaling and/or MAC CE signaling and/or L1 control signaling, wherein the signaling can be UE-specific, UE-group specific and/or cell specific.

In another example 2.5.2.4, the "TCI DCI HARQ_feedback timing indicator" indicates an index into a set of specified time duration values.

In another example 2.5.2.5, the "TCI DCI HARQ_feedback timing indicator" indicates an index into a set of specified time duration values. The gNB/network can further update the time durations by RRC signaling and/or MAC CE signaling and/or L1 control signaling.

In one example 2.5.2.6, if the "TCI DCI HARQ_feedback timing indicator" points to a downlink interval (e.g., a downlink slot or a downlink symbol), the PUCCH resource is transmitted in the next available uplink duration.

In one example 2.5.2.7, if the "TCI DCI HARQ_feedback timing indicator" points to a downlink interval (e.g., a downlink slot or a downlink symbol), the PUCCH resource is dropped and not transmitted.

In one example 2.5.2.8, the "TCI DCI HARQ_feedback timing indicator" is used in conjunction with a UE processing capability to determine the time between the TCI DCI and the corresponding HARQ-ACK feedback.

In another example 2.5.2.9, the UE indicates a first processing capability, the network can configure to the UE, through RRC signaling and/or MAC CE signaling and/or L1 control signaling, a second processing capability, taking into account the indicated first processing capability. The "TCI DCI HARQ_feedback timing indicator" is used in conjunction with the second processing capability to determine the time between the TCI DCI and the corresponding HARQ-ACK feedback.

In one example 2.5.3, the HARQ-ACK feedback can be disabled by indication through the TCI DCI In one example 2.5.3.1, a "TCI DCI HARQ_feedback timing indicator" codepoint can indicate that HARQ-ACK feedback is disabled. For example, codepoint zero can indicate that HARQ-ACK feedback is disabled.

In another example 2.5.3.2, a "PRI" codepoint can indicate that HARQ-ACK feedback is disabled. For example, codepoint zero can indicate that HARQ-ACK feedback is disabled.

In another example 2.5.3.3, a "PRI" codepoint can indicate that HARQ-ACK feedback is disabled. For example, codepoint zero can indicate that HARQ-ACK feedback is disabled.

In another example 2.5.3.4, a flag in the TCI DCI can indicate that HARQ-ACK feedback is disabled. In case of two-stage/part TCI DCI, this flag part can be in the first stage/part or in the second stage/part.

In one example 2.5.3.5, the disabling of HARQ-ACK feedback, can apply after the TCI DCI is successfully decoded. For example, this can apply to positive HARQ-ACK feedback. In another example, this can apply to negative HARQ-ACK feedback depending on the decode result of the second stage/part TCI DCI, wherein the indication for disabling the HARQ-ACK feedback is in the first stage/part DCI.

In one embodiment (component 3), a HARQ-ACK feedback of TCI state in DL-Related DCI is provided.

A DL-related DCI is a DCI that carries DL assignment information, such as DCI Format 1_1, DCI Format 1_2 or DCI Format 1_0. A DL-related DCI can include a joint TCI for DL/UL beam indication or a separate TCIs for DL/UL beam indication or a DL TCI for DL beam indication. (e.g., as contrasted with U.S. patent application Ser. No. 17/148, 517 filed Jan. 13, 2021 incorporated herein by reference) or an UL TCI for UL beam indication. A DL-related DCI can be DCI Format 1_1, DCI Format 1_2 or DCI Format 1_0 without DL assignment.

Figure 26A:
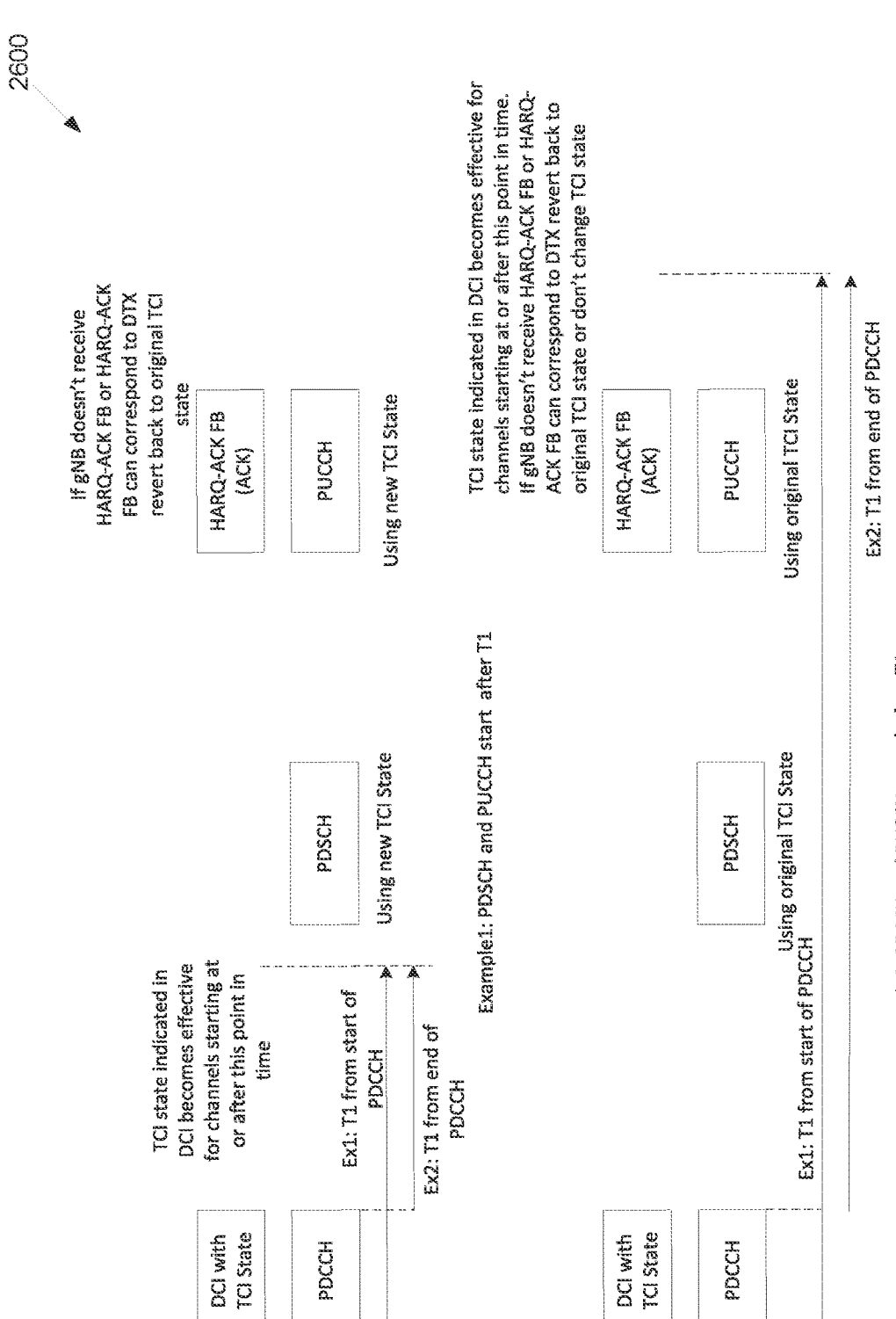
FIG. 26A illustrates an example PDSCH and PUCCH start before T1 according to embodiments of the present disclosure.

FIG. 26A illustrates an example PDSCH and PUCCH start before T1 2600 according to embodiments of the present disclosure. An embodiment of the PDSCH and PUCCH start before T1 2600 shown in FIG. 26A is for illustration only.

In one example 3.1, the UE can apply the beam after a delay $T_1$ (e.g., timeDurationForQCL) from the DL-Related DCI as shown in FIG. 26A.

In one example 3.1.1, the time duration $T_1$ is from the start of the PDCCH carrying the DL-related DCI with TCI state indication (beam indication). In one example, the start of the PDCCH corresponds to the beginning time of the first OFDM symbol that carries the PDCCH.

In another example 3.1.2, the time duration $T_1$ is from the end of the PDCCH carrying the DL-related DCI with TCI state indication (beam indication). In one example, the end of the PDCCH corresponds to the ending time of the last OFDM symbol that carries the PDCCH.

A UE can apply the new beam to the PDSCH associated with the DL-related DCI with TCI state indication and/or PUCCH with HARQ-ACK feedback for the PDSCH associated with the DL-related DCI with TCI state indication when the start time of the corresponding channel is after a time duration $T_1$ from the PDCCH of the DL-related DCI with TCI state indication.

Figure 26B:
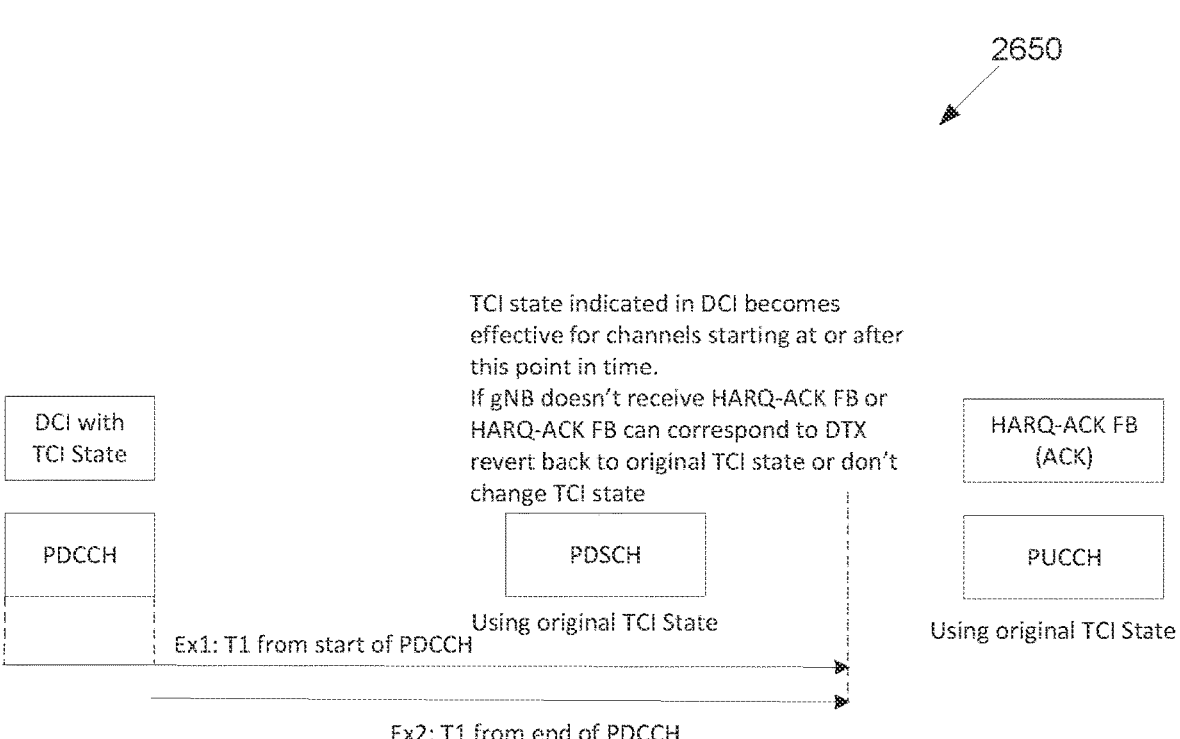
FIG. 26B illustrates another example PDSCH and PUCCH start before T1 according to embodiments of the present disclosure.

FIG. 26B illustrates another example PDSCH starts before T1 and PUCCH starts after T1 2650 according to embodiments of the present disclosure. An embodiment of the PDSCH and PUCCH start before T1 2650 shown in FIG. 26B is for illustration only.

In FIG. 26A and FIG. 26B, there are three examples, in Example 1 as illustrated in FIG. 26A, the start time of PDSCH and PUCCH associated with DL-related DCI with TCI state indication is after the time duration $T_1$. In Example 2 as illustrated in FIG. 26A, the start time of PDSCH and PUCCH associated with DL-related DCI with TCI state indication is before the time duration $T_1$. In Example 3 as illustrated in FIG. 26B, the start time of PDSCH associated with DL-related DCI with TCI state indication is before the time duration $T_1$, however, the start time of PUCCH associated with DL-related DCI with TCI state indication is after the time duration $T_1$.

If a UE does not acknowledge the PDSCH associated with a DL-related DCI with TCI state indication, the gNB and UE revert back to the original beam before TCI state update.

In one example 3.1.3, a gNB and UE (if applicable) revert back to the original beam if UE does not transmit and gNB does not receive positive HARQ-ACK acknowledgement for the PDSCH transmission associated with the DL-related DCI with TCI state indication.

In another example 3.1.4, a gNB and UE (if applicable) reverts back to the original beam if the gNB does not receive and UE does not transmit positive or negative HARQ-ACK acknowledgement for the PDSCH transmission associated with the DL-related DCI with TCI state indication, wherein a negative HARQ-ACK corresponds to a PDSCH with an attempted decode that has not been successful (e.g., with a failed transport block CRC and/or failed codeblock CRC(s)). If the HARQ-ACK codeword received by the gNB and transmitted by the UE can correspond to a DTX, i.e., the PDCCH was not received and accordingly the decoding of PDSCH was not attempted, the gNB and UE revert back to the original beam. A codeword corresponding to both NACK and DTX is handled like a codeword that corresponds to DTX as the gNB is uncertain whether the corresponding PDCCH is received and the gNB reverts back to the original TCI state (beam) even though the UE may have received the DCI but failed to decode the PDSCH, the UE reverts back to the original TCI state (beam) as NACK and DTX are mapped to a same codeword.

In another example 3.1.5, for semi-static HARQ-ACK codebook (i.e., Type-1 HARQ-ACK codebook), or for dynamic HARQ-ACK codebook, (i.e., Type-2 HARQ-ACK codebook), a UE can transmit a PUCCH if at least one DCI is received with the PDSCH-to-HARQ_feedback timing indicator in the DCI pointing to the slot and/or symbols in which PUCCH is transmitted, otherwise there is no PUCCH transmission (i.e., PUCCH DTX). A transmission of PUCCH and detection by the gNB is an indication that at least one DCI corresponding to the PUCCH transmission has been received by the UE, and the corresponding TCI state update (e.g., beam change) is confirmed. If a transmission of the PUCCH is not detected at the gNB, it is an indication to the gNB that no corresponding DCI has been received by the UE, and accordingly the gNB reverts back to the original TCI state (e.g., beam). It can be up to network implementation to ensure that when a TCI state (e.g., beam) is being updated in a DCI corresponding to a PUCCH transmission, that all DCIs pointing (based on the PDSCHto-HARQ_feedback timing indicator in the corresponding DCI) to the PUCCH transmission include the same updated TCI state, such that if the UE has received any such DCI, the UE may update the TCI state (e.g., beam) of the UE accordingly.

In another example 3.1.6, a gNB or a UE can be configured to revert back to the original beam (TCI state): (1) if a UE does not transmit and gNB does not receive positive HARQ-ACK acknowledgement for the PDSCH transmission associated with the DL-related DCI with TCI state indication following example 3.1.3. Positive HARQ-ACK transmission to keep following new beam (TCI state); or (2) if a UE does not transmit and gNB does not receive positive or negative HARQ-ACK acknowledgement for the PDSCH transmission associated with the DL-related DCI with TCI state indication following example 3.1.4 or example 3.1.5. Positive or negative HARQ-ACK transmission to keep following new beam (TCI state). Wherein, the configuration can be by RRC signaling and/or MAC CE signaling.

Figure 27:
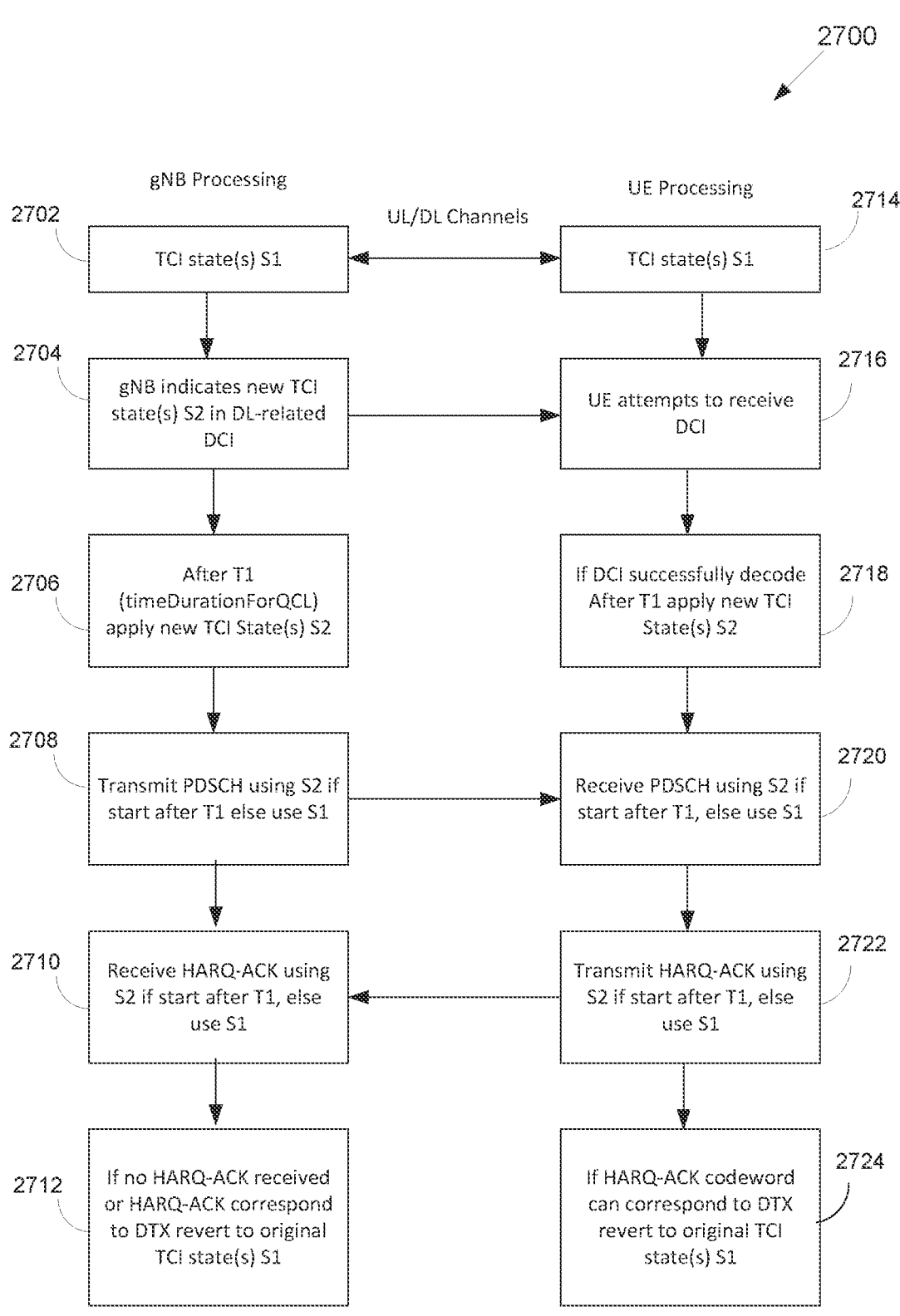
FIG. 27 illustrates a flowchart of a method for gNB and UE processing according to embodiments of the present disclosure.

FIG. 27 illustrates a flowchart of a method 2700 for gNB and UE processing according to embodiments of the present disclosure. The method 2700 as may be performed by a UE (e.g., 111-116 as illustrated in FIG. 1) and a gNB (e.g., 101-103 as illustrated in FIG. 1). An embodiment of the method 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions.

FIG. 27 illustrates the block diagram of the gNB and UE processing for example 3.1.4.

As illustrated in FIG. 27, at step 2702 and at step 2714, the gNB and UE identify TCI states(s) S1. At step 2704, the gNB indicates new TCI state(s) S2 in DL-related DCI using S1. The DL-related DCI can be a DCI with DL assignment or without DL assignment. At step 2706, the gNB applies new TCI state(s) S2 after T1(timeDurationForQCL). At step 2708, the gNB transmits PDSCH using S2 if PDSCH starts after T1 else using S1. At step 2710, the gNB receives HARQ-ACK using S2 if UL channel with HARQ-ACK starts after T1, else using S1. At step 2712, the gNB reverts to original TCS state(s) S1 if no HARQ-ACK received or HARQ-ACK corresponds to DTX. At step 2716, the UE attempts to receive DCI using S1. At step 2716, the UE applies new TCI state(s) S2 if DCI successfully decoded after T1. At step 2720, the UE receives PDSCH using S2 if PDSCH starts after T1, else using S1. At step 2720, the UE transmits HARQ-ACK using S2 if UL channel with HARQ-ACK starts after T1, else using S1. At step 2724, the UE reverts to original TCI state(s) S1 if HARQ-ACK codeword can be corresponded to DTX.

In another example 3.1a, the UE is configured with two time delays, $T_{11}$ and $T_{12}$, the UE can apply the beam after a delay $T_{11}$ (e.g., timeDurationForQCL) from the DL-Related DCI (start or end) as shown in FIG. 26A, or after a delay $T_{12}$ (e.g., timeDurationForQCL) from the DL-Related DCI (start or end) as shown in FIG. 26A.

In one example 3.1a.1, the UE is configured by a higher layer parameter whether to apply the beam after a delay $T_{11}$ (e.g., timeDurationForQCL) from the DL-Related DCI as shown in FIG. 26A, or after a delay $T_{12}$ (e.g., timeDurationForQCL) from the DL-Related DCI (start or end) as shown in FIG. 26A.

In one example 3.1a.2, the UE is configured by a MAC CE command whether to apply the beam after a delay $T_{11}$ (e.g., timeDurationForQCL) from the DL-Related DCI as shown in FIG. 26A, or after a delay $T_{12}$ (e.g., timeDura-tionForQCL) from the DL-Related DCI (start or end) as shown in FIG. 26A.

In one example 3.1a.3, the UE is configured by DCI command whether to apply the beam after a delay $T_{11}$ (e.g., timeDurationForQCL) from the DL-Related DCI as shown in FIG. 26A, or after a delay $T_{12}$ (e.g., timeDuration-ForQCL) from the DL-Related DCI (start or end) as shown in FIG. 26A. e.g. based on flag in DCI.

In another example 3.1b, the UE that receives a PDCCH with a DL-related DCI that includes a TCI state(s) can, for a PDSCH associated with the DL-related DCI and a corre-sponding PUCCH or UL channel including the correspond-ing HARQ-ACK feedback, apply the beam (TCI state) indicated in the DL-related DCI. In a further example, a beam delay $T_{11}$ (e.g., timeDurationForQCL) can be specified in the system specifications and/or configured or updated by RRC signaling and/or MAC CE signaling and/or L1 control signaling. If the start of the PDSCH and/or PUCCH asso-ciated with the DL-related DCI from the DL-related DCI is less than $T_{11}$, the UE continues to the use the original beam for the corresponding channel, else if the start of the PDSCH and/or PUCCH (or UL channel with HARQ-ACK) associ-ated with the DL-related DCI from the DL-related DCI is more than or equal to $T_{11}$, the UE switches to the new beam (TCI state) indicated by the DL-related DCI for the corre-sponding channel.

In another example 3.1b, the UE that receives a PDCCH with a DL-related DCI that includes a TCI state(s) can for DL or UL traffic not associated with the DL-related DCI apply the beam (i.e., TCI state) after a delay $T_{12}$ (e.g., timeDurationForQCL) from the DL-Related DCI associated with the PDSCH transmission as shown in FIG. 26A.

In a further example, a first beam delay $T_{11}$ (e.g., time-DurationForQCL1) for channels (e.g., PDSCH and corre-sponding PUCCH) associated with the DL-related DCI can be specified in the system specifications and/or configured or updated by RRC signaling and/or MAC CE signaling and/or L1 control signaling. In further example, a second beam delay $T_{12}$ (e.g., timeDurationForQCL2) for channels NOT associated with the DL-related DCI can be specified in the system specifications and/or configured or updated by RRC signaling and/or MAC CE signaling and/or L1 control signaling.

In another example, the first beam delay $T_{11}$ and the second beam delay $T_{12}$ are determined by the UE based on at least one of the following examples: (1) the first beam delay $T_{11}$ is configured and the second beam delay $T_{12}$ is determined based on the configured value for $T_{11}$; (2) the second beam delay $T_{12}$ is configured and the first beam delay $T_{11}$ is determined based on the configured value for $T_{12}$; (3) the first beam delay $T_{11}$ and the second beam delay $T_{12}$ are configured either via a joint parameter or two separate parameters; (4) the first beam delay $T_{11}$ is configured and the second beam delay $T_{12}$ is fixed; (5) the second beam delay $T_{12}$ is configured and the first beam delay $T_{11}$ is fixed; and/or (6) the first beam delay $T_{11}$ and the second beam delay $T_{12}$ are according to one of the above examples, but the their values are subject to UE capability reporting.

Figure 28:
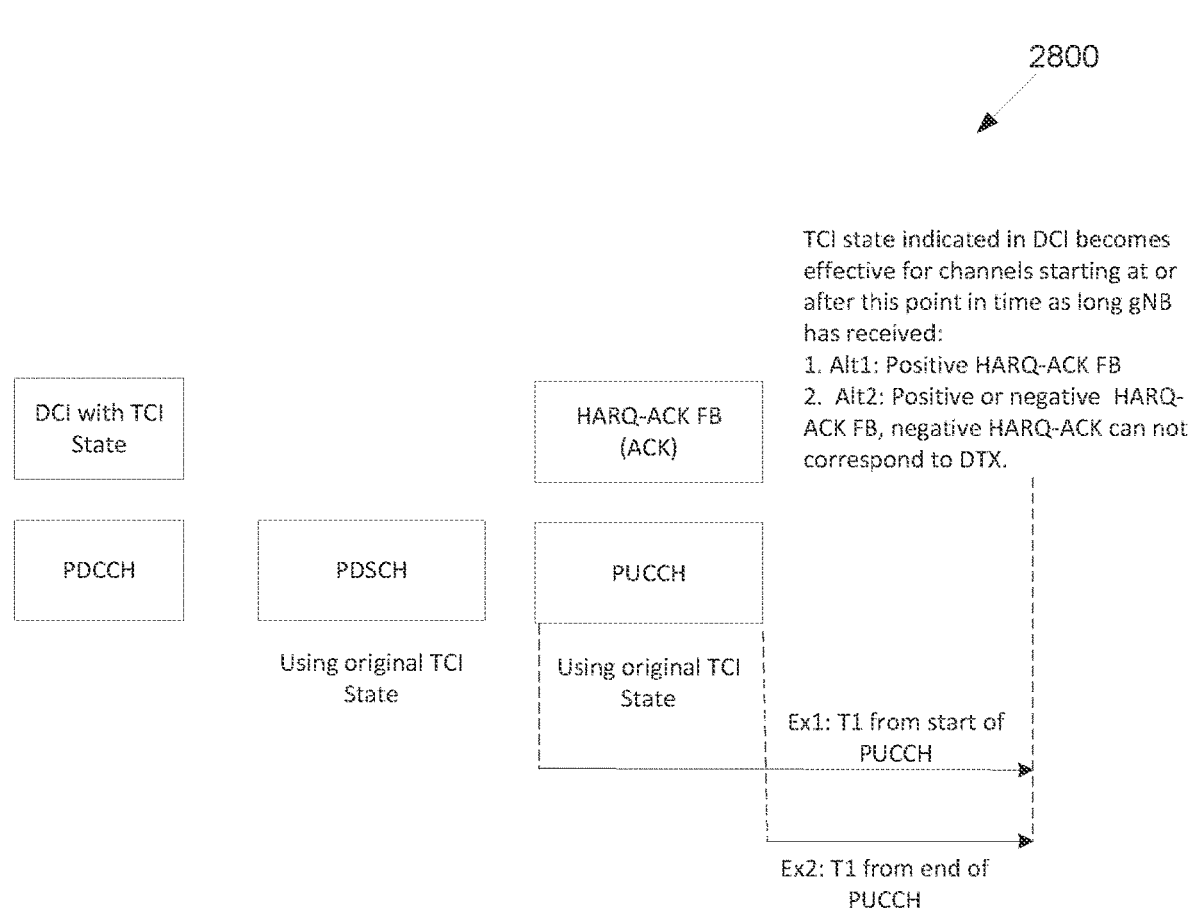
FIG. 28 illustrates an example DL-related DCI for beam indication (i.e. TCI state indication), according to embodiments of the present disclosure.

In another example 3.2, the UE can apply the beam after a delay $T_1$ (e.g., timeDurationForQCL) from the UL channel carrying HARQ-ACK feedback associated with the PDSCH transmission associated with the DL-Related DCI as shown in FIG. 28, (e.g. based on flag in DCI).

FIG. 28 illustrates an example DL-related DCI for beam indication 2800 according to embodiments of the present disclosure. An embodiment of the DL-related DCI 2800 shown in FIG. 28 is for illustration only.

In one example 3.2.1, the time duration $T_1$ is from the start of the PUCCH or UL channel carrying the corresponding HARQ-ACK feedback. In one example, the start of the PUCCH or UL channel carrying HARQ-ACK feedback corresponds to the beginning time of the first OFDM symbol that carries the PUCCH or UL channel.

In another example 3.2.2, the time duration $T_1$ is from the end of the PUCCH or UL channel carrying the correspond-ing HARQ-ACK feedback. In one example, the end of the PUCCH or UL channel carrying HARQ-ACK feedback corresponds to the ending time of the last OFDM symbol that carries the PUCCH or UL channel.

A UE uses the original TCI state (beam) for the PDSCH associated with the DL-related DCI with TCI state indica-tion and the PUCCH or UL channel with HARQ-ACK feedback for the PDSCH associated with the DL-related DCI with TCI state indication.

If a UE does not acknowledge the PDSCH (or virtual PDSCH in case of DL-related DCI without DL assignment) associated with a DL-related DCI with TCI state indication, the gNB and UE continue to use the original beam before TCI state update.

In one example 3.2.3, a gNB and UE continue to use the original beam if gNB does not receive and UE does not transmit positive HARQ-ACK acknowledgement for the PDSCH transmission associated with the DL-related DCI with TCI state indication.

FIG. 29 illustrates another flowchart of a method 2900 for gNB and UE processing according to embodiments of the present disclosure. The method 2900 as may be performed by a UE (e.g., 111-116 as illustrated in FIG. 1) and a gNB (e.g., 101-103 as illustrated in FIG. 1). An embodiment of the method 29000 shown in FIG. 29 is for illustration only. One or more of the components illustrated in FIG. 29 can be implemented in specialized circuitry configured to perform the noted functions or one or more of the components can be implemented by one or more processors executing instruc-tions to perform the noted functions.

As illustrated in FIG. 29, at step 2902 and at step 2914, the gNB and UE identify TCI states(s) S1. At step 2904, the gNB indicates new TCI state(s) S2 in DL-related DCI using S1. The DL-related DCI can be a DCI with DL assignment or without DL assignment. At step 2906, the gNB transmits PDSCH using S1. At step 2908, the gNB receives HARQ-ACK using S1. At step 2910, after T1 (timeDuration-ForQCL), if no HARQ-ACK received or HARQ-ACK cor-responds to DTX (beam indication is not acknowledged) the gNB continues with TCI state(s) S1, else in case beam indication is acknowledged, the gNB changes to TCI state(s) S2. At step 2914, the UE attempts to receive DCI using S1. At step 2916, the UE receives PDSCH using S1. At step 2918, the UE transmits HARQ-ACK using S1. At step 2920, after T1 (timeDurationForQCL), if beam indication is not acknowledged the UE continues with TCI state(s) S1, else in case beam indication is acknowledged, the UE changes to TCI state(s) S2.

In another example 3.2.4 as illustrated in FIG. 29, a gNB and UE continue to use the original beam if gNB does not receive and UE does not transmit positive or negative HARQ-ACK acknowledgement for the PDSCH transmis-sion associated with the DL-related DCI with TCI state indication, wherein a negative HARQ-ACK corresponds to a PDSCH with an attempted decode that has not been successful (e.g., with a failed transport block CRC and/or failed codeblock CRC(s)). If the HARQ-ACK codeword received by the gNB and transmitted by UE corresponds to a DTX, i.e., the PDCCH was not received and accordingly the decoding of PDSCH was not attempted, the gNB and UE continue to use the original beam. A codeword corresponding to both NACK and DTX is handled like a codeword that corresponds to DTX as the gNB is uncertain whether the corresponding PDCCH is received and the gNB continues to use the original TCI state (beam), even though the UE may have received the DCI but failed to decode the PDSCH, the UE continues to use the original TCI state (beam) as NACK and DTX are mapped to a same codeword.

In another example 3.2.5, for semi-static HARQ-ACK codebook (i.e., Type-1 HARQ-ACK codebook), or for dynamic HARQ-ACK codebook, (i.e., Type-2 HARQ-ACK codebook), a UE can transmit a PUCCH if at least one DCI is received with the PDSCH-to-HARQ_feedback timing indicator in the DCI pointing to the slot and/or symbols in which PUCCH is transmitted, otherwise there is no PUCCH transmission (i.e., PUCCH DTX). A transmission of PUCCH and detection by the gNB is an indication that at least one DCI corresponding to the PUCCH transmission has been received by the UE, and the corresponding TCI state update (e.g., beam change) is confirmed, i.e., the gNB and the UE can use the indicated TCI state after a period $T_1$ from the PUCCH transmission as illustrated in FIG. 28.

If a transmission of the PUCCH or UL transmission carrying HARQ-ACK feedback is not detected at the gNB, it is an indication to the gNB that no corresponding DCI has been received by the UE, and accordingly the gNB and the UE continue to use the original TCI state (e.g., beam). It can be up to network implementation to ensure that when a TCI state (e.g., beam) is being updated in a DCI corresponding to a PUCCH transmission or UL channel carrying HARQ-ACK feedback, that all DCIs pointing (based on the PDSCH-to-HARQ_feedback timing indicator in the corresponding DCI) to the PUCCH transmission or UL channel carrying HARQ-ACK feedback include the same updated TCI state, such that if the UE has received any such DCI, the UE may update the TCI state (e.g., beam) of the UE accordingly.

In another example 3.2.6, a gNB or UE can be configured to continue to use the original beam according to one of the following. (1) In one example, if a UE does not transmit and gNB does not receive positive HARQ-ACK acknowledgement for the PDSCH transmission (or virtual PDSCH transmission) associated with the DL-related DCI with TCI state indication following example 3.1.3. Positive HARQ-ACK transmission on PUCCH or UL channel carrying HARQ-ACK required to follow new beam (TCI state). (2) In another example, if a UE does not transmit and gNB does not receive positive or negative HARQ-ACK acknowledgement for the PDSCH transmission (or virtual PDSCH transmission) associated with the DL-related DCI with TCI state indication following example 3.1.4 or example 3.1.5. Positive or negative HARQ-ACK transmission on PUCCH or UL channel carrying HARQ-ACK required to follow new beam (TCI state). Wherein, the configuration can be by RRC signaling and/or MAC CE signaling.

In another example 3.2a, the UE is configured with two time delays, $T_{11}$ and $T_{12}$, the UE can apply the beam after a delay $T_{11}$ (e.g., timeDurationForQCL) from the DL-Related DCI (start or end) as shown in FIG. 26A, or after a delay $T_{12}$ (e.g., timeDurationForQCL) from the HARQ-ACK feedback (start or end) associated with the PDSCH transmission associated with the DL-Related DCI as shown in FIG. 28. $T_{11}$ and $T_{12}$ can be the same or different.

In one example 3.2a.1, the UE is configured by a higher layer parameter whether to apply the beam after a delay $T_{11}$ (e.g., timeDurationForQCL) from the DL-Related DCI as shown in FIG. 26A, or after a delay $T_{12}$ (e.g., timeDurationForQCL) from the HARQ-ACK feedback associated with the PDSCH transmission associated with the DL-Related DCI as shown in FIG. 28.

In one example 3.2a.2, the UE is configured by a MAC CE command whether to apply the beam after a delay $T_{11}$ (e.g., timeDurationForQCL) from the DL-Related DCI as shown in FIG. 26A, or after a delay $T_{12}$ (e.g., timeDurationForQCL) from the HARQ-ACK feedback associated with the PDSCH transmission associated with the DL-Related DCI as shown in FIG. 28.

In one example 3.2a.3, the UE is configured by a DCI command whether to apply the beam after a delay $T_{11}$ (e.g., timeDurationForQCL) from the DL-Related DCI as shown in FIG. 26A, or after a delay $T_{12}$ (e.g., timeDurationForQCL) from the HARQ-ACK feedback associated with the PDSCH transmission associated with the DL-Related DCI as shown in FIG. 28. e.g. based on flag in DCI.

The rest of the sub-examples of example 3.1 and example 3.2 apply according to the configuration of the UE.

In another example 3.2b, the UE that receives a PDCCH with a DL-related DCI that includes a TCI state(s) can for a PDSCH associated with the DL-related DCI and a corresponding PUCCH including the corresponding HARQ-ACK feedback, apply the beam (TCI state) indicated in the DL-related DCI. In a further example, a beam delay $T_{11}$ (e.g., timeDurationForQCL) can be specified in the system specifications and/or configured or updated by RRC signaling and/or MAC CE signaling and/or L1 control signaling. If the start of the PDSCH and/or PUCCH associated with the DL-related DCI from the DL-related DCI is less than $T_{11}$, the UE continues to the use the original beam for the corresponding channel, else if the start of the PDSCH and/or PUCCH associated with the DL-related DCI from the DL-related DCI is more than or equal to $T_{11}$, the UE switches to the new beam (TCI state) indicated by the DL-related DCI for the corresponding channel.

In another example 3.2b, the UE that receives a PDCCH with a DL-related DCI that includes a TCI state(s) can for DL or UL traffic not associated with the DL-related DCI apply the beam (i.e., TCI state) after a delay $T_{12}$ (e.g., timeDurationForQCL) from the HARQ-ACK feedback associated with the PDSCH transmission associated with the DL-Related DCI as shown in FIG. 28.

In a further example, a first beam delay $T_{11}$ (e.g., timeDurationForQCL1) for channels (e.g., PDSCH and corresponding PUCCH) associated with the DL-related DCI can be specified in the system specifications and/or configured or updated by RRC signaling and/or MAC CE signaling and/or L1 control signaling. In further example, a second beam delay $T_{12}$ (e.g., timeDurationForQCL2) for channels NOT associated with the DL-related DCI can be specified in the system specifications and/or configured or updated by RRC signaling and/or MAC CE signaling and/or L1 control signaling.

In another example 3.2c, the UE is configured with two time delays, $T_{11}$ and $T_{12}$, the UE can apply the beam after a delay $T_{11}$ (e.g., timeDurationForQCL) from the HARQ-ACK feedback associated with the PDSCH transmission associated with the DL-Related DCI as shown in FIG. 28, or after a delay $T_{12}$ (e.g., timeDurationForQCL) from the HARQ-ACK feedback associated with the PDSCH transmission associated with the DL-Related DCI as shown in FIG. 28.

In one example 3.2c.1, the UE is configured by a higher layer parameter whether to apply the beam after a delay $T_{11}$ (e.g., timeDurationForQCL) from the HARQ-ACK feedback associated with the PDSCH transmission associated with the DL-Related DCI as shown in FIG. 28, or after a delay $T_{12}$ (e.g., timeDurationForQCL) from the HARQ-ACK feedback associated with the PDSCH transmission associated with the DL-Related DCI as shown in FIG. 28.

In one example 3.2c.2, the UE is configured by a MAC CE command whether to apply the beam after a delay $T_{11}$ (e.g., timeDurationForQCL) from the HARQ-ACK feedback associated with the PDSCH transmission associated with the DL-Related DCI as shown in FIG. 28, or after a delay $T_{12}$ (e.g., timeDurationForQCL) from the HARQ-ACK feedback associated with the PDSCH transmission associated with the DL-Related DCI as shown in FIG. 28.

In one example 3.2c.3, the UE is configured by DCI command whether to apply the beam after a delay $T_{11}$ (e.g., timeDurationForQCL) from the HARQ-ACK feedback associated with the PDSCH transmission associated with the DL-Related DCI as shown in FIG. 28, or after a delay $T_{12}$ (e.g., timeDurationForQCL) from the HARQ-ACK feedback associated with the PDSCH transmission associated with the DL-Related DCI as shown in FIG. 28.

In another example, the first beam delay $T_{11}$ and the second beam delay $T_{12}$ are determined by the UE based on at least one of the following examples: (1) the first beam delay $T_{11}$ is configured and the second beam delay $T_{12}$ is determined based on the configured value for $T_{11}$; (2) the second beam delay $T_{12}$ is configured and the first beam delay $T_{11}$ is determined based on the configured value for $T_{12}$; (3) the first beam delay $T_{11}$ and the second beam delay $T_{12}$ are configured either via a joint parameter or two separate parameters; (4) the first beam delay $T_{11}$ is configured and the second beam delay $T_{12}$ is fixed; (5) the second beam delay $T_{12}$ is configured and the first beam delay $T_{11}$ is fixed; and/or (6) the first beam delay $T_{11}$ and the second beam delay $T12$ are according to one of the above examples, but the their values are subject to UE capability reporting.

The rest of the sub-examples of example 3.1 and example 3.2 apply according to the configuration of the UE.

In another example 3.3, a DL related DCI with TCI state indication has a HARQ-ACK feedback, separate from the HARQ ACK feedback of corresponding PDSCH. The HARQ-ACK feedback is positive if the DCI is successfully received, if the DCI is not received there is no HARQ-ACK feedback ((DTX in this case) to the gNB/network (as described in component 1). The UE can apply the beam after a delay $T_1$ (e.g., timeDurationForQCL) from the HARQ-ACK feedback associated with a DCI transmission with the DL-Related DCI as shown in FIG. 30.

Figure 30:
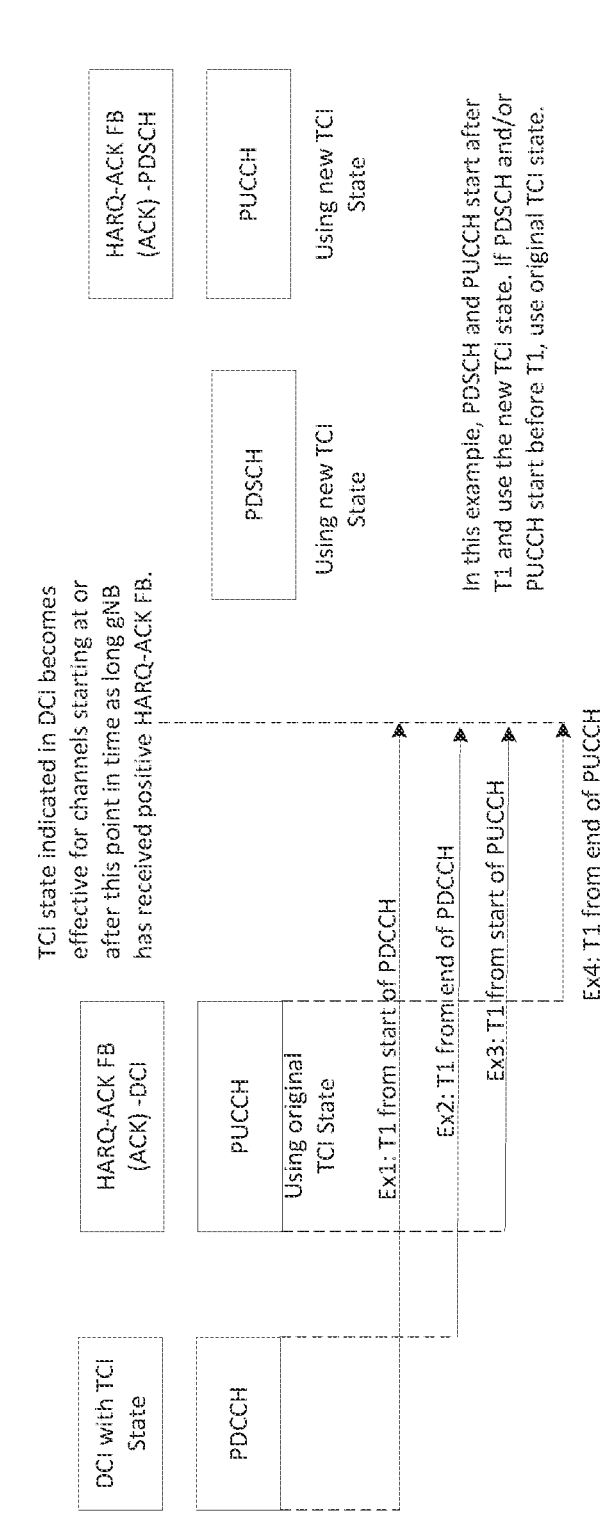
FIG. 30 illustrates another example DL-related DCI for beam indication (i.e. TCI state indication), according to embodiments of the present disclosure.

FIG. 30 illustrates another example DL-related DCI for beam indication 3000 according to embodiments of the present disclosure. An embodiment of the DL-related DCI 3000 shown in FIG. 30 is for illustration only.

In one example 3.3.1, the time duration $T_1$ is from the start of the PDCCH carrying the DL-related DCI with TCI state indication (beam indication). In one example, the start of the PDCCH corresponds to the beginning time of the first OFDM symbol that carries the PDCCH.

In another example 3.3.2, the time duration $T_1$ is from the end of the PDCCH carrying the DL-related DCI with TCI state indication (beam indication). In one example, the end of the PDCCH corresponds to the ending time of the last OFDM symbol that carries the PDCCH.

In another example 3.3.3, the time duration $T_1$ is from the start of the PUCCH or UL channel carrying the corresponding HARQ-ACK feedback. In one example, the start of the PUCCH or the UL channel carrying the HARQ-ACK feedback corresponds to the beginning time of the first OFDM symbol that carries the PUCCH or the UL channel carrying the HARQ-ACK feedback.

In another example 3.3.4, the time duration $T_1$ is from the end of the PUCCH or UL channel carrying the corresponding HARQ-ACK feedback. In one example, the end of the PUCCH or the UL channel carrying the HARQ-ACK feedback corresponds to the ending time of the last OFDM symbol that carries the PUCCH or the UL channel carrying the HARQ-ACK feedback.

A UE can apply the new beam to the PDSCH associated with the DL-related DCI with TCI state indication and/or PUCCH or UL channel with HARQ-ACK feedback for the PDSCH associated with the DL-related DCI with TCI state indication when the start time of the corresponding channel is after a time duration $T_1$ from the PDCCH, or corresponding PUCCH, of the DL-related DCI with TCI state indication. In FIG. 30, the start time of PDSCH and PUCCH associated with DL-related DCI with TCI state indication is after the time duration $T_1$.

If a UE does not acknowledge the PDCCH with a DL-related DCI with TCI state indication, the gNB and UE continue to use the original beam before TCI state update.

Figure 31:
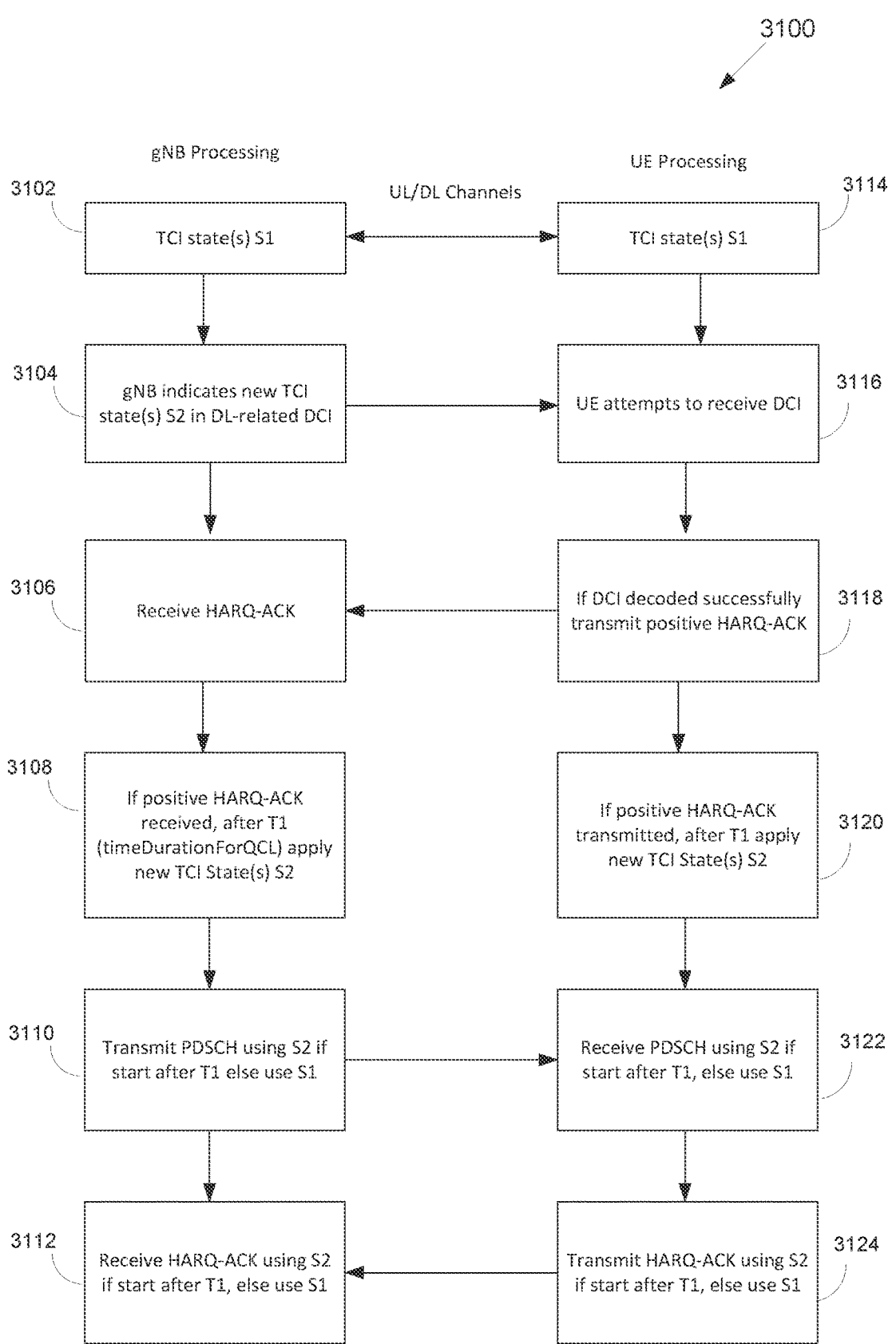
FIG. 31 illustrates yet another flowchart of a method for gNB and UE processing according to embodiments of the present disclosure.

FIG. 31 illustrates yet another flowchart of a method 3100 for gNB and UE processing according to embodiments of the present disclosure. The method 3100 as may be performed by a UE (e.g., 111-116 as illustrated in FIG. 1) and a gNB (e.g., 101-103 as illustrated in FIG. 1). An embodiment of the method 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions.

As illustrated in FIG. 31, at step 3102 and at step 3114, the gNB and UE identify TCI states(s) S1. At step 3104, the gNB indicates new TCI state(s) S2 in DL-related DCI using S1. The DL-related DCI can be a DCI with DL assignment or without DL assignment. At step 3106, the gNB receives HARQ-ACK. At step 3108, the gNB applies new TCI state(s) S2 if positive HARQ-ACK received, after T1 (time-DurationForQCL). At step 3110, the gNB transmits PDSCH using S2 if the PDSCH starts after T1, else if the PDSCH starts before T1 use S1. At step 3112, the gNB receives HARQ-ACK using S2 if UL channel with HARQ-ACK feedback starts after T1, else if the UL channel with HARQ-ACK feedback starts before U1 use S1. At step 3116, the UE attempts to receive DCI using S1. At step 3118, the UE transmits positive HARQ-ACK if DCI is decoded successfully. At step 3120, the UE applies new TCI state(s) S2 if positive HARQ-ACK is transmitted after T1. At step 3122, the UE receives PDSCH using S2 if starts after T1, else PDSCH is received using S1. At step 3124, the UE transmits HARQ-ACK using S2 if UL channel with HARQ-ACK feedback starts after T1, else UL channel with HARQ-ACK feedback is transmitted using S1.

In one example 3.3.5 as illustrated in FIG. 31, a gNB and UE continue to use the original beam if gNB does not receive and UE does not transmit positive HARQ-ACK acknowledgement for the PDCCH transmission with the DL-related DCI with TCI state indication.

In another example 3.3.6, the UE is configured with two time delays, $T_{11}$ and $T_{12}$, the UE can apply the beam after a delay $T_{11}$ (e.g., timeDurationForQCL) from the DL-Related DCI (start or end) as shown in FIG. 30, or after a delay $T_{12}$ (e.g., timeDurationForQCL) from the HARQ-ACK feedback (start or end) associated with the DL-Related DCI as shown in FIG. 30. $T_{11}$ and $T_{12}$ can be the same or different.

In one example 3.3.6.1, the UE is configured by a higher layer parameter whether to apply the beam after a delay $T_{11}$ (e.g., timeDurationForQCL) from the DL-Related DCI as shown in FIG. 30, or after a delay $T_{12}$ (e.g., timeDuration-ForQCL) from the HARQ-ACK feedback associated with the DL-Related DCI as shown in FIG. 30.

In one example 3.3.6.2, the UE is configured by a MAC CE command whether to apply the beam after a delay $T_{11}$ (e.g., timeDurationForQCL) from the DL-Related DCI as shown in FIG. 30, or after a delay $T_{12}$ (e.g., timeDuration-ForQCL) from the HARQ-ACK feedback associated with the DL-Related DCI as shown in FIG. 30.

In one example 3.3.6.3, the UE is configured by a DCI command whether to apply the beam after a delay $T_{11}$ (e.g., timeDurationForQCL) from the DL-Related DCI as shown in FIG. 30, or after a delay $T_{12}$ (e.g., timeDurationForQCL) from the HARQ-ACK feedback associated with the DL-Related DCI as shown in FIG. 30. The rest of the sub-examples of example 3.3 apply according to the configuration of the UE.

In the above examples, the delay $T_1$ (e.g., timeDuration-ForQCL) can be specified in the system specifications and/or configured or updated by RRC signaling and/or MAC CE signaling and/or L1 control signaling. The delay $T_1$ (e.g., timeDurationForQCL) can further depend on a UE capability.

In one example 3.4, the UE capability defines the earliest switching time from the time of arrival of a PDCCH (start or end) with a DL-related DCI. The network signals through RRC and/or MAC CE and/or L1 control signaling one or more beam switching time(s). Wherein, the beam switching time can be measured from: (1) in one example 3.4.1, the PDCCH (start or end) with the DL-related DCI; and/or (2) in another example 3.4.2, the HARQ-ACK feedback (start or end) associated with the PDSCH transmission associated with the DL-Related DCI.

The network can ensure that the beam switching time signaled would occur no earlier than the time indicated by the UE capability, otherwise it would be an error case, or it would be up to the implementation of the UE when the beam switching according to the TCI state indicated in the DL related DCI takes effect. The examples of component 1 and component 2 can be extended to the examples of component 3.

In one embodiment (component 4), a HARQ-ACK feedback of TCI state in UL-Related DCI is provided.

An UL-related DCI is a DCI that carries UL scheduling grant information, such as DCI Format 0_1, DCI Format 0_2 or DCI Format 0_0. A UL-related DCI can include a joint TCI for DL/UL beam indication or a separate TCIs for DL/UL beam indication or an UL TCI for UL beam indication (e.g., as contrasted with U.S. patent application Ser. No. 17/148,517 filed Jan. 13, 2021 incorporated herein by reference) or a DL TCI for DL beam indication. An UL-related DCI can be DCI Format 0_1, DCI Format 0_2 or DCI Format 0_0 without UL grant.

Figure 32:
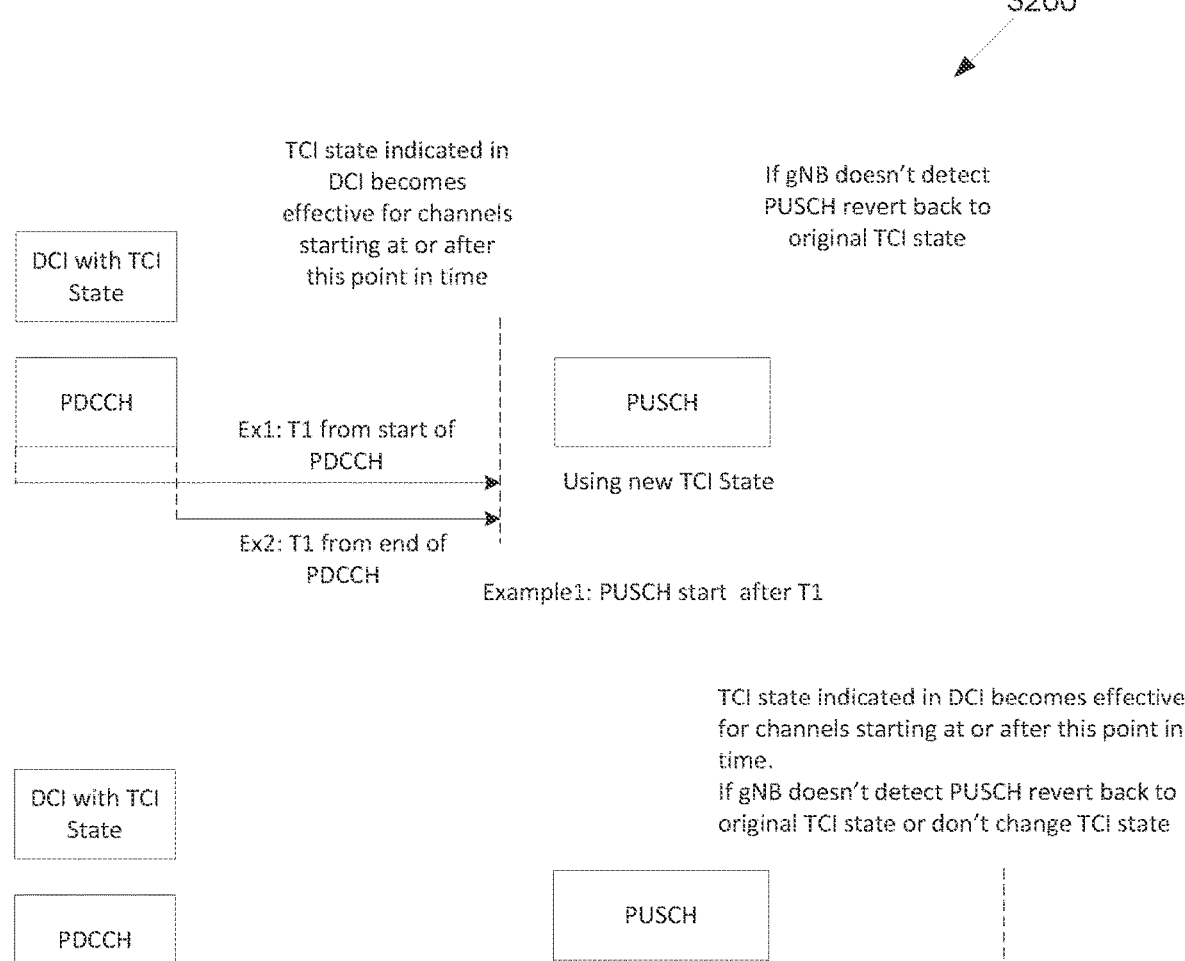
FIG. 32 illustrates an example PUSCH start before T1 according to embodiments of the present disclosure.

In one example 4.1, the UE can apply the beam after a delay $T_1$ (e.g., timeDurationForQCL) from the UL-Related DCI as shown in FIG. 32.

FIG. 32 illustrates an example PUSCH start before T1 3200 according to embodiments of the present disclosure. An embodiment of the PUSCH start before T1 3200 shown in FIG. 32 is for illustration only.

In one example 4.1.1, the time duration $T_1$ is from the start of the PDCCH carrying the UL-related DCI with TCI state indication (beam indication). In one example, the start of the PDCCH corresponds to the beginning time of the first OFDM symbol that carries the PDCCH.

In another example 4.1.2, the time duration $T_1$ is from the end of the PDCCH carrying the UL-related DCI with TCI state indication (beam indication). In one example, the end of the PDCCH corresponds to the ending time of the last OFDM symbol that carries the PDCCH.

A UE can apply the new beam to the PUSCH associated with the UL-related DCI with TCI state indication when the start time of the corresponding channel is after a time duration $T_1$ from the PDCCH of the UL-related DCI with TCI state indication. In FIG. 32, there are two examples, in Example 1, the start time of PUSCH associated with UL-related DCI with TCI state indication is after the time duration $T_1$. In Example 2, the start time of PUSCH associated with UL-related DCI with TCI state indication is before the time duration $T_1$.

If a UE does not transmit the PUSCH associated with a UL-related DCI with TCI state indication, the gNB and UE revert back to the original beam before TCI state update.

Figure 33:
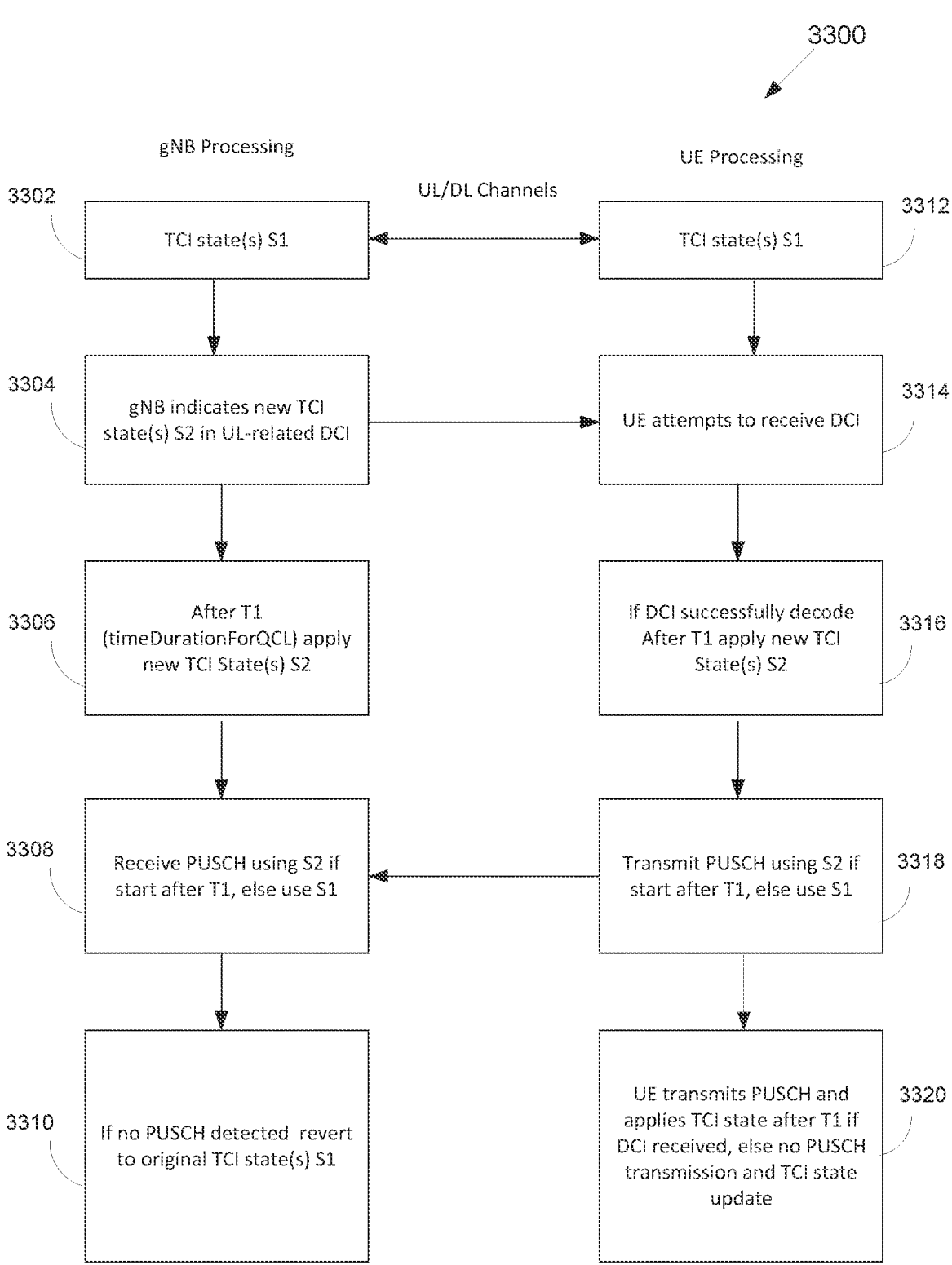
FIG. 33 illustrates yet another flowchart of a method for gNB and UE processing according to embodiments of the present disclosure.

FIG. 33 illustrates yet another flowchart of a method 3300 for gNB and UE processing according to embodiments of the present disclosure. The method 3300 as may be performed by a UE (e.g., 111-116 as illustrated in FIG. 1) and a gNB (e.g., 101-103 as illustrated in FIG. 1). An embodiment of the method 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions.

As illustrated in FIG. 33, at step 2302 and at step 2312, the gNB and UE identify TCI states(s) S1. At step 3304, the gNB indicates new TCI state(s) S2 in UL-related DCI using S1. The UL-related DCI can be a DCI with UL grant or without UL grant. At step 3306, the gNB applies new TCI state(s) S2 after T1 (timeDurationForQCL). At step 3308, the gNB receives PUSCH using S2 if the PUSCH starts after T1, else receive PUSCH using S1. At step 3310, the gNB reverts to original TCI state(s) S1 if no PUSCH is detected. At step 3314, the UE attempts to receive DCI using S1. At step 3316, the UE applies new TCI state(s) S2 if DCI is successfully decoded after T1. At step 3318, the UE transmits PUSCH using S2 if PUSCH starts after T1, else transmit PUSCH using S1. At step 3320, the UE transmits PUSCH and applies TCI states, after T1, if DCI received, else (DCI not received) no PUSCH transmission and no TCI state update.

In one example 4.1.3 as illustrated in FIG. 33, a gNB reverts back to the original beam if gNB does not detect PUSCH.

In another example 4.1a, the UE is configured with two time delays, $T_{11}$ and $T_{12}$, the UE can apply the beam after a delay $T_{11}$ (e.g., timeDurationForQCL) from the UL-Related DCI (start or end) as shown in FIG. 32, or after a delay $T_{12}$ (e.g., timeDurationForQCL) from the UL-Related DCI (start or end) as shown in FIG. 32. $T_{11}$ and $T_{12}$ can be the same or different.

In one example 4.1a.1, the UE is configured by a higher layer parameter whether to apply the beam after a delay $T_{11}$ (e.g., timeDurationForQCL) from the UL-Related DCI as shown in FIG. 32, or after a delay $T_{12}$ (e.g., timeDuration-ForQCL) from the UL-Related DCI (start or end) as shown in FIG. 32.

In one example 4.1a.2, the UE is configured by a MAC CE command whether to apply the beam after a delay $T_{11}$ (e.g., timeDurationForQCL) from the UL-Related DCI as shown in FIG. 32, or after a delay $T_{12}$ (e.g., timeDuration-ForQCL) from the UL-Related DCI (start or end) as shown in FIG. 32.

In one example 4.1a.3, the UE is configured by a DCI command whether to apply the beam after a delay $T_{11}$ (e.g., timeDurationForQCL) from the UL-Related DCI as shown in FIG. 32, or after a delay $T_{12}$ (e.g., timeDurationForQCL) from the UL-Related DCI (start or end) as shown in FIG. 32.

Figure 34:
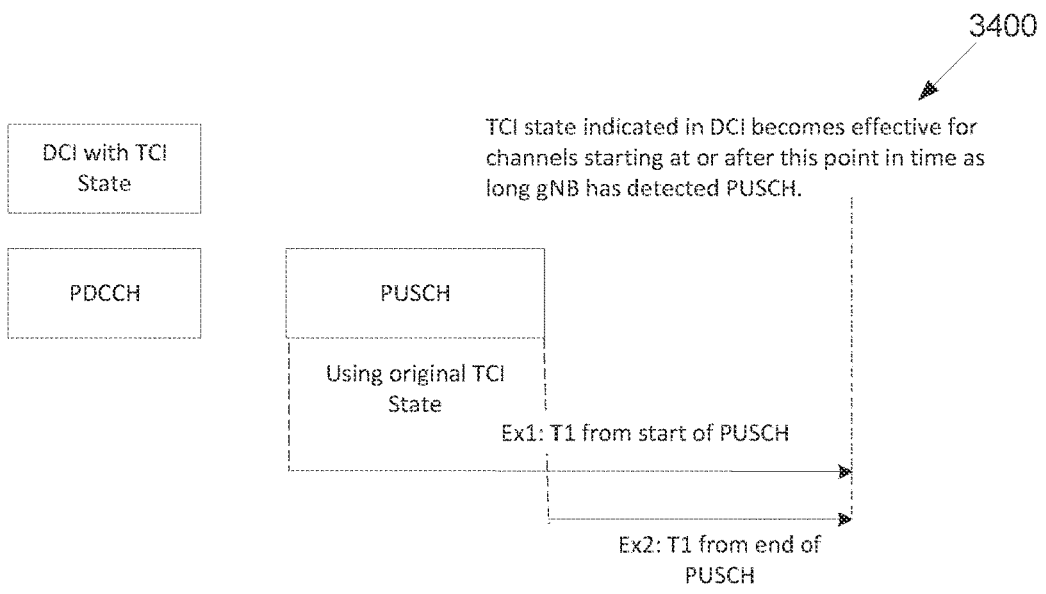
FIG. 34 illustrates an example UL-related DCI for beam indication (i.e. TCI state indication), according to embodiments of the present disclosure.

FIG. 34 illustrates an example UL-related DCI for beam indication 3400 according to embodiments of the present disclosure. An embodiment of the UL-related DCI 3400 shown in FIG. 34 is for illustration only.

In another example 4.2, the UE can apply the beam after a delay $T_1$ (e.g., timeDurationForQCL) from the PUSCH transmission associated with the UL-Related DCI as shown in FIG. 34.

In one example 4.2.1, the time duration $T_1$ is from the start of the PUSCH transmission. In one example, the start of the PUSCH corresponds to the beginning time of the first OFDM symbol that carries the PUSCH.

In another example 4.2.2, the time duration $T_1$ is from the end of the PUSCH transmission. In one example, the end of the PUSCH corresponds to the ending time of the last OFDM symbol that carries the PUSCH.

A UE uses the original TCI state (beam) for the PUSCH transmission associated with the UL-related DCI with TCI state indication.

If a UE does not transmit the PUSCH associated with a UL-related DCI with TCI state indication, the gNB and UE continue to use the original beam before TCI state update.

In one example 4.2.3, a gNB and UE continue to use the original beam if gNB does not detect the PUSCH transmission associated with the UL-related DCI with TCI state indication.

Figure 35:
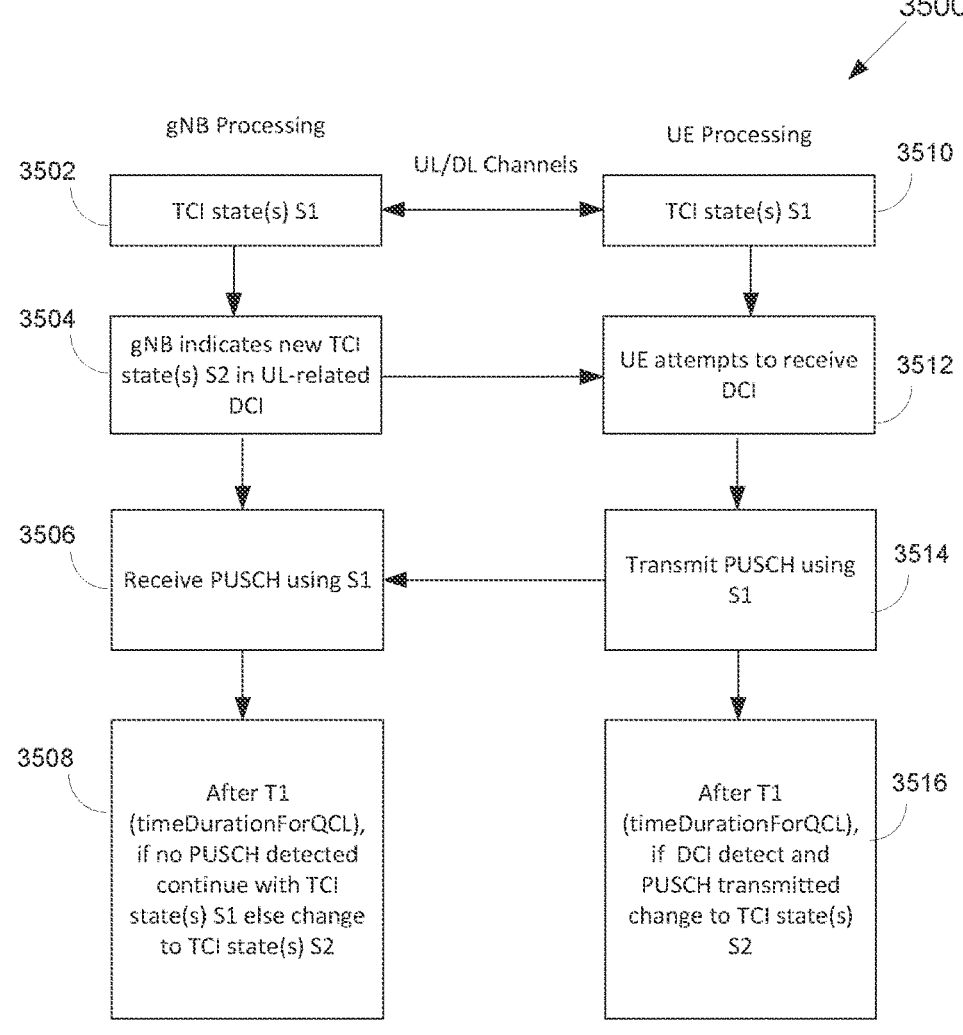
FIG. 35 illustrates yet another flowchart of a method for gNB and UE processing according to embodiments of the present disclosure.

FIG. 35 illustrates yet another flowchart of a method 3500 for gNB and UE processing according to embodiments of the present disclosure. The method 3500 as may be performed by a UE (e.g., 111-116 as illustrated in FIG. 1) and a gNB (e.g., 101-103 as illustrated in FIG. 1). An embodiment of the method 3500 shown in FIG. 35 is for illustration only. One or more of the components illustrated in FIG. 35 can be implemented in specialized circuitry configured to perform the noted functions or one or more of the components can be implemented by one or more processors executing instructions to perform the noted functions. FIG. 35 illustrates the block diagram of the gNB and UE processing for example 4.2.3.

As illustrated in FIG. 35, at step 2502 and at step 2510, the gNB and UE identify TCI states(s) S1. At step 3504, the gNB indicates new TCI state(s) S2 in UL-related DCI using S1. The UL-related DCI can be a DCI with UL grant or without UL grant. At step 3306, the gNB receives PUSCH using S1. At step 3508, if no PUSCH is detected the gNB continues with TCI state(s) S1, else (PUSCH is detected) gNB changes to TCI state(s) S2 after T1 (timeDuration-ForQCL). At step 3512, the UE attempts to receive DCI using S1. At step 3514, the UE transmits PUSCH using S1. At step 3516, the UE changes to TCI state(s) S2 after T1 (timeDurationForQCL) if DCI is detected and PUSCH is transmitted.

In another example 4.2a, the UE is configured with two time delays, $T_{11}$ and $T_{12}$, the UE can apply the beam after a delay $T_{11}$ (e.g., timeDurationForQCL) from the UL-Related DCI (start or end) as shown in FIG. 32, or after a delay $T_{12}$ (e.g., timeDurationForQCL) from the PUSCH transmission (start or end) associated with the UL-Related DCI as shown in FIG. 34. $T_{11}$ and $T_{12}$ can be the same or different.

In one example 4.2a.1, the UE is configured by a higher layer parameter whether to apply the beam after a delay $T_{11}$ (e.g., timeDurationForQCL) from the UL-Related DCI as shown in FIG. 32, or after a delay $T_{12}$ (e.g., timeDuration-ForQCL) from the PUSCH transmission associated with the UL-Related DCI as shown in FIG. 34.

In one example 4.2a.2, the UE is configured by a MAC CE command whether to apply the beam after a delay $T_{11}$ (e.g., timeDurationForQCL) from the UL-Related DCI as shown in FIG. 32, or after a delay $T_{12}$ (e.g., timeDuration-ForQCL) from the PUSCH transmission associated with the UL-Related DCI as shown in FIG. 34.

In one example 4.2a.3, the UE is configured by a DCI command whether to apply the beam after a delay $T_{11}$ (e.g., timeDurationForQCL) from the UL-Related DCI as shown in FIG. 32, or after a delay $T_{12}$ (e.g., timeDurationForQCL) from the PUSCH transmission associated with the UL-Related DCI as shown in FIG. 34. The rest of the sub-examples of example 4.1 and example 4.2 apply according to the configuration of the UE.

In another example 4.2b, the UE is configured with two time delays, $T_{11}$ and $T_{12}$, the UE can apply the beam after a delay $T_{11}$ (e.g., timeDurationForQCL) from the PUSCH transmission (start or end) associated with the UL-Related DCI as shown in FIG. 34, or after a delay $T_{12}$ (e.g., timeDurationForQCL) from the PUSCH transmission (start or end) associated with the UL-Related DCI as shown in FIG. 34. $T_{11}$ and $T_{12}$ can be the same or different.

In one example 4.2b.1, the UE is configured by a higher layer parameter whether to apply the beam after a delay $T_{11}$ (e.g., timeDurationForQCL) from the PUSCH transmission (start or end) associated with the UL-Related DCI as shown in FIG. 34, or after a delay $T_{12}$ (e.g., timeDurationForQCL) from the PUSCH transmission (start or end) associated with the UL-Related DCI as shown in FIG. 34.

In one example 4.2b.2, the UE is configured by a MAC CE command whether to apply the beam after a delay $T_{11}$ (e.g., timeDurationForQCL) from the PUSCH transmission (start or end) associated with the UL-Related DCI as shown in FIG. 34, or after a delay $T_{12}$ (e.g., timeDurationForQCL) from the PUSCH transmission (start or end) associated with the UL-Related DCI as shown in FIG. 34.

In one example 4.2b.3, the UE is configured by a DCI command whether to apply the beam after a delay $T_{11}$ (e.g., timeDurationForQCL) from the PUSCH transmission (start or end) associated with the UL-Related DCI as shown in FIG. 34, or after a delay $T_{12}$ (e.g., timeDurationForQCL) from the PUSCH transmission (start or end) associated with the UL-Related DCI as shown in FIG. 34. The rest of the sub-examples of example 4.1 and example 4.2 apply according to the configuration of the UE.

In another example 4.3, a UL related DCI with TCI state indication has a HARQ-ACK feedback. The HARQ-ACK feedback is positive if the DCI is successfully received, if the DCI is not received there is no HARQ-ACK feedback ((DTX in this case) to the gNB/network (as described in component 1). The UE can apply the beam after a delay $T_1$ (e.g., timeDurationForQCL) from the HARQ-ACK feedback associated with a DCI transmission with the UL-Related DCI as shown in FIG. 36.

Figure 36:
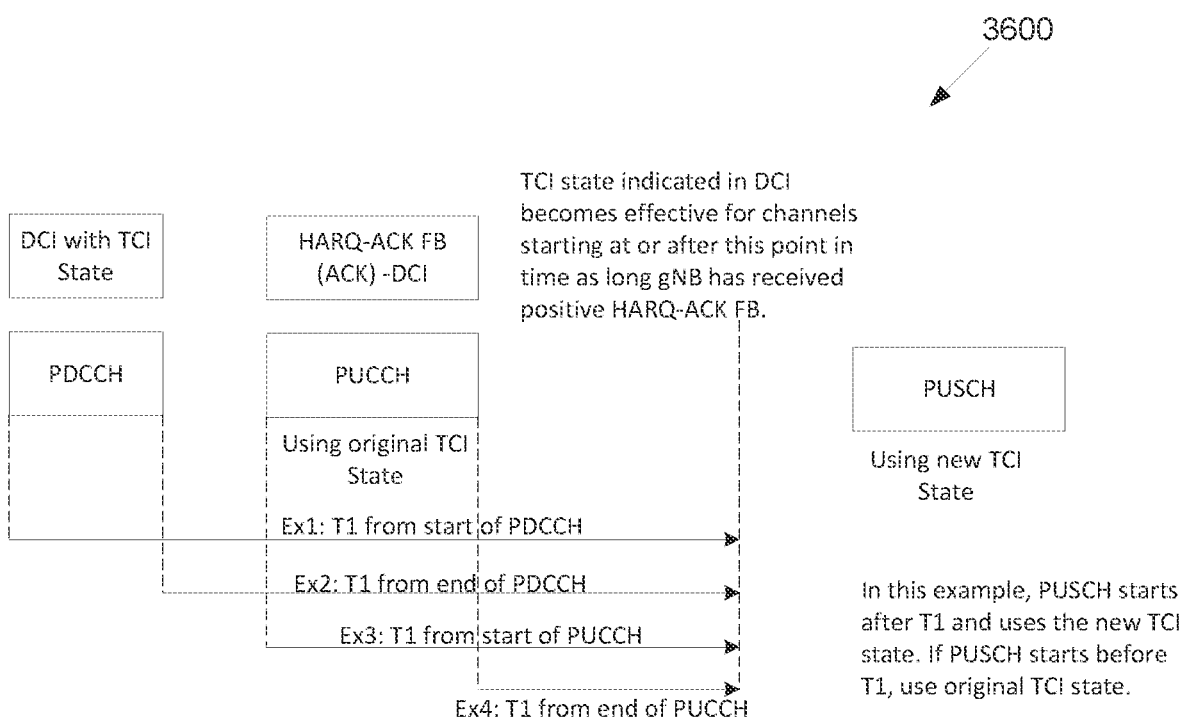
FIG. 36 illustrates another example UL-related DCI for beam indication (i.e. TCI state indication), according to embodiments of the present disclosure.

FIG. 36 illustrates another example UL-related DCI for beam indication 3600 according to embodiments of the present disclosure. An embodiment of the UL-related DCI 3600 shown in FIG. 36 is for illustration only.

In one example 4.3.1, the time duration $T_1$ is from the start of the PDCCH carrying the UL-related DCI with TCI state indication (beam indication). In one example, the start of the PDCCH corresponds to the beginning time of the first OFDM symbol that carries the PDCCH.

In another example 4.3.2, the time duration $T_1$ is from the end of the PDCCH carrying the UL-related DCI with TCI state indication (beam indication). In one example, the end of the PDCCH corresponds to the ending time of the last OFDM symbol that carries the PDCCH.

In another example 4.3.3, the time duration $T_1$ is from the start of the PUCCH or UL channel carrying the corresponding HARQ-ACK feedback. In one example, the start of the PUCCH or UL channel carrying HARQ-ACK feedback corresponds to the beginning time of the first OFDM symbol that carries the PUCCH or UL channel carrying HARQ-ACK feedback.

In another example 4.3.4, the time duration $T_1$ is from the end of the PUCCH or UL channel carrying the corresponding HARQ-ACK feedback. In one example, the end of the PUCCH or UL channel carrying HARQ-ACK feedback corresponds to the ending time of the last OFDM symbol that carries the PUCCH or UL channel carrying HARQ-ACK feedback.

A UE can apply the new beam to the PUSCH associated with the UL-related DCI with TCI state indication when the start time of the corresponding channel is after a time duration $T_1$ from the PDCCH, or corresponding PUCCH or UL channel carrying HARQ-ACK feedback, of the UL-related DCI with TCI state indication. In FIG. 36, the start time of PUSCH transmission associated with UL-related DCI with TCI state indication is after the time duration $T_1$.

If a UE does not acknowledge the PDCCH with an UL-related DCI with TCI state indication, the gNB and UE continue to use the original beam before TCI state update.

In one example 4.3.5, a gNB and UE continue to use the original beam if gNB does not receive and UE does not transmit positive HARQ-ACK acknowledgement for the PDCCH transmission with the UL-related DCI with TCI state indication.

Figure 37:
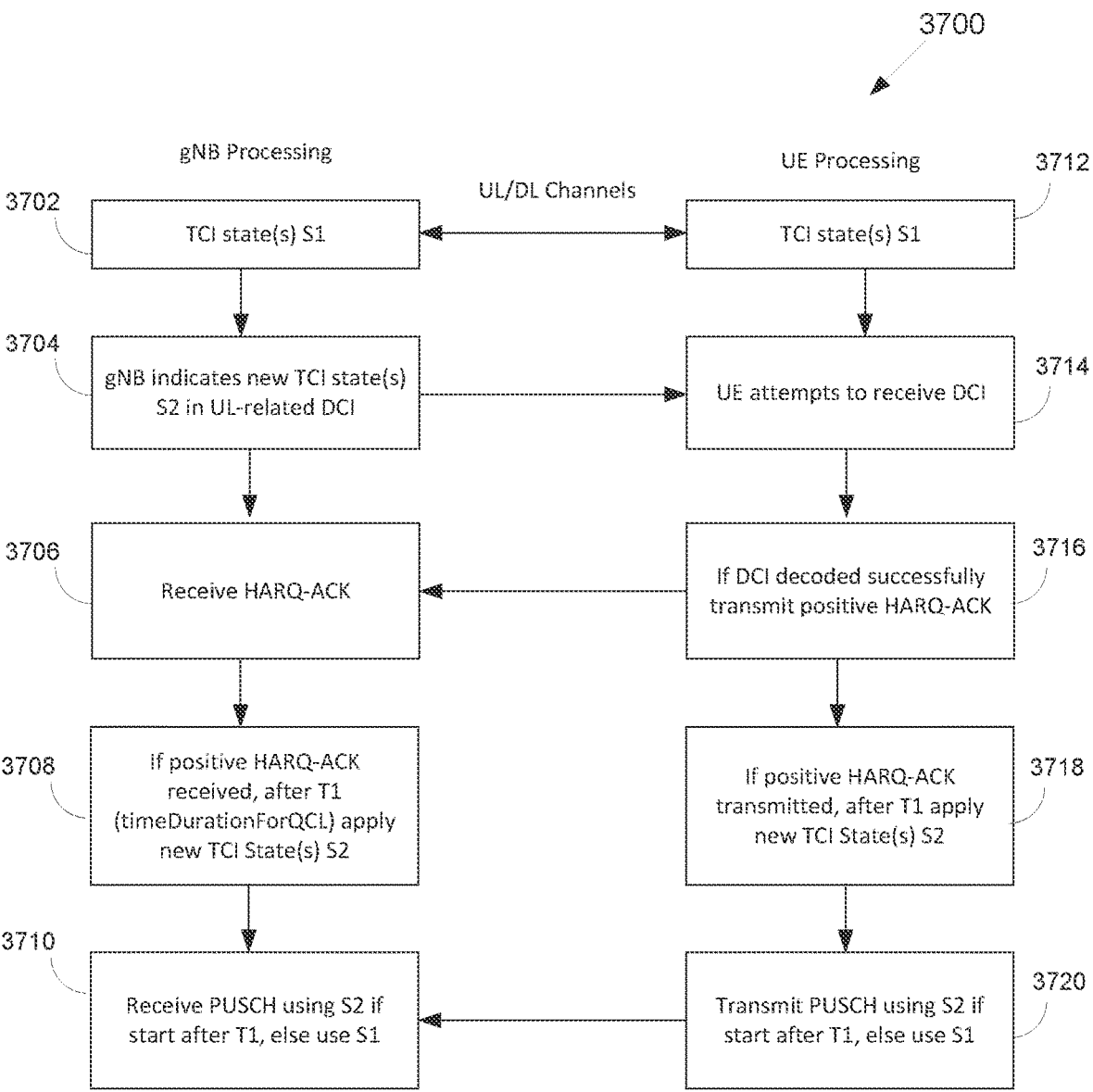
FIG. 37 illustrates yet another flowchart of a method for gNB and UE processing according to embodiments of the present disclosure.

FIG. 37 illustrates yet another flowchart of a method 3700 for gNB and UE processing according to embodiments of the present disclosure. The method 3700 as may be performed by a UE (e.g., 111-116 as illustrated in FIG. 1) and a gNB (e.g., 101-103 as illustrated in FIG. 1). An embodiment of the method 3700 shown in FIG. 37 is for illustration only. One or more of the components illustrated in FIG. 37 can be implemented in specialized circuitry configured to perform the noted functions or one or more of the components can be implemented by one or more processors executing instructions to perform the noted functions.

FIG. 37 illustrates the block diagram of the gNB and UE processing for example 4.3.5.

As illustrated in FIG. 37, at step 3702 and at step 3712, the gNB and UE identify TCI states(s) S1. At step 3704, the gNB indicates new TCI state(s) S2 in UL-related DCI using S1. The UL-related DCI can be a DCI with UL grant or without UL grant. At step 3706, the gNB receives HARQ-ACK. At step 3708, the gNB applies new TCI state(s) S2 if positive HARQ-ACK is received, after T1 (timeDuration-ForQCL). At step 3710, the gNB receives PUSCH using S2 if PUSCH starts after T1, else PUSCH is received using S1. At step 3714, the UE attempts to receive DCI using S1. At step 3716, the UE transmits HARQ-ACK if DCI is decoded successfully. At step 3718, the UE applies new TCI state(s) S2, if positive HARQ-ACK is transmitted, after T1. At step 3720, the UE transmits PUSCH using S2 if PUSCH starts after T1, else PUSCH is transmitted using S1.

In another example 4.3.6, the UE is configured with two time delays, $T_{11}$ and $T_{12}$, the UE can apply the beam after a delay $T_{11}$ (e.g., timeDurationForQCL) from the UL-Related DCI (start or end) as shown in FIG. 36, or after a delay $T_{12}$ (e.g., timeDurationForQCL) from the HARQ-ACK feedback (start or end) associated with the UL-Related DCI as shown in FIG. 36. $T_{11}$ and $T_{12}$ can be the same or different.

In one example 4.3.6.1, the UE is configured by a higher layer parameter whether to apply the beam after a delay $T_{11}$ (e.g., timeDurationForQCL) from the UL-Related DCI as shown in FIG. 36, or after a delay $T_{12}$ (e.g., timeDuration-ForQCL) from the HARQ-ACK feedback associated with the UL-Related DCI as shown in FIG. 36.

In one example 4.3.6.2, the UE is configured by a MAC CE command whether to apply the beam after a delay $T_{11}$ (e.g., timeDurationForQCL) from the UL-Related DCI as shown in FIG. 36, or after a delay $T_{12}$ (e.g., timeDuration-ForQCL) from the HARQ-ACK feedback associated with the UL-Related DCI as shown in FIG. 36.

In one example 4.3.6.3, the UE is configured by a MAC CE command whether to apply the beam after a delay $T_{11}$ (e.g., timeDurationForQCL) from the UL-Related DCI as shown in FIG. 36, or after a delay $T_{12}$ (e.g., timeDuration-ForQCL) from the HARQ-ACK feedback associated with the UL-Related DCI as shown in FIG. 36. The rest of the sub-examples of example 4.3 apply according to the configuration of the UE.

In the above examples, the delay $T_1$ (e.g., timeDuration-ForQCL) and/or $T_{11}$ and/or $T_{12}$ can be specified in the system specifications and/or configured or updated by RRC signaling and/or MAC CE signaling and/or L1 control signaling. The delay $T_1$ (e.g., timeDurationForQCL) can further depend on a UE capability.

In one example 4.4, the UE capability defines the earliest switching time from the time of arrival of a PDCCH (start or end) with an UL-related DCI. The network signals through RRC and/or MAC CE and/or L1 control signaling one or more beam switching time(s). Wherein, the beam switching time can be measured from: in one example 4.4.1, the PDCCH (start or end) with the UL-related DCI; and/or in another example 4.4.2, the PUSCH (start or end) associated with the UL-Related DCI.

The network can ensure that the beam switching time signaled would occur no earlier than the time indicated by the UE capability, otherwise it would be an error case, or it would be up to the implementation of the UE when the beam switching according to the TCI state indicated in the UL related DCI takes effect. The examples of component 1 and component 2 can be extended to the examples of component 4.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) in a wireless communication system, the method comprising:

receiving, from a base station, first configuration information on at least one transmission configuration indicator (TCI) state;

receiving, from the base station, downlink control information (DCI) for indicating a TCI state among the at least one TCI state; and transmitting, to the base station via an uplink channel, positive hybrid automatic repeat request acknowledgment (HARQ-ACK) information indicating that the DCI was successfully received, wherein the TCI state is applied for transmission or reception of a signal from a slot that is a time duration after a last symbol of the uplink channel carrying the positive HARQ-ACK information, and wherein the time duration is configured by second configuration information received from the base station.

2. The method of claim 1, wherein, in case that the DCI includes a downlink assignment, the HARQ-ACK information corresponds to a physical downlink shared channel (PDSCH) scheduled by the DCI, and wherein, in case that the DCI does not include the downlink assignment, the HARQ-ACK information corresponds to the DCI.

3. A method performed by a base station in a wireless communication system, the method comprising:

transmitting, to a user equipment (UE), first configuration information on at least one transmission configuration indicator (TCI) state;

transmitting, to the UE, downlink control information (DCI) for indicating a TCI state among the at least one TCI state; and receiving, from the UE via an uplink channel, positive hybrid automatic repeat request acknowledgment (HARQ-ACK) information indicating that the DCI was successfully received, wherein the TCI state is applied for transmission or reception of a signal from a slot that is a time duration after a last symbol of the uplink channel carrying the positive HARQ-ACK information, and wherein the time duration is configured by second configuration information received from the base station.

4. The method of claim 3, wherein, in case that the DCI includes a downlink assignment, the HARQ-ACK information corresponds to a physical downlink shared channel (PDSCH) scheduled by the DCI, and wherein, in case that the DCI does not include the downlink assignment, the HARQ-ACK information corresponds to the DCI.

5. A user equipment (UE) in a wireless communication system, the UE comprising:

a processor; and a transceiver coupled with the processor and configured to:

receive, from a base station, first configuration information on at least one transmission configuration indicator (TCI) state, receive, from the base station, downlink control information (DCI) for indicating a TCI state among the at least one TCI state, and transmit, to the base station via an uplink channel, positive hybrid automatic repeat request acknowledgment (HARQ-ACK) information indicating that the DCI was successfully received, wherein the TCI state is applied for transmission or reception of a signal from a slot that is a time duration after a last symbol of the uplink channel carrying the positive HARQ-ACK information, and wherein the time duration is configured by second configuration information received from the base station.

6. The UE of claim 5, wherein, in case that the DCI includes a downlink assignment, the HARQ-ACK information corresponds to a physical downlink shared channel (PDSCH) scheduled by the DCI, and wherein, in case that the DCI does not include the downlink assignment, the HARQ-ACK information corresponds to the DCI.

7. A base station in a wireless communication system, the base station comprising:

a processor; and a transceiver coupled with the processor and configured to:

transmit, to a user equipment (UE), first configuration information on at least one transmission configuration indicator (TCI) state, transmit, to the UE, downlink control information (DCI) for indicating a TCI state among the at least one TCI state, and receive, from the UE via an uplink channel, positive hybrid automatic repeat request acknowledgment (HARQ-ACK) information indicating that the DCI was successfully received, wherein the TCI state is applied for transmission or reception of a signal from a slot that is a time duration after a last symbol of the uplink channel carrying the positive HARQ-ACK information, and wherein the time duration is configured by second configuration information received from the base station.

8. The base station of claim 7, wherein, in case that the DCI includes a downlink assignment, the HARQ-ACK information corresponds to a physical downlink shared channel (PDSCH) scheduled by the DCI, and wherein, in case that the DCI does not include the downlink assignment, the HARQ-ACK information corresponds to the DCI.

* * * * *